(12) United States Patent
Moon et al.

(10) Patent No.: US 9,794,102 B2
(45) Date of Patent: *Oct. 17, 2017

(54) BROADCAST SIGNAL TRANSMITTER/RECEIVER AND BROADCAST SIGNAL TRANSMITTING/RECEIVING METHOD

(71) Applicant: LG ELECTRONICS INC., Seoul (KR)

(72) Inventors: Sangchul Moon, Seoul (KR); Seoyoung Back, Seoul (KR); Woosuk Ko, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/265,265

(22) Filed: Sep. 14, 2016

(65) Prior Publication Data

US 2017/0005845 A1    Jan. 5, 2017

Related U.S. Application Data

(63) Continuation of application No. 13/993,958, filed as application No. PCT/KR2011/009534 on Dec. 12, 2011, now Pat. No. 9,484,993.

(Continued)

(51) Int. Cl.
*H04L 27/26* (2006.01)
*H04B 7/0413* (2017.01)
(Continued)

(52) U.S. Cl.
CPC ....... *H04L 27/2626* (2013.01); *H04B 7/0413* (2013.01); *H04B 7/0456* (2013.01);
(Continued)

(58) Field of Classification Search
CPC . H04L 27/2626; H04L 5/0023; H04L 5/0044; H04L 5/0053; H04L 1/0058;
(Continued)

(56) References Cited

U.S. PATENT DOCUMENTS 8,370,729 B2    2/2013 Ko et al.
8,542,774 B2    9/2013 Atungsiri
(Continued)

FOREIGN PATENT DOCUMENTS

WO    2008142419 A    11/2008

OTHER PUBLICATIONS

Atanes, P. et al., "MIMO performance f the next generation DVB-T," 2009 IEEE 69th Vehicular Technology Conference, pp. 1-5, Apr. 29, 2009.

(Continued)

*Primary Examiner* — Helene Tayong
(74) *Attorney, Agent, or Firm* — Dentons US LLP

(57) ABSTRACT

A method for transmitting broadcast signals in a transmitter includes encoding data for Physical Layer Pipes (PLPs), mapping the encoded data onto constellations according to modulation types, multi-input multi-output (MIMO) processing the mapped data for the MIMO processing by multiplying a rotation matrix with a pair of symbols of the mapped data and applying a phase rotation matrix to the multiplied symbols, time interleaving the MIMO processed data, building frames by mapping the time interleaved data, frequency-interleaving data in the built frames, modulating the frequency-interleaved data by an Orthogonal Frequency Division Multiplexing (OFDM) scheme, and transmitting the broadcast signals including the modulated data. The frames includes signaling information for signaling data in the frames. The signaling information includes information on a PLP identifier.

2 Claims, 48 Drawing Sheets

Related U.S. Application Data

(60) Provisional application No. 61/423,080, filed on Dec. 14, 2010, provisional application No. 61/436,170, filed on Jan. 25, 2011.

(51) Int. Cl.
| | | |
|---|---|---|
| *H04L 5/00* | (2006.01) | |
| *H04B 7/0456* | (2017.01) | |
| *H04B 7/06* | (2006.01) | |
| *H04L 1/00* | (2006.01) | |
| *H04L 25/03* | (2006.01) | |
| *H04W 52/32* | (2009.01) | |
| *H04W 52/42* | (2009.01) | |

(52) U.S. Cl.
CPC ............ *H04B 7/068* (2013.01); *H04B 7/0697* (2013.01); *H04L 5/0023* (2013.01); *H04L 5/0044* (2013.01); *H04L 5/0053* (2013.01); *H04L 1/0058* (2013.01); *H04L 25/03891* (2013.01); *H04W 52/322* (2013.01); *H04W 52/42* (2013.01)

(58) Field of Classification Search
CPC ............ H04L 25/03891; H04B 7/0413; H04B 7/0456; H04B 7/068; H04B 7/0697; H04W 52/322; H04W 52/42
USPC .......................................... 375/295
See application file for complete search history.

(56) References Cited

U.S. PATENT DOCUMENTS

| | | |
|---|---|---|
| 2009/0103649 A1 | 4/2009 | Vare et al. |
| 2009/0168909 A1 | 7/2009 | Stadelmeier et al. |
| 2009/0190677 A1 | 7/2009 | Jokela et al. |
| 2009/0207931 A1 | 8/2009 | Ohwatari et al. |
| 2010/0183057 A1 | 7/2010 | Lee et al. |
| 2011/0131464 A1 | 6/2011 | Ko et al. |
| 2011/0274200 A1 | 11/2011 | Lee et al. |
| 2011/0286535 A1* | 11/2011 | Ko .................. H04L 1/0041 375/259 |
| 2011/0299628 A1* | 12/2011 | Ko .................. H04L 1/0044 375/298 |
| 2011/0305300 A1* | 12/2011 | Ko .................. H04L 27/04 375/298 |
| 2012/0272117 A1 | 10/2012 | Stadelmeier et al. |

OTHER PUBLICATIONS

Gomez-Barquero, D. et al., "Scalable Video Coding for Mobile Broadcasting DVB Systems," 2010 IEEE International Conference of Multimedia and EXPO (ICME), pp. 510-515, Jul. 23, 2010.

ETSI EN 302 755 v1.1.1 ("Digital Video Broadcasting (DVB); Frame structure channel coding and modulation for a second generation digital terrestrial television broadcasting system (DVB-T2)") (Sep. 2009), European Telecommunication Standard Institute (ETSI), pp. 1-125).

* cited by examiner

FIG. 25
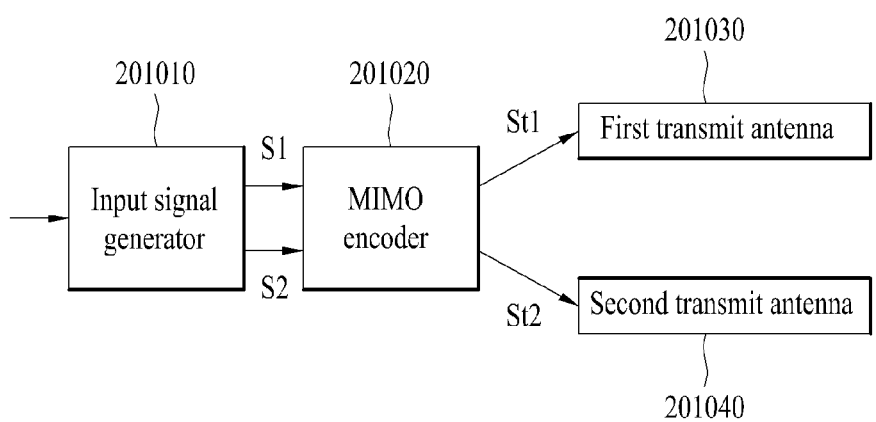
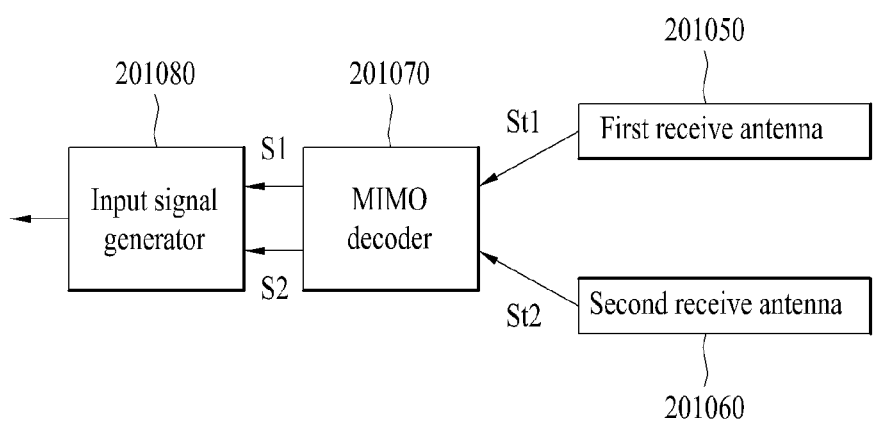

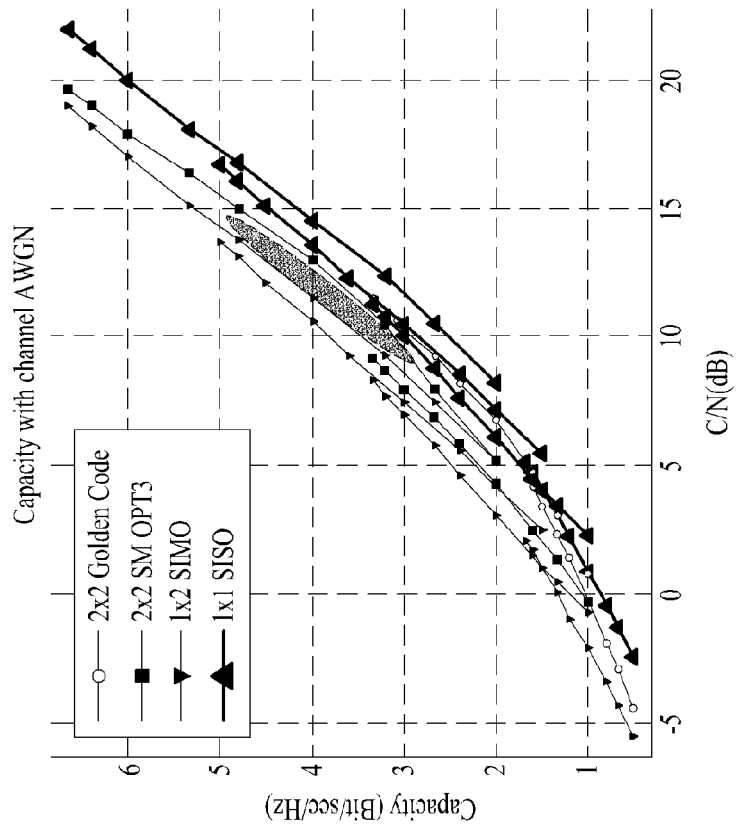
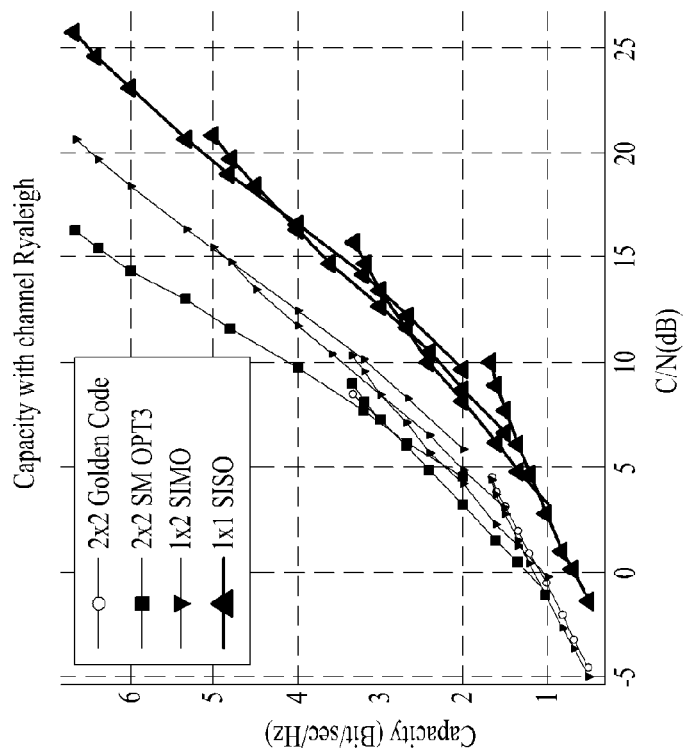
FIG. 41

BROADCAST SIGNAL TRANSMITTER/RECEIVER AND BROADCAST SIGNAL TRANSMITTING/RECEIVING METHOD

CROSS-REFERENCE TO RELATED APPLICATIONS

This application is a continuation of U.S. patent application Ser. No. 13/993,958 filed Jun. 13, 2013, now allowed, which is a National Phase of PCT/KR2011/009534 filed on Dec. 12, 2011, which claims priority under 35 U.S.C. 1199(e) to U.S. Provisional Application No. 61/423,080 filed on Dec. 14, 2010, and to U.S. Provisional Application No. 61/436,170 filed on Jan. 25, 2011, the contents of which are all hereby incorporated by reference herein in their entirety.

FIELD OF THE INVENTION

The present invention relates to a method for transceiving broadcast signals and an apparatus for transceiving broadcast signals, and more particularly, to a method for transceiving broadcast signals, which can enhance data transmission efficiency and is compatible with conventional methods for transceiving broadcast signals, and a transceiving apparatus thereof.

BACKGROUND ART

As analog broadcasting will soon end, a variety of technologies for transmitting and receiving digital broadcast signals has been developed. Digital broadcast signals can transmit a greater capacity of video/audio data than analog broadcast signals, and can include a variety of optional data in addition to video/audio data.

A digital broadcast system can provide High Definition (HD) images, multi-channel sound, and a variety of optional services. However, data transmission efficiency for high capacity data transmission, robustness of transmitting and receiving networks, and flexibility of networks in consideration of mobile receiving equipment are problems that should still be improved.

DETAILED DESCRIPTION OF THE INVENTION

Technical Problem

A technical object of the present invention is to provide a method and apparatus for transceiving broadcast signals, which can receive digital broadcast signals without error even under an indoor environment or using mobile receiving equipment.

Another technical object of the present invention is to provide a method and apparatus for transceiving broadcast signals, which can maintain compatibility with a conventional broadcast system in addition to achieving the above described objects.

Technical Solution

The object of the present invention can be achieved by providing a method for transmitting a broadcast signal including: generating a first input signal and a second input signal; outputting a first transmission signal and a second transmission signal by MIMO-encoding the first input signal and the second input signal; and OFDM-modulating each of the first transmission signal and the second transmission signal, wherein the MIMO encoding applies a MIMO matrix to the first input signal and the second input signal, the MIMO matrix changes a phase using a phase rotation matrix, and adjusts power of the first input signal and the second input signal using a parameter (a), where the parameter (a) is set to a different value according to a modulation type of the first input signal and the second input signal.

Effects of the Invention

According to the present invention, in a digital broadcast system, it is possible to enhance data transmission efficiency and increase robustness in terms of transmission and reception of broadcast signals, by virtue of provision of a MIMO system.

Further, according to the present invention, in a digital broadcast system, it is possible to decode MIMO receiving signals efficiently using MIMO processing of the present invention even under a diverse broadcast environment.

In addition, according to the present invention, a broadcast system using MIMO of the present invention can achieve the above described advantages while maintaining compatibility with a conventional broadcast system not using MIMO.

Further, according to the present invention, it is possible to provide a method and apparatus for transceiving broadcast signals, which can receive digital broadcast signals without error even under an indoor environment or using mobile reception equipment.

BRIEF DESCRIPTION OF THE DRAWINGS

FIG. 25 illustrates a MIMO transceiving system according to an embodiment of the present invention.

FIG. 41 is a capacity/SNR chart showing performances according to combinations of modulation schemes in the MIMO encoding method according to the third embodiment of the present invention.

BEST MODE FOR CARRYING OUT THE INVENTION

Figure 1:
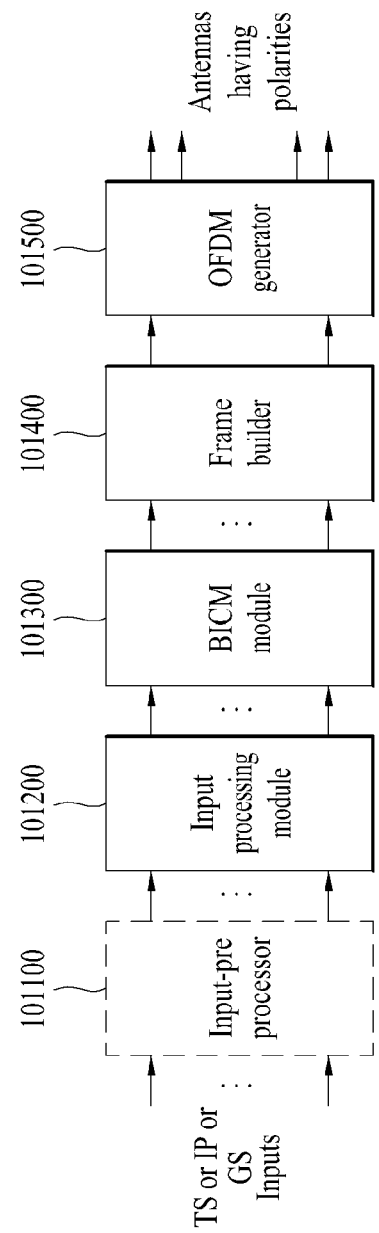
FIG. 1 shows a broadcast signal transmitter using MIMO according to an embodiment of the present invention.

Hereinafter, although the preferred embodiments of the present invention will be described in detail with reference to the accompanying drawings and contents as described with relation to the accompanying drawings, it is to be understood that the present invention is not limited to the embodiments.

Various technologies have been introduced to increase transmission efficiency and to perform robust communication in a digital broadcast system. One of such technologies is a method of using a plurality of antennas at a transmitting side or a receiving side. This method may be classified into a Single-Input Single-Output (SISO) scheme in which transmission is performed through a single antenna and reception is performed through a single antenna, a Single-Input Multi-Output (SIMO) scheme in which transmission is performed through a single antenna and reception is performed through multiple antennas, a Multi-Input Single-Output (MISO) scheme in which transmission is performed through multiple antennas and reception is performed through a single antenna, and a Multi-Input Multi-Output (MIMO) scheme in which transmission is performed through multiple antennas and reception is performed through multiple antennas. Although the multiple antennas may be exemplified by 2 antennas for ease of explanation in the following description, the description of the present invention may be applied to systems that use 2 or more antennas.

The SISO scheme corresponds to a general broadcast system that uses 1 transmission antenna and 1 reception antenna. The SIMO scheme corresponds to a broadcast system that uses 1 transmission antenna and a plurality of reception antennas.

The MISO scheme corresponds to a broadcast system that uses a plurality of transmission antennas and 1 reception antenna to provide transmit diversity. An example of the MISO scheme is an Alamouti scheme. In the MISO scheme, it is possible to receive data through 1 antenna without performance loss. Although a reception system can receive the same data through a plurality of reception antennas in order to improve performance, this case will be described as belonging to MISO cases in this specification.

A MIMO scheme corresponds to a broadcast system that uses a plurality of transmit (Tx) antennas and a plurality of receive (Rx) antennas to provide transmission/reception (Tx/Rx) diversity and high transmission efficiency. In the MIMO scheme, signals are processed in different ways in time and space dimensions and a plurality of data streams is transmitted through parallel paths that simultaneously operate in the same frequency band to achieve diversity effects and high transmission efficiency.

The performance of a system that employs the MIMO technology depends on characteristics of a transmission channel. The efficiency of such a system is high, especially, when the system has independent channel environments. That is, the performance of the system that employs the MIMO technology may improve when channels of all antennas ranging from antennas of the transmitting side and antennas of the receiving side are independent channels that have no correlation to each other. However, in a channel environment in which the correlations between channels of transmission and reception antennas are very high as in a line-of-sight (LOS) environment, the performance of the system that employs the MIMO technology may be significantly reduced or the system may not be able to operate.

In addition, if the MIMO scheme is applied to a broadcast system that uses the SISO and MISO schemes, it is possible to increase data transmission efficiency. However, in addition to the above problems, there is a need to maintain compatibility to allow a receiver having a single antenna to receive services. Accordingly, the present invention suggests a method for solving such existing problems.

In addition, the present invention can provide a broadcast signal transmitter/receiver and a broadcast transmission and reception method for a conventional terrestrial broadcast system and a system that can transmit and receive additional broadcast signals (or enhanced broadcast signals), for example, mobile broadcast signals, while sharing an RF frequency band with a terrestrial broadcast system such as DVB-T2.

To accomplish this, in the present invention, it is possible to use a video coding method having scalability in which a basic video component which has low image quality although it is robust to a communication environment and an extended video component which is slightly weak to a communication environment although it can provide a high-quality image can be distinguishably transmitted. Although the present invention will be described with reference to SVC as a video coding method having scalability, the present invention may be applied to any other video coding methods. Embodiment of the present invention will be described in more detail with reference to the drawings.

A broadcast signal transmitter and receiver of the present invention can perform MISO processing and MIMO processing on a plurality of signals that are transmitted and received through a plurality of antennas. The following is a description of a broadcast signal transmitter and receiver that performs signal processing on 2 signals that are transmitted and received through 2 antennas.

FIG. 1 shows a broadcast signal transmitter using MIMO according to an embodiment of the present invention.

As shown in FIG. 1, the broadcast signal transmitter according to the present invention may include an input processor 101100, an input processing module 101200, a Bit Interleaved Coded Modulation (BICM) encoder 101300, a frame builder 101400, and an Orthogonal Frequency-Division Multiplexing (OFDM) generator (or transmitter) 101500. The broadcast signal transmitter according to the present invention may receive a plurality of MPEG-TS streams or a General Stream Encapsulation (GSE) stream (or GS stream).

The input processor 101100 may generate a plurality of PLPs (physical layer pipes) on a service basis in order to give robustness to a plurality of input streams, i.e., a plurality of MPEG-TS streams or GSE streams.

PLPs are data units that are identified in the physical layer. Specifically, a PLP is data having the same physical layer attribute which is processed in the transmission path and may be mapped on a cell by cell basis in a frame. In addition, a PLP may be considered a physical layer Time Division Multiplexing (TDM) channel that carries one or a plurality of services. Specifically, a path through which such a service is transmitted is transmitted or a stream identifiable in the physical layer which is transmitted through the path is referred to as a PLP.

Thereafter, the input processing module 101200 may generate a Base Band (BB) frame including a plurality of generated PLPs. The BICM module 101300 may add redundancy to the BB frame to correct an error in a transmission channel and may interleave PLP data included in the BB frame.

The frame builder 101400 may accomplish a transmission frame structure by mapping the plurality of PLPs to a transmission frame and adding signaling information thereto. The OFDM generator 101500 may demodulate input data from the frame builder according to OFDM to divide the input data into a plurality of paths such that the input data is transmitted through a plurality of antennas.

Figure 2:
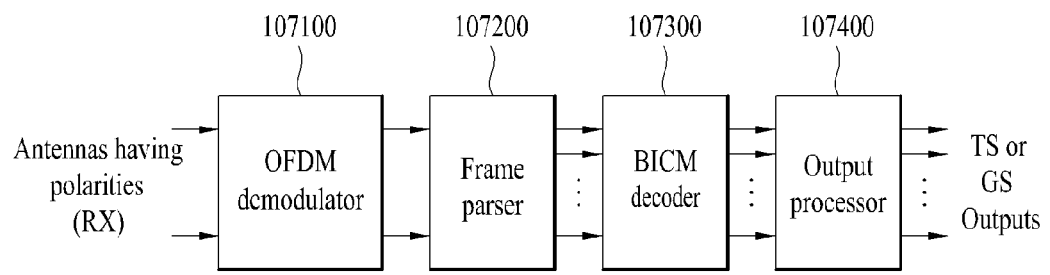
FIG. 2 shows a broadcast signal receiver according to an embodiment of the present invention.

FIG. 2 shows a broadcast signal receiver according to an embodiment of the present invention.

As shown in FIG. 2, the broadcast signal receiver may include an OFDM demodulator 107100, a frame parser 107200, a BICM decoder 107300, and an output processor 107400. The OFDM demodulator 107100 may convert signals received through a plurality of receive antennas into signals in the frequency domain. The frame parser 107200 may output PLPs for a necessary service from among the converted signals. The BICM decoder 107300 may correct an error generated according to a transmission channel. The output processor 107400 may perform procedures necessary to generate output TSs or GSs. Here, dual polarity signals may be input as input antenna signals and one or more streams may be output as the TXs or GSs.

Figure 3:
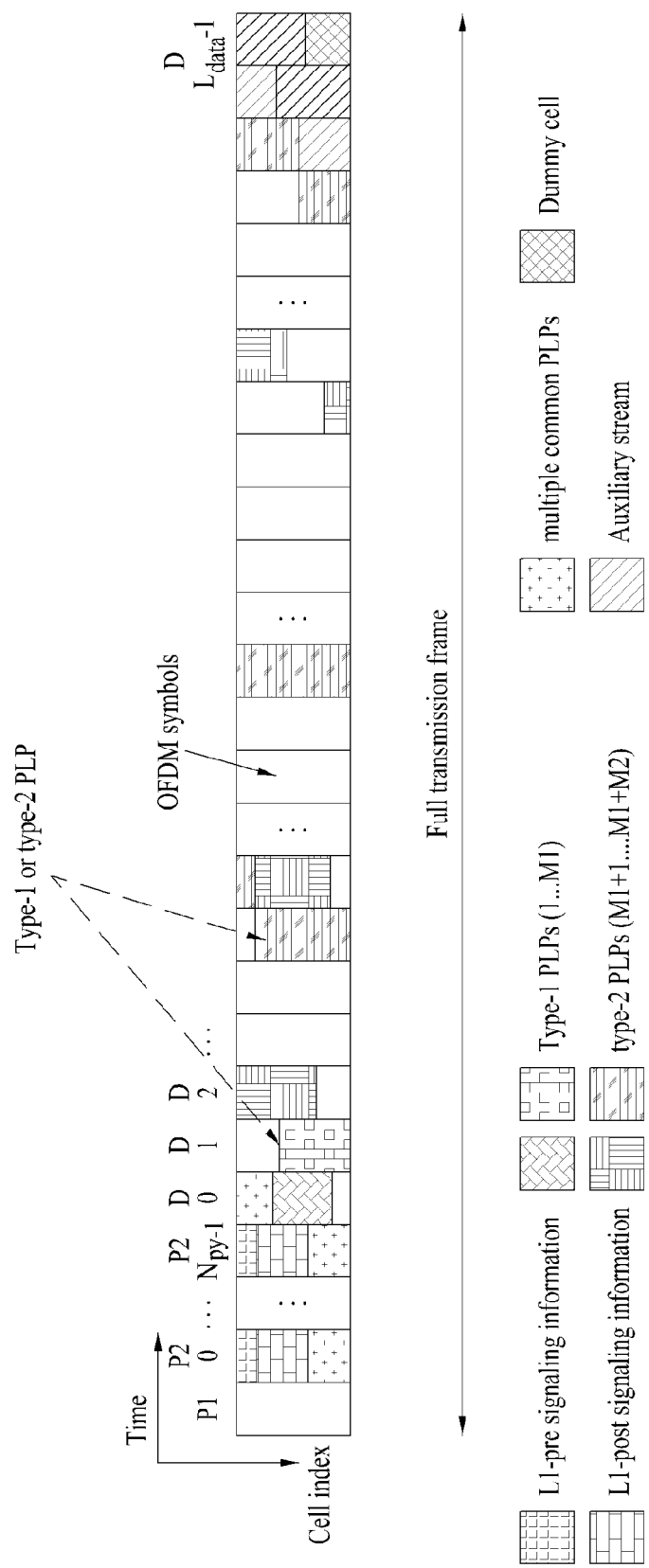
FIG. 3 shows an additional frame structure based on PLP according to an embodiment of the present invention.

FIG. 3 shows an additional frame structure based on PLP according to an embodiment of the present invention.

As shown in FIG. 3, a frame according to an embodiment of the present invention may include a preamble area and a data area. The preamble area may include a P1 symbol and a P2 symbol and the data area may include a plurality of data symbols. The P1 symbol may transmit P1 signaling information and P2 symbol may transmit L1-signaling information.

In this case, a preamble symbol may be additionally allocated to the preamble. This additional preamble symbol is referred to as an Additional Preamble 1 (AP1). In an embodiment of the present invention, one or more AP1 symbols may be added to a frame in order to improve detection performance of a mobile broadcast signal under very low SNR or time-selective fading conditions. AP1 signaling information transmitted through the AP1 symbol may include an additional transmission parameter.

AP1 signaling information according to an embodiment of the present invention includes pilot pattern information in a frame. Thus, according to an embodiment of the present invention the broadcast signal receiver does not transmit P2 symbol, if L1 signaling information is spread in data symbols of the data area, pilot pattern information can be discovered by using the AP1 signaling information before L1 signaling information in the data area is decoded.

Also, if the L1-signaling information in the data area of a frame is spread, AP1 signaling information can include information necessary for the broadcast signal receiver to decode signaling information spread in a frame of the data area. According to the present invention, a preamble area of a frame includes a P1 symbol, more than one AP1 symbols, and more than one P2 symbols. And the data area comprises a plurality of data symbols, also known as data OFDM symbol. A P2 symbol is optional and whether it is inserted is determined by signaling AP1 signaling information through AP1 symbols according to an embodiment of the present invention.

In an embodiment of the present invention, a P1 insertion module in the OFDM generator OFDM generator 101500 of the broadcast signal transmitter may insert the P1 symbol and the AP1 symbol into every symbol. That is, the P1 insertion module may insert 2 or more preamble symbols into every frame. In another embodiment, an AP1 insertion module may be added downstream of (or next to) the P1 insertion module and the AP1 insertion module may insert the AP1 symbol. If 2 or more preamble symbols are used as in the present invention, there are advantages in that robustness to burst fading that may occur in a mobile fading environment is further increased and signal detection performance is also improved.

The P1 symbol may transmit P1 signaling information associated with a basic transmission parameter and transmission type and a corresponding preamble identifier and the receiver may detect the frame using the P1 symbol. A plurality of P2 symbols may be provided and may carry L1 signaling information and signaling information such as a command PLP. The L1 signaling information may include L1-pre signaling information and L1-post signaling information, the L1-pre signaling information may include information necessary to receive and decode the L1-post signaling information. Also, the L1-post signaling information may include parameters necessary for the receiver to encode PLP data. As shown in FIG. 3, the L1-post signaling information may be located next to L1-pre signaling information.

The L1-post signaling information may include a configurable block, a dynamic block, an extension block, a cyclic redundancy check (CRC) block, and an L1 padding block.

The configurable block may include information equally applied to one transmission frame and the dynamic block may include characteristic information corresponding to a currently transmitted frame.

The extension block may be used when the L1-post signaling information is extended, and the CRC block may include information used for error correction of the L1-post signaling information and may have 32 bits. The padding block may be used to adjust sizes of information respectively included in a plurality of encoding blocks to be equal when the L1-post signaling information is transmitted while being divided into the encoding blocks and has a variable size.

The common PLP may include network information such as a NIT (Network Information Table) or PLP information and service information such as an SDT (Service Description Table) or an EIT (Event Information Table). The preamble of the present invention may include only the P1 symbol, the L1-pre signaling information, and the L1-post signaling information or may include all of the P1 symbol, the L1-pre signaling information, the L1-post signaling information, and the common PLP according to designer intention. A plurality of data symbols located next to the P1 symbol may include a plurality of PLPs. The plurality of PLPs may include audio, video, and data TS streams and PSI/SI information such as a Program Association Table (PAT) and a Program Map Table (PMT). In the present invention, a PLP that transmits PSI/SI information may be referred to as a base PLP or a signaling PLP. The PLPs may include a type-1 PLP that is transmitted through one sub-slice per frame and a type-2 PLP that is transmitted through two sub-slices per frame. The plurality of PLPs may transmit one service and may also transmit service components included in one service. When the PLPs transmit service components, the transmitting side may transmit signaling information which indicates that the PLPs transmit service components.

In addition, additional data (or an enhanced broadcast signal) in addition to basic data may be transmitted through a specific PLP while sharing an RF frequency band with the conventional terrestrial broadcast system according to an embodiment of the present invention. In this case, the transmitting side may define a system or a signal that is currently transmitted through signaling information of the P1 symbol described above. The following description is given with reference to the case in which the additional data is video data. That is, as shown in FIG. 3, PLP M1 112100 and PLP (M1+M2) 112200 which are type 2 PLPs may be transmitted while including additional video data. In addition, in the present invention, a frame that transmits such additional video data may be referred to as an additional frame and a frame that transmits basic data may be referred to as a basic frame (or T2 frame).

In addition, a frame that can transmit not only additional data but also data associated with a new broadcast system different from the conventional terrestrial broadcast system may be referred to as an additional frame. In this case, a frame that transmits a conventional terrestrial broadcast may be referred to as a terrestrial broadcast frame and an additional frame may transmit additional data or basic data associated with the new broadcast system.

Figure 4:
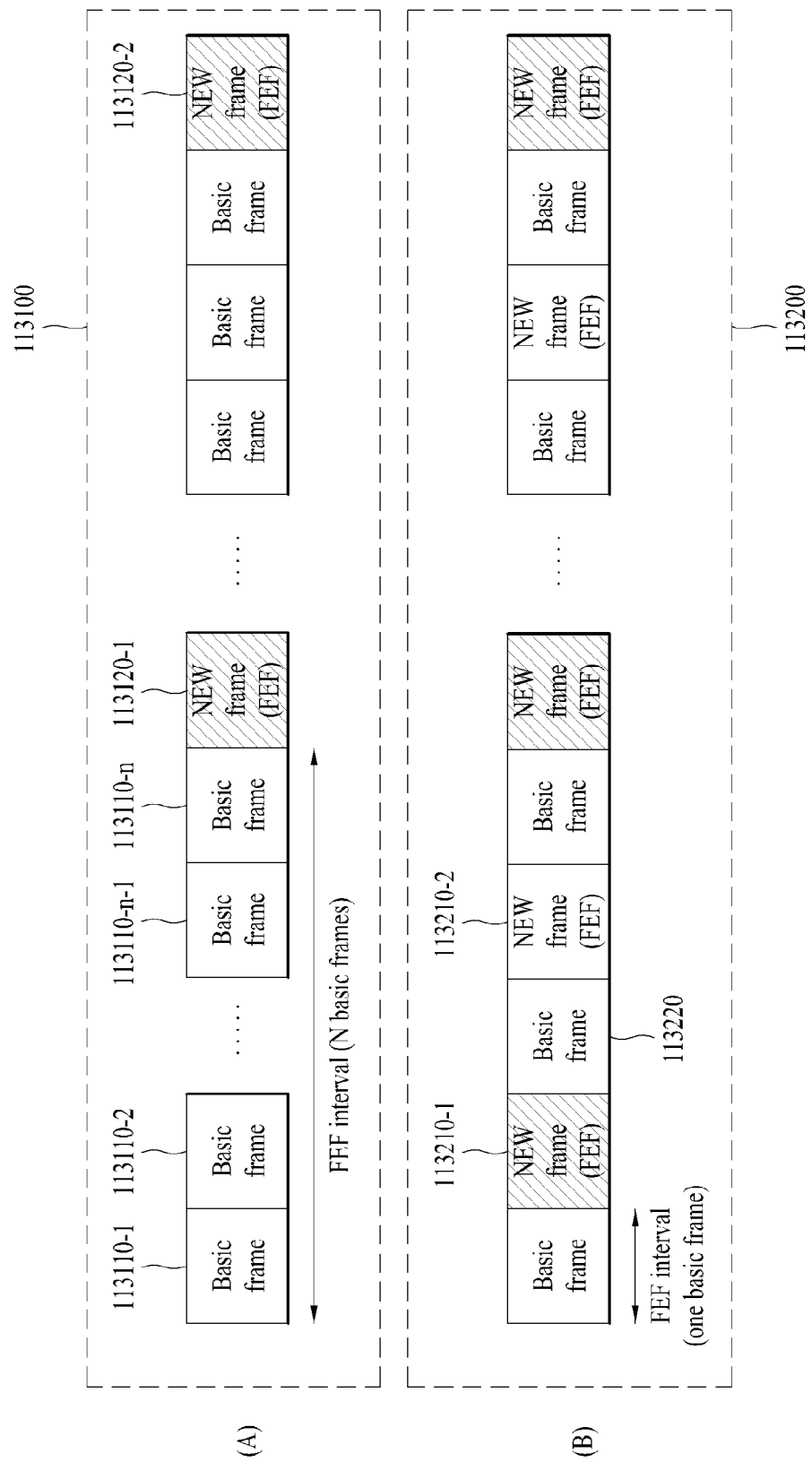
FIG. 4 shows an additional frame structure based on FEF according to an embodiment of the present invention.

FIG. 4 illustrates a structure of an additional frame based on FEF according to an embodiment of the present invention.

Specifically, FIG. 4 shows the case in which a Future Extension Frame (FEF) is used in order to transmit additional video data. In the present invention, a frame that transmits basic video data may be referred to as a basic frame and an FEF that transmits additional video data may be referred to as an additional frame.

FIG. 4 shows structures of superframes 11100 and 113200 in each of which a basic frame and an additional frame are multiplexed. Frames 113100-1 to 113100-n that are not shaded from among frames included in the superframe 113100 are basic frames and shaded frames 113120-1 and 113120-2 are additional frames.

FIG. 4(A) shows the case in which the ratio of basic frames to additional frames is N:1. In this case, the time required for the receiver to receive a next additional frame 113120-2 after receiving one additional frame 113120-1 may correspond to N basic frames.

FIG. 4(B) shows the case in which the ratio of basic frames to additional frames is 1:1. In this case, the proportion of additional frames in the superframe 113200 may be maximized and therefore the additional frames may have a structure very similar to that of the basic frames in order to maximize the extent of sharing with the basic frames. In addition, in this case, the time required for the receiver to receive a next additional frame 113210-2 after receiving one additional frame 113210-1 corresponds to 1 basic frame 113220 and therefore the superframe period is shorter than that of FIG. 4(A).

Figure 5:
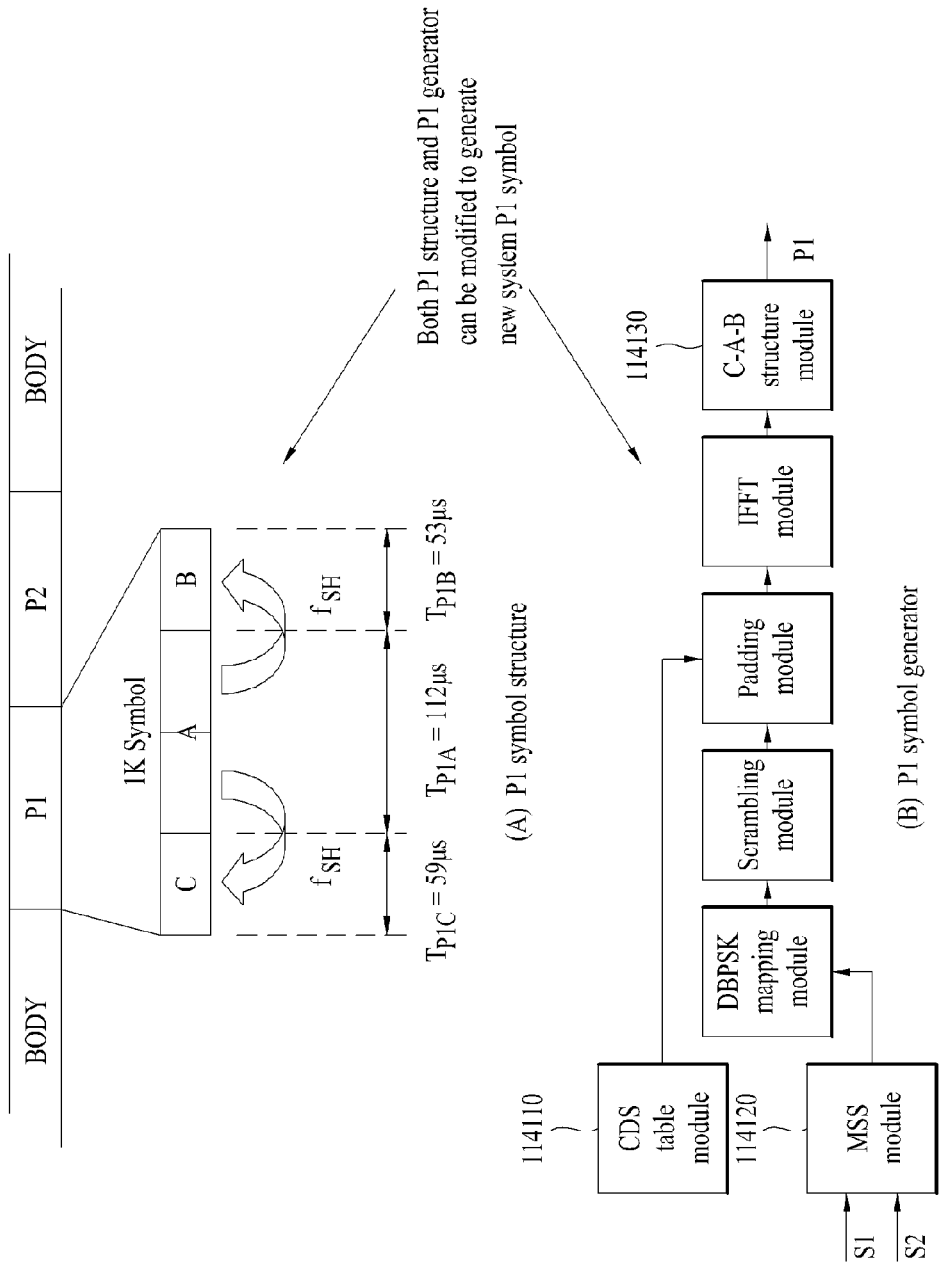
FIGS. 5(A) and 5(B) show a process of generating a P1 symbol in order to perceive an additional frame according to an embodiment of the present invention.

FIGS. 5(A) and 5(B) illustrate a P1 symbol generation procedure for identifying additional frames according to an embodiment of the present invention.

In the case in which additional video data is transmitted through additional frames which are distinguished from basic frames as shown in FIG. 4, there is a need to transmit additional signaling information for enabling the receiver to identify and process an additional frame. An additional frame of the present invention may include a P1 symbol for transmitting such additional signaling information and the P1 symbol may be referred to as a new_system_P1 symbol. This new_system_P1 symbol may be different from a P1 symbol that is used in a conventional frame and a plurality of new_system_P1 symbols may be provided. In an embodiment, the new_system_P1 symbol may be located before a first P2 symbol in a preamble area of the frame.

In the present invention, a P1 symbol of a conventional frame may be modified and used to generate the minimum Hamming distance. The present invention suggests a method in which a minimum Hamming distance is generated by modifying the structure of the P1 symbol of the conventional frame or is generated by changing the symbol generator 114100 that generates symbols.

FIG. 5(A) shows the structure of the P1 symbol of the conventional frame. In the present invention, the structure of the P1 symbol of the conventional frame shown in FIG. 5(A) may be modified to generate a minimum Hamming distance. In this case, the minimum Hamming distance may be generated by changing a frequency displacement f_SH for the prefix and postfix of the conventional P1 symbol or changing the length (specifically, the size of T_P1C or T_P1B) of the P1 symbol. However, in the case in which the minimum Hamming distance is generated by modifying the structure of the P1 symbol, there is a need to appropriately modify parameters (the sizes of T_P1C and T_P1B and f_SH) used in the P1 symbol structure.

FIG. 5(B) shows the P1 symbol generator that generates P1 symbols. In the present invention, the P1 symbol generator shown in FIG. 5(B) may be modified to generate a minimum Hamming distance. In this case, a minimum Hamming distance may be generated using a method which changes the distribution of active carriers used for a P1 symbol in a CDS table module 114110, an MSS module 114120, and a C-A-B structure module 114130 included in the P1 symbol generator (for example, a method in which the CDS table module 114110 uses a different Complementary Set of Sequence (CSS)) or a method which changes a pattern for information that is transmitted through a P1 symbol (for example, a method in which the MSS module 114120 uses a different Complementary Set of Sequence (CSS)).

In addition, the AP1 symbol of the present invention described above with reference to FIG. 3 may be generated through the procedure described above with reference to FIG. 5.

In addition, the present invention proposes a MIMO system using scalable video coding (SVC). SVC is a video coding method developed to cope with a variety of terminals and communication environments and variations in the terminals and communication environments. SVC can code a video hierarchically such that desired definition is generated and transmit additional video data having a base layer from which video data about an image having basic definition can be restored and an enhancement layer from which an image having higher definition can be restored. Accordingly, a receiver can acquire the basic definition image by receiving and decoding only the video data of the base layer, or obtain the higher definition image by decoding the video data of the base layer and the video data of the enhancement layer according to characteristics thereof. In the following description, the base layer can include video data corresponding to the base layer and the enhancement layer can include video data corresponding to the enhancement layer. In the following, video data may not be a target of SVC, the base layer can include data capable of providing a fundamental service including basic video/audio/data corresponding to the base layer, and the enhancement layer can include data capable of providing a higher service including higher video/audio/data corresponding to the enhancement layer.

The present invention proposes a method of transmitting the base layer of SVC through a path through which signals can be received according to SISO or MISO using SVC and transmitting the enhancement layer of SVC through a path through which signals can be received according to MIMO in the broadcast system of the present invention. That is, the present invention provides a method by which a receiver having a single antenna acquires an image with basic definition by receiving the base layer using SISO or MISO and a receiver having a plurality of antennas acquires an image with higher definition by receiving the base layer and the enhancement layer using MIMO.

A description will be given of a method of transmitting the MIMO broadcast data including the base layer and the enhancement layer in association with terrestrial broadcast frames for transmitting terrestrial broadcast signals.

(1) Method of Transmitting MIMO Broadcast Data Using Predetermined PLP

It is possible to transmit the MIMO broadcast data included in a predetermined PLP while distinguishing the predetermined PLP from a PLP including terrestrial broadcast data. In this case, the predetermined PLP is used to transmit the MIMO broadcast data, and signaling information for describing the predetermined PLP may be additionally transmitted to prevent an error in the conventional receiving system. In the following, the predetermined PLP including the MIMO broadcast data may be referred to as a MIMO broadcast PLP and the PLP including the terrestrial broadcast data may be referred to as a terrestrial broadcast PLP.

As MIMO broadcast data may not be implemented in a terrestrial broadcast receiver, it is necessary to have additional information for signalling to distinguish terrestrial PLP and MIMO broadcast PLP. In this case, signaling can use a reserved field in the L1 signaling information of the terrestrial broadcast system. When a plurality of antennas are used for transmitting MIMO broadcast data on the transmitting side, the terrestrial broadcast data can be transmitted by MISO. The present invention, in order to perceive PLP, utilizes L1-post signaling information.

(2) Method of Transmitting MIMO Broadcast Data Using Predetermined Frame

It is possible to include the MIMO broadcast data generated as described above in a predetermined frame and to transmit the predetermined frame including the MIMO broadcast data while distinguishing the predetermined frame from a terrestrial broadcast frame. In this case, the predetermined frame is used to transmit the MIMO broadcast data, and signaling information for describing the predetermined frame may be additionally transmitted to prevent an error in the conventional receiving system.

(3) Method of Transmitting MIMO Broadcast PLP Using Terrestrial Broadcast Frame and MIMO Broadcast Frame PLPs including MIMO broadcast data may be transmitted through a terrestrial broadcast frame and a MIMO broadcast frame. Since a MIMO broadcast PLP may be present in the terrestrial broadcast frame (or basic frame), distinguished from the above-mentioned embodiments, it is necessary to signal the relationship between connected PLPs present in the terrestrial broadcast frame and the MIMO broadcast frame. To achieve this, the MIMO broadcast frame may also include L1 signaling information, and information about the MIMO broadcast PLP present in the broadcast frame may be transmitted along with L1 signaling information of the terrestrial broadcast frame.

MIMO broadcast PLP data in different frames are connected by using PLP fields including L1-post signaling information. According to an embodiment of the present invention, the receiving system includes as L1-post signaling information PLP_ID information, PLP+TYPE information, PLP_PAYLOAD_TYPE information, PLP_GROYP_ID information, uses those information to check the PLP connection between MIMO broadcast PLP data. It then acquires services by continuously decoding desired MIMO broadcast PLP data.

The terrestrial broadcast PLP in the terrestrial broadcast frames can be transmitted as a preset mode and also as mentioned a new mode to support the MIMO system can be transmitted. According to an embodiment of the present invention, the MIMO broadcast PLP in the terrestrial broadcast frames as a base layer can be transmitted by MISO or SISO method and MIMO broadcast PLP in MIMO broadcast frames as an enhancement layer can be transmitted by the MIMO method.

Figure 6:
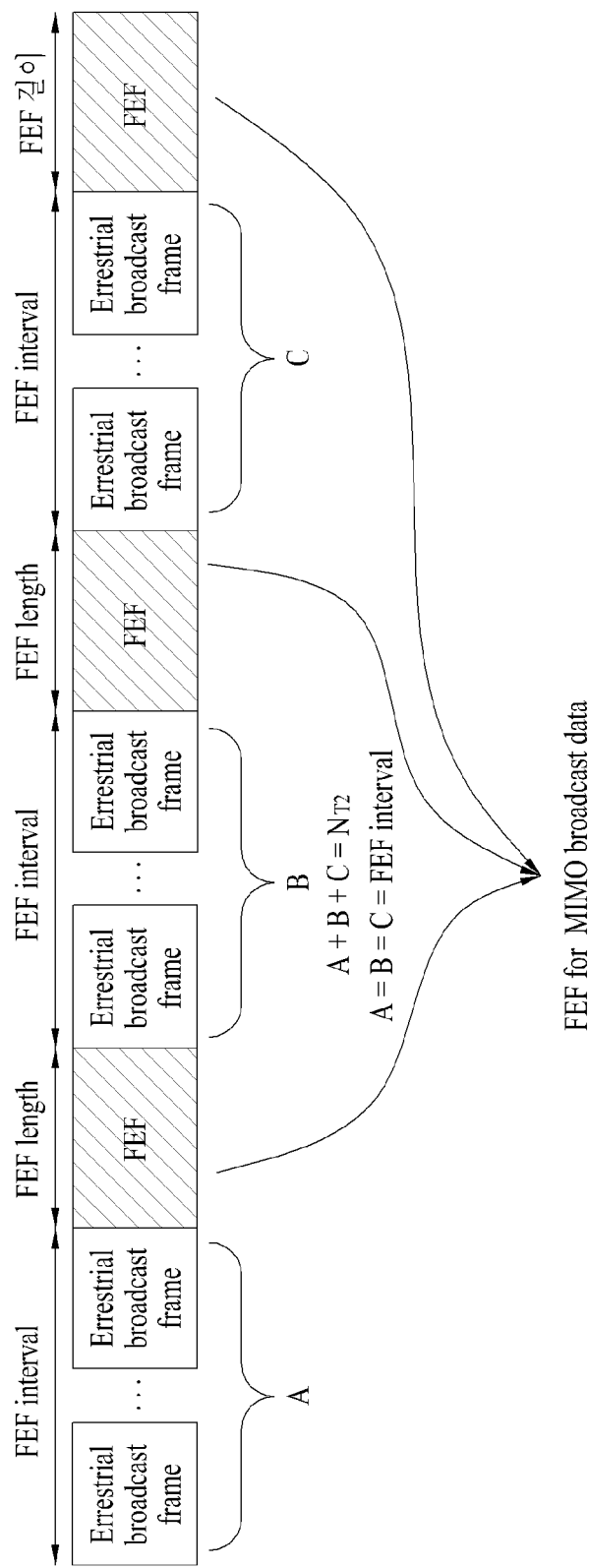
FIG. 6 shows a conceptual diagram of a broadcast signal transmitting method according to an embodiment of the present invention.

FIG. 6 shows a conceptual diagram for a method of transmitting broadcast signals.

As shown in FIG. 6, terrestrial broadcast data and MIMO broadcast data in frame units can be distinctively transmitted. The FEF length of a MIMO broadcast frame (FEF) can be allocated in between terrestrial broadcast frames in an FEF interval. In this case, MIMO system data can co-exist in a frequency band within the terrestrial broadcast system, and malfunction can be prevented by the broadcast signal receiver perceiving a frame through L1 signaling and ignoring MIMO broadcast frames. In that case, the MIMO system can use some of the throughput by FEF related parameters such as FEF_TYPR, FEF_LENGTH, FEF_INTERVAL defined by the L1-post signaling information.

Figure 7:
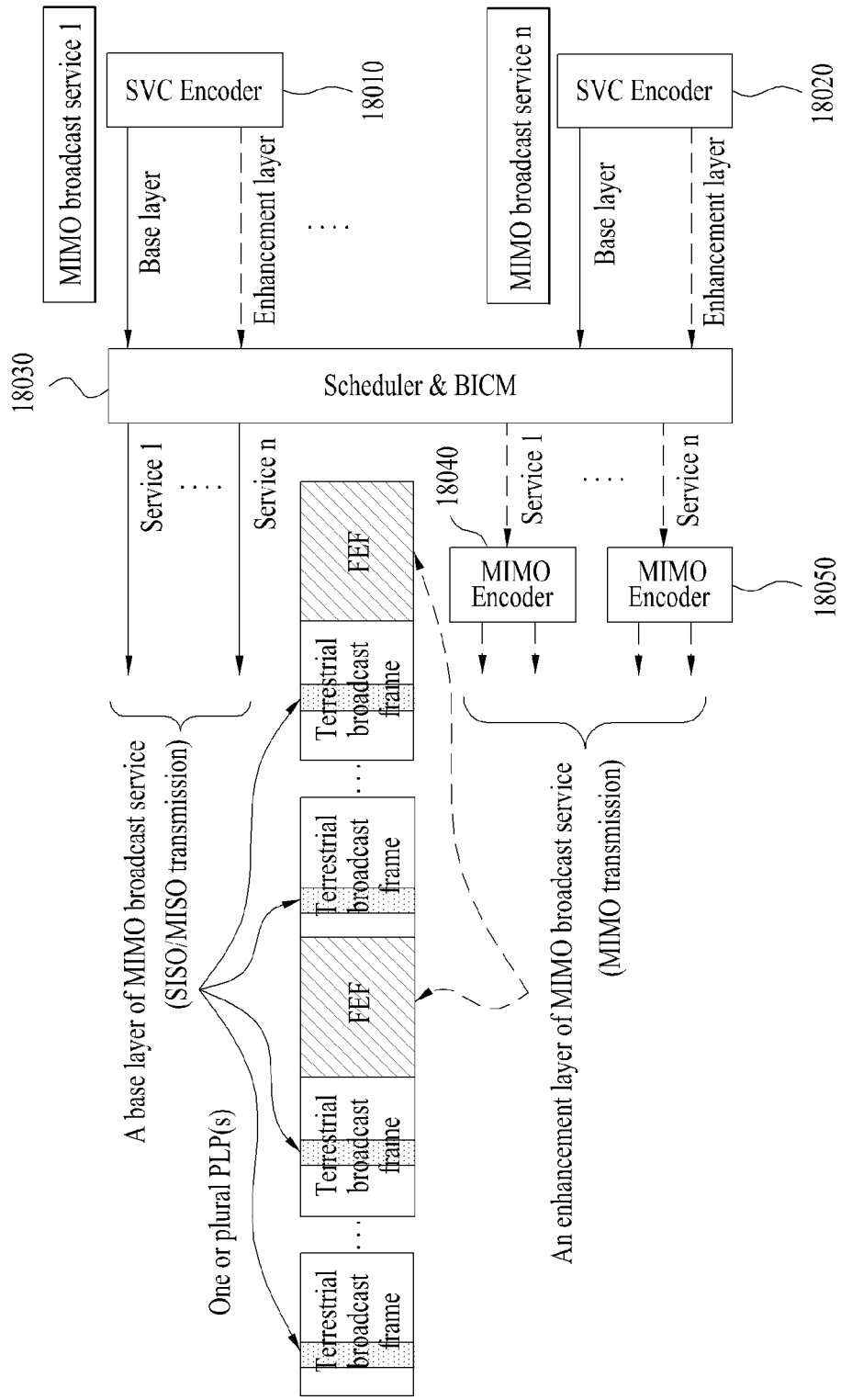
FIG. 7 shows a conceptual diagram of a broadcast signal transmitting method according to another embodiment of the present invention.

FIG. 7 shows a conceptual diagram for a broadcast signal transmitting method according to another embodiment of the present invention.

FIG. 7 indicates, as shown in the method 3, transmitting the broadcast signals of the MIMO broadcast system in terrestrial broadcast system. The MIMO broadcast services (MIMO broadcast service 1~n) encodes each SVC encoder (18010, 18020) through a base layer and enhancement layer. Scheduler&BICM (Bit Interleaved Coding and Modulation) module (18030) allocates the base layers of the MIMO broadcast services with the terrestrial broadcast frames and the enhancement layers with MIMO encoders (18040, 18050). The enhancement layers encodes by each MIMO encoder (18040, 18050) and transmits to the MIMO broadcast frame of the MIMO broadcast system. The base layers are transmitted in the terrestrial broadcast frames and in that case, SISO or MISO supported by the terrestrial broadcast system.

When broadcast signals including the terrestrial broadcast frames and the MIMO broadcast frames, as mentioned in the method 1 and 3, signaling information is created and the terrestrial broadcast receiver perceives terrestrial broadcast PLP in the terrestrial broadcast frames. Thus, the receiver can acquire the terrestrial broadcast services without malfunctioning. Also, the MIMO broadcast receiver can acquire and provide the MIMO broadcast service corresponding to the base layer only by the terrestrial broadcast frame. It can acquire and provide the MIMO broadcast service corresponding to the base layer and enhancement layer by acquiring the MIMO broadcast PLP of the terrestrial broadcast frame and MIMO broadcast frame of the MIMO broadcast frame.

The MIMO broadcast PLP in the terrestrial broadcast frame can only be transmitted by MISO/MIMO. In that case, the MIMO broadcast PLP, as the system demands, can include a code rate of new error correction codes (such as 1/4, 1/3, 1/2), and new time interleaving mode and can only transmit to a base layer.

The MIMO broadcast PLP of the MIMO broadcast frame includes PLP of the SISO, MISO, and MIMO methods. In that case, PLP of the SISO/MISO methods or a base layer in a carrier can be transmitted and PLP of the MIMO method or the carrier can transmit the enhancement layer. The rate of PLP of the SISO/MISO methods, or carrier and PLP of the MIMO method, or carrier can be varied from 0 to 100%. The ract can be determined for each frame accordingly.

Figure 8:
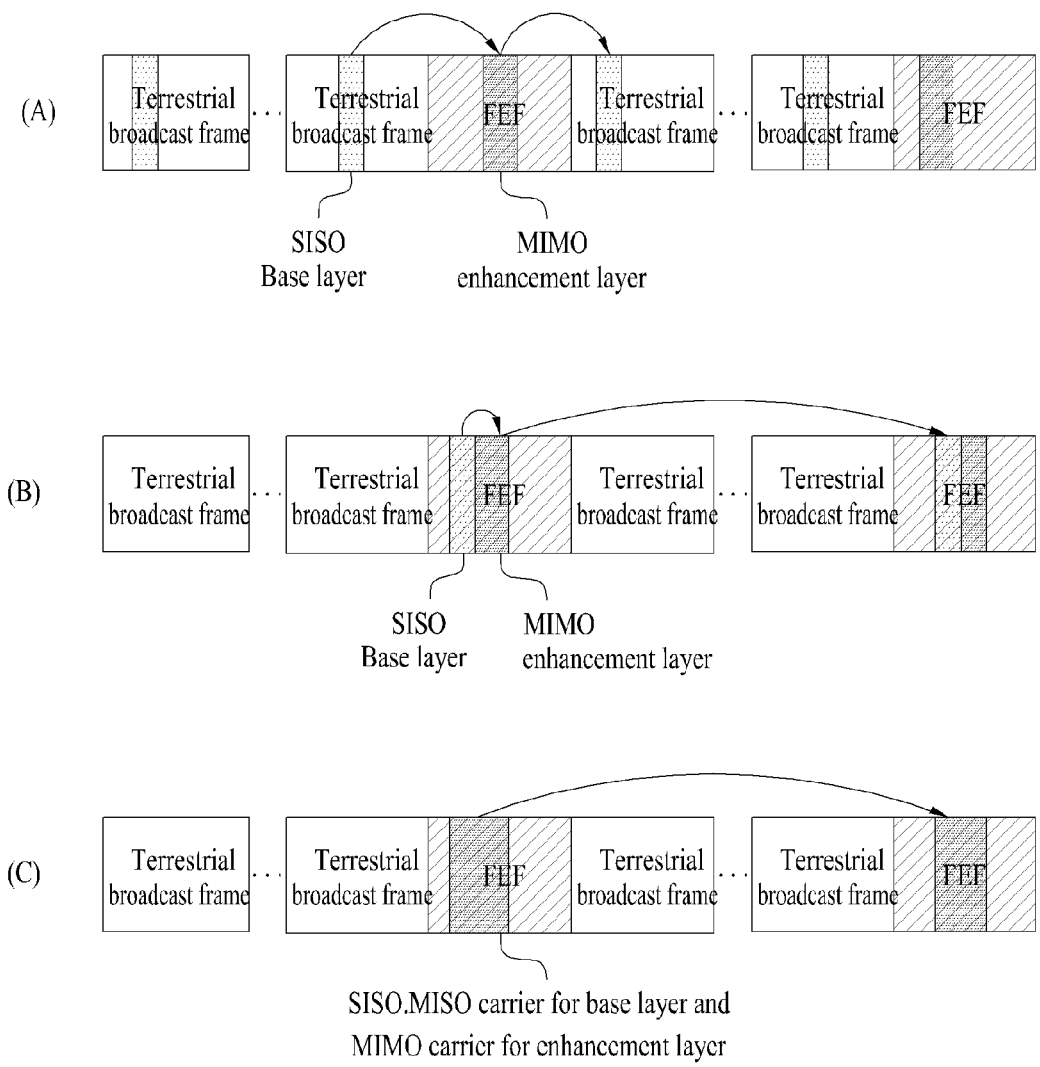
FIG. 8 shows a broadcast signal transmitted by a national broadcast system with a MIMO system applied using SVC.

FIG. 8 shows broadcast signals transmitted by a broadcast system being applied by a MIMO system using a SVC.

FIG. 8 shows a broadcast signal that allocates terrestrial data and MIMO broadcast data to a frame or PLP by using the SVC and generating a base and enhancement layer.

FIG. 8A shows a broadcast signal transmitted by a broadcast system being applied by a MIMO transmitting system by using the SVC.

The broadcast system in FIG. 8A transmits broadcast signals including a terrestrial broadcast frame and MIMO broadcast frame. The MIMO broadcast PLP in FIG. 8A can exist in a terrestrial broadcast frame or a MIMO broadcast frame. The MIMO broadcast PLP in the terrestrial broadcast frame as a base layer can be transmitted by the SISO or MISO method and the MIMO broad cast PLP in the MIMO broadcast frame as an enhancement layer can be transmitted by the SISO, MISO, or MIMO method.

FIG. 8B shows a broadcast signal being applied by a MIMO transmitting system using a SVC.

In FIG. 8B, the broadcast system transmits broadcast signals including the terrestrial broadcast frame and the MIMO broadcast frame. The MIMO broadcast PLP in FIG. 8B only exists in the MIMO broadcast frame. In that case, the MIMO broadcast PLP includes PLP with a base layer and PLP with an enhancement layer. The PLP with the base layer can be transmitted by the SISO or MISO method, and the PLP with the enhancement layer can be transmitted by the SISO, MISO, or MIMO method. The rate of the PLP with base layer and the PLP with enhancement layer can be varied from 0 to 100%.

FIG. 8C shows a broadcast signal transmitted by a broadcast system being applied by a MIMO transmitting system using a SVC.

The broadcast system of FIG. 8C transmits broadcast signals including terrestrial broadcast frames and MIMO broadcast frames. The MIMO broadcast data exists only in the MIMO broadcast frame. But, as opposed to FIG. 8B, a base layer and an enhancement layer are not transmitted by PLP but carriers.

Various technologies are introduced to improve transmission efficiency and perform robust communication in a digital broadcast system. One of the technologies is a method of using a plurality of antennas at a transmitting side or a receiving side. This method may be divided into SISO(Single-Input Single-Output), SIMO (Single-Input Multi-Output), MISO (Multi-Input Single-Output) and MIMO (Multi-Input Multi-Output). While multiple antennas are described as two antennas in the following, the present invention is applicable to systems using two or more antennas.

In an embodiment, MIMO can use spatial multiplexing (SM) and Golden code (GC) schemes, which will be described in detail.

A modulation scheme in broadcast signal transmission may be represented as M-QAM (Quadrature Amplitude Modulation) in the following description. That is, BPSK (Binary Phase Shift Keying) can be represented by 2-QAM when M is 2 and QPSK (Quadrature Phase Shift Keying) can be represented by 4-QAM when M is 4. M can indicate the number of symbols used for modulation.

A description will be given of a case in which a MIMO system transmits two broadcast signals using two transmit antennas and receives two broadcast signals using two receive antennas as an example.

Figure 9:
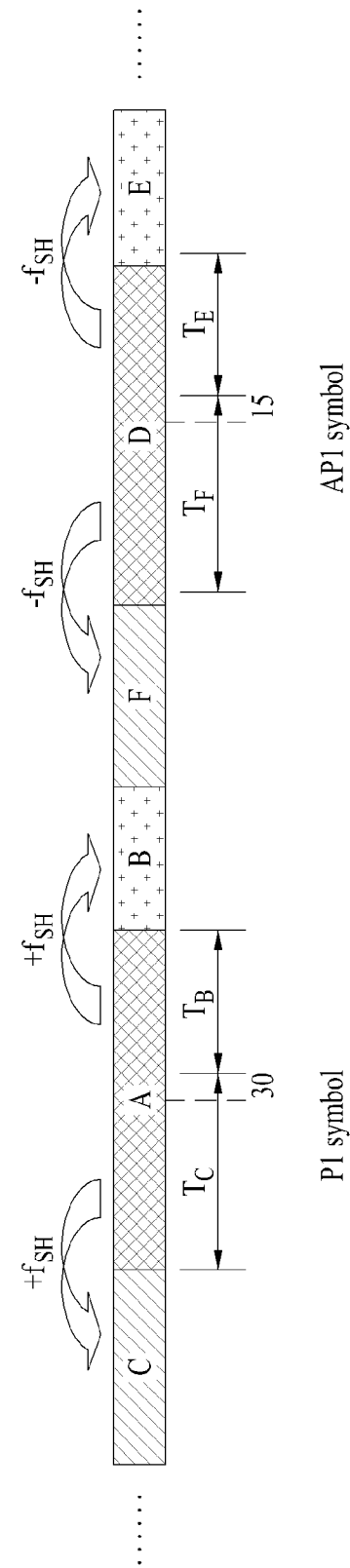
FIG. 9 shows a structure of a P1 symbol and AP1 symbol according to an embodiment of the present invention.

FIG. 9 shows an exemplary structure of a P1 symbol and an exemplary structure of an AP1 symbol according to an embodiment of the present invention.

P1 symbol is generated by having each of a front portion and an end portion of an effective (or valid) symbol copied, by having a frequency shift performed as much as $+f_{sh}$, and by having the frequency-shifted copies respectively positioned at a front portion (C) and an end portion (B) of the effective symbol (A). In the present invention, the C portion will be referred to as a prefix, and the B portion will be referred to as a postfix. More specifically, P1 symbol is configured of a prefix portion, an effective symbol portion, and a postfix portion.

In the same manner, AP1 symbol is generated by having each of a front portion and an end portion of an effective (or valid) symbol copied, by having a frequency shift performed as much as $-f_{sh}$, and by having the frequency-shifted copies respectively positioned at a front portion (F) and an end portion (E) of the effective symbol (D). In the present invention, the F portion will be referred to as a prefix, and the E portion will be referred to as a postfix. More specifically, AP1 symbol is configured of a prefix portion, an effective symbol portion, and a postfix portion.

Herein, the two frequency-shift values $+f_{sh}$, $-f_{sh}$, which are used in the P1 symbol and the AP1 symbol, may have the same absolute value yet be given opposite signs. More specifically, the frequency-shift is performed in opposite directions. And, the lengths C and F, which are copied to the front portion of the effective symbol, may be set to have different values. And, the lengths B and E, which are copied to the end portion of the effective symbol, may be set to have different values. Alternatively, the lengths C and F may be set to have different values, and the lengths B and E may be set to have the same value, or vice versa. According to another embodiment of the present invention, an effective symbol length of the P1 symbol and an effective symbol length of the AP1 symbol may be differently determined And, according to yet another embodiment of the present invention, a CSS (Complementary Set Sequence) may be used for tone selection and data scrambling within the AP1 may be scrambled by AP1.

According to the embodiment of the present invention, the lengths of C and F, which are copied to the front portion of the effective (or valid) symbol, may be set to have different values, and the lengths of B and E, which are copied to the end portion of the effective (or valid) symbol, may also be set to have different values.

The C,B,F,E lengths according to the present invention may be obtained by using Equation 1 shown below.

Length of $C(T_C)$={Length of $A(T_A)/2+30$}

Length of $B(T_B)$={Length of $A(T_A)/2-30$}

Length of $E(T_F)$={Length of $D(T_D)/2+15$}

Length of $E(T_E)$={Length of $D(T_D)/2-15$}  [Expression 1]

As shown in Equation 1, P1 symbol and AP1 symbol have the same frequency shift value. However, each of the P1 symbol and the AP1 symbol are given opposite signs. Additionally, in order to determine the lengths of C and B, the present invention determines an offset value being added to or subtracted from a value corresponding to the length of A ($T_A$)/2. And, in order to determine the lengths of F and E, the present invention determines an offset value being added to or subtracted from a value corresponding to the length of D ($T_D$)/2. Herein, each of the offset values is set up differently. According to the embodiment of the present invention, the offset value of P1 symbol is set to 30, and the offset value of AP1 symbol is set to 15. However, the values given in the above-described examples are merely exemplary. And, therefore, it will be apparent that the corresponding values may easily be varied or changed by anyone skilled in the art. Thus, the present invention will not be limited only to the values presented herein.

According to the present invention, by generating AP1 symbol and an AP1 symbol to configure the structure shown in FIG. 9, and by inserting the generated symbols to each signal frame, the P1 symbol does not degrade the detection performance of the AP1 symbol, and, conversely, the AP1 symbol does not degrade the detection performance of the P1 symbol. Additionally, the detection performance of the P1 symbol is almost identical to the detection performance of the AP1 symbol. Furthermore, by configuring the symbols so that the P1 symbol and the AP1 symbol have similar symbol structures, the complexity level of the receiver may be reduced.

At this point, the P1 symbol and the AP1 symbol may be transmitted consecutively, or each of the symbols may be allocated to different positions within the signal frame and may then be transmitted. And, in case the P1 symbol and AP1 symbol are each allocated to a different position within the signal frame, so as to be transmitted, a high time diversity effect may be gained with respect to the preamble symbol. According to the embodiment of the present invention, the P1 symbol and the AP1 symbol are consecutively transmitted. In that case, the AP1 symbol, according to FIG. 3, transmits information necessary for decoding signaling information spread in a pilot pattern or a frame of a data area. It can be generated in FIG. 5.

Figure 10:
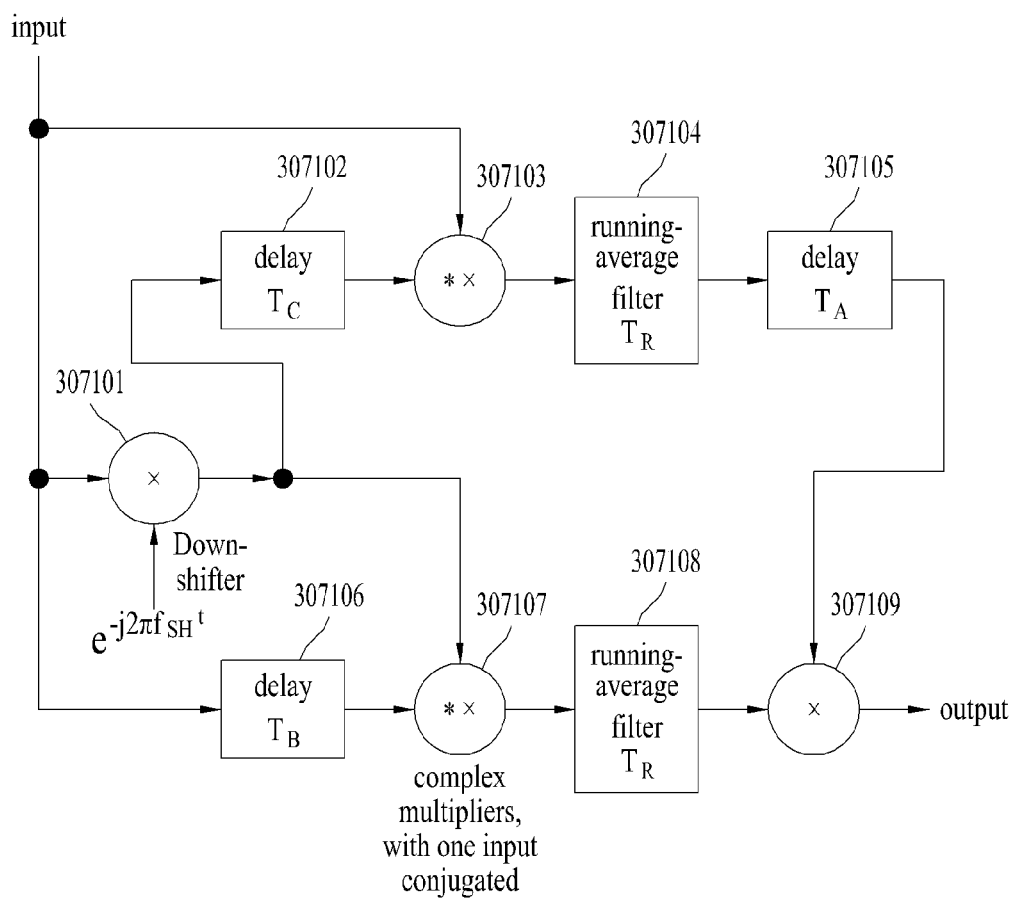
FIG. 10 shows a P1 symbol detection module according to an embodiment of the present invention.

FIG. 10 shows an exemplary structure of a P1 symbol detector according to an embodiment of the present invention.

The P1 symbol detector may be included in the OFDM demodulator (107100) explained in FIG. 2.

Herein, the P1 symbol detector may also be referred to as a C-A-B preamble detector. The P1 symbol detector may include down shifter (307101), $1^{st}$ conjugator (307103) and $2^{nd}$ delayer (307106).

The down shifter (307101) performs inverse modulation by multiplying $e^{-j2\pi f_{SH}n}$ by the input signal. When inverse modulation is performed by the down shifter (307101), the signal being frequency-shifted and inputted is recovered to the original signal. The inverse modulated signal may be outputted to a $1^{st}$ delayer (307102) and a $2^{nd}$ conjugator (307107).

The $1^{st}$ delayer (307102) delays the inverse-modulated signal by a length of part C ($T_C$) and then outputs the delayed signal to the $1^{st}$ conjugator (307103). The $1^{st}$ conjugator (307103) performs complex-conjugation on the signal, which is delayed by a length of part C ($T_C$). Then, the $1^{st}$ conjugator (307103) multiplies the input signal by the complex-conjugated signal, thereby outputting the processed signal to a $1^{st}$ filter (307104). The $1^{st}$ filter (307104) uses a running average filter having the length of $T_R=T_A$, so as to remove (or eliminate) any excessively and unnecessarily remaining modulation elements, thereby outputting the processed signal to a $3^{rd}$ delayer (307105). The $3^{rd}$ delayer (307105) delays the filtered signal by a length of part A (i.e., effective (or valid) symbol) ($T_A$), so as to output the delayed signal to a multiplier (307109).

The $2^{nd}$ delayer (307106) delays the input signal by a length of part B ($T_B$) and then outputs the delayed signal to the $2^{nd}$ conjugator (307107). The $2^{nd}$ conjugator (307107) performs complex-conjugation on the signal, which is delayed by a length of part B ($T_B$). Then, the $2^{nd}$ conjugator (307107) multiplies the complex-conjugated signal by an inverse-modulated signal, thereby outputting the processed signal to a $2^{nd}$ filter (307108). The $2^{nd}$ filter (307108) uses a running average filter having the length of $T_R=T_A$, so as to remove (or eliminate) any excessively and unnecessarily remaining modulation elements, thereby outputting the processed signal to the multiplier (307109).

The multiplier (307109) multiplies the output of the $2^{nd}$ filter (307109) by a signal, which is delayed by a length of part A ($T_A$). Thus, a P1 symbol may be detected from each signal frame of the received broadcast signal.

Herein, the length of part C ($T_C$) and the length of part B ($T_B$) may be obtained by applying Equation 1 shown above.

Figure 11:
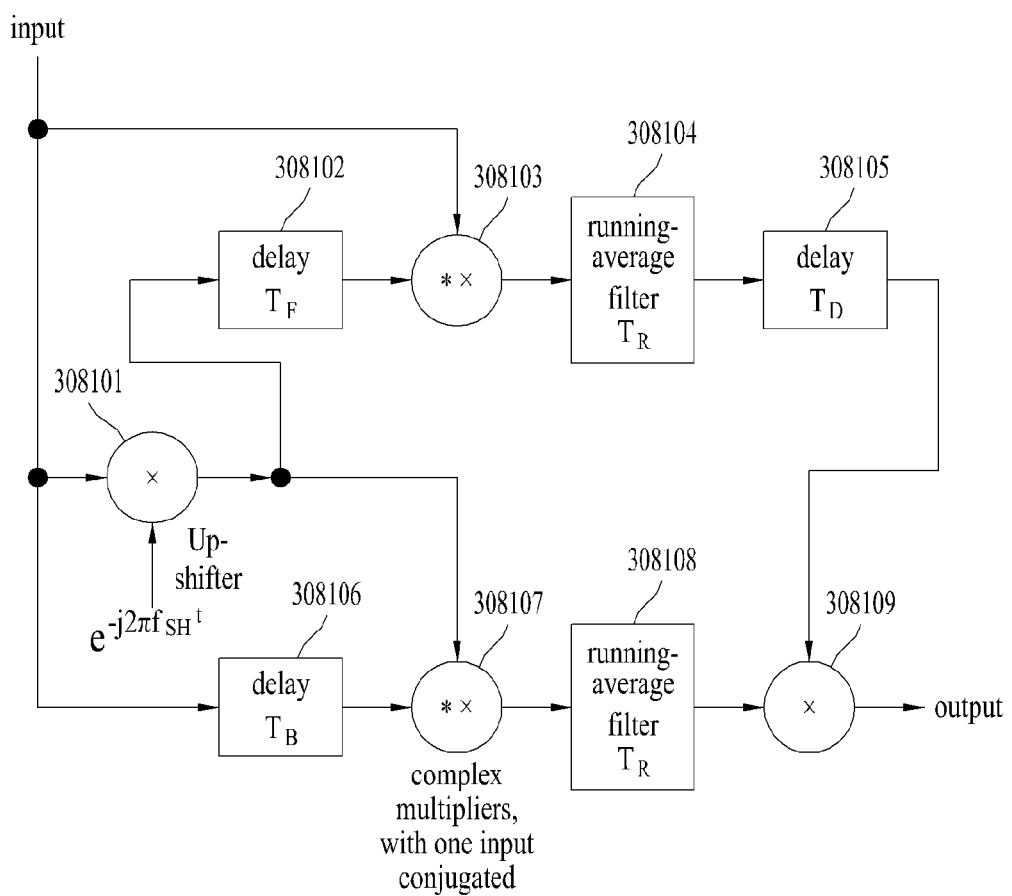
FIG. 11 shows an AP1 symbol detection module according to an embodiment of the present invention.

FIG. 11 shows an exemplary structure of an AP1 symbol detector according to an embodiment of the present invention.

The AP1 symbol detector may be included in the OFDM demodulator (107100) explained in FIG. 2.

Herein, the AP1 symbol detector may also be referred to as an F-D-E preamble detector. The AP1 symbol detector may include down shifter (308101), $1^{st}$ conjugator (308103) and $2^{nd}$ delayer (308106). The AP1 symbol detector may receive a signal inputted to broadcast signal receiver or a signal outputted from the P1 symbol detector explained in FIG. 10.

The up-shifter (308101) performs inverse modulation by multiplying $e^{j2\pi f_{SH}n}$ by the input signal. When inverse modulation is performed by the up-shifter (308101), the signal being frequency-shifted and inputted is recovered to the original signal. More specifically, the up-shifter (308101) of FIG. 47 has the same structure as the down-shifter (307101) of the P1 symbol detector (306601). However, the frequency direction of each inverse modulation process is completely opposite to one another. The signal that is inverse modulated by the up-shifter (308101) may be outputted to a $1^{st}$ delayer (308102) and a $2^{nd}$ conjugator (308107).

The $1^{st}$ delayer (308102) delays the inverse-modulated signal by a length of part F ($T_F$) and then outputs the delayed signal to the $1^{st}$ conjugator (308103). The $1^{st}$ conjugator (308103) performs complex-conjugation on the signal, which is delayed by a length of part F ($T_F$). Then, the $1^{st}$ conjugator (308103) multiplies the input signal by the complex-conjugated signal, thereby outputting the processed signal to a $1^{st}$ filter (308104). The $1^{st}$ filter (308104) uses a running average filter having the length of $T_R=T_D$, so as to remove (or eliminate) any excessively and unnecessarily remaining modulation elements, thereby outputting the processed signal to a $3^{rd}$ delayer (308105). The $3^{rd}$ delayer (308105) delays the filtered signal by a length of part D (i.e., effective (or valid) symbol) ($T_D$), so as to output the delayed signal to a multiplier (308109).

The $2^{nd}$ delayer (308106) delays the input signal by a length of part E ($T_E$) and then outputs the delayed signal to the $2^{nd}$ conjugator (308107). The $2^{nd}$ conjugator (308107) performs complex-conjugation on the signal, which is delayed by a length of part E ($T_E$). Then, the $2^{nd}$ conjugator (308107) multiplies the complex-conjugated signal by an inverse-modulated signal, thereby outputting the processed signal to a $2^{nd}$ filter (308108). The $2^{nd}$ filter (308108) uses a running average filter having the length of $T_R=T_D$, so as to remove (or eliminate) any excessively and unnecessarily remaining modulation elements, thereby outputting the processed signal to the multiplier (308109).

The multiplier (308109) multiplies the output of the $2^{nd}$ filter (308109) by a signal, which is delayed by a length of part D ($T_D$). Thus, an AP1 symbol may be detected from each signal frame of the received broadcast signal. Herein, the length of part F ($T_F$) and the length of part E ($T_E$) may be obtained by applying Equation 1 shown above.

As shown in FIG. 3, a frame according to an embodiment of the present invention comprises a preamble area and a data area. The preamble are comprises a P1 and P2 and there can be a plurality of data symbols in the data area. Also, as the designer intends, there can be an AP1 in the preamble area.

Then, P1 signaling information is transmitted by the P1 symbol, the AP1 signaling information is transmitted by the AP1 symbol, and L1-pre and L1-post signaling information is transmitted by the P2 symbol.

An embodiment of a broadcast signal transmitter or receiver for MIMO processing is as follows.

The broadcast signal transmitter comprises as shown in FIG. 1 an input processor 101200, a BICM encoder 101300, a frame builder 101400, and an OFDM generator 101500. Also, the broadcast signal receiver, as shown in FIG. 2, comprises an OFDM demodulator 107100, a frame demapper 107200, a BICM decoder 107300, and an output processor 1073400.

The input processor 101200 of the broadcast signal transmitter executes FEC encoding for transmitting data in a form of block. The BICM encoder 101300 performs encoding for correcting errors. The frame builder 101400 performs mapping data in a frame, and the OFDM generator 101500 performs OFDM demodulating in the frame-mapped data into symbol units and transmit the data. Devices in the broadcast signal receiver can perform reverse-functioning corresponding to the counterpart devices in the transmitter.

The present invention suggests a broadcast signal transmitter or receiver that independently applies MISO or MIMO processing for each PLP from a plurality of PLP inputs. According to the present invention, the present invention can effectively adjust the quality of service (QOS) or services from PLP in a physical layer.

Four embodiments for performing MISO/MISO processing in a plurality of signals from the transmitter and receiver through a plurality of antennas are as follows. Individual embodiments can be distinguished from each other according to whether MISO/MIMO processing for each PLP is processed or according to the position of MISO/MIMO processing. A brief description of individual embodiments is as follows.

A first embodiment is about a broadcast signal transmitter or a corresponding receiver independently performing MISO or MIMO processing for each PLP data input during a BICM encoding process.

A second embodiment is about another broadcast signal transmitter or a corresponding receiver independently performing MISO or MIMO processing for each PLP data input during a BICM encoding process.

A third embodiment is about a broadcast signal transmitter or a corresponding receiver independently performing MISO or MIMO processing for mapped PLP data input during a OFDM generating process.

A fourth embodiment is about a broadcast signal transmitter or a corresponding receiver independently performing MISO or MIMO processing for each PLP data input during a BICM encoding process, wherein an OFDM generator performs MISO processing in MISO PLP data and L1-signaling information.

In more detail, the BICM encoder of the broadcast signal transmitter according to the first embodiment performs MISO encoding or MIMO encoding in PLP data after constellation-mapping, cell interleaving, and time interleaving. Also, the BICM decoder of the broadcast signal transmitter according to the first embodiment can reverse the whole process. According to the second embodiment, the BICM encoder of the broadcast signal transmitter according to the second embodiment performs MISO encoding or MIMO encoding in PLP data after constellation-mapping, and then performs cell interleaving and time interleaving. Also, the BICM decoder of the broadcast signal transmitter according to the second embodiment can reverse the whole process.

According to the third embodiment, the OFDM generator of the broadcast signal transmitter performs MISO or MIMO encoding in PLP data transmitted from a frame builder. In addition, an OFDM demodulator of the broadcast signal receiver according to a third embodiment of the present invention may perform a reverse process of the OFDM generator of the broadcast transmitter.

According to the fourth embodiment, the BICM encoder of the broadcast signal transmitter according to the fourth embodiment performs MISO encoding or MIMO encoding in PLP data after time interleaving or constellation-mapping. Also, the OFDM generator of the broadcast signal transmitter performs MISO encoding in MISO PLP data for MISO processing and L1-signaling information. The BICM decoder of the broadcast signal receiver and the OFDM demodulator of the broadcast signal transmitter according to the fourth embodiment can reverse the whole process.

A broadcast signal transmitter/receiver according to each embodiment is as follows. The broadcast signal transmitter/receiver can perform MIMO processing for a plurality of signals through a plurality of antennas. The broadcast signal transmitter/receiver with two signals by two antennas is described below.

Figure 12:
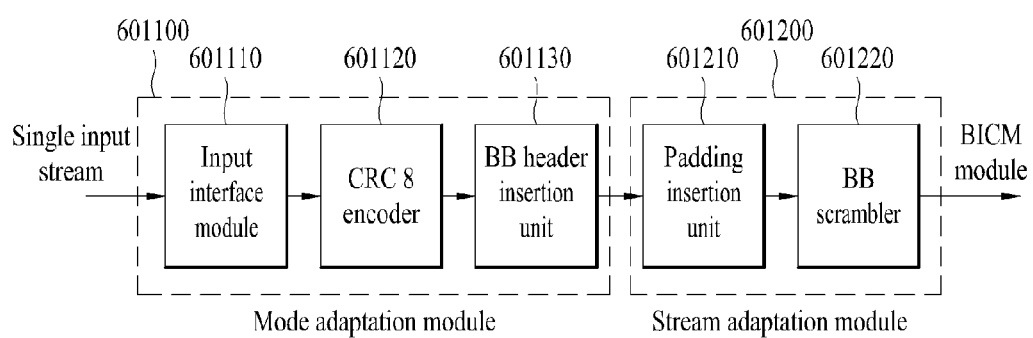
FIG. 12 shows an input processor of a broadcast signal transmitter according to an embodiment of the present invention.
Figure 13:
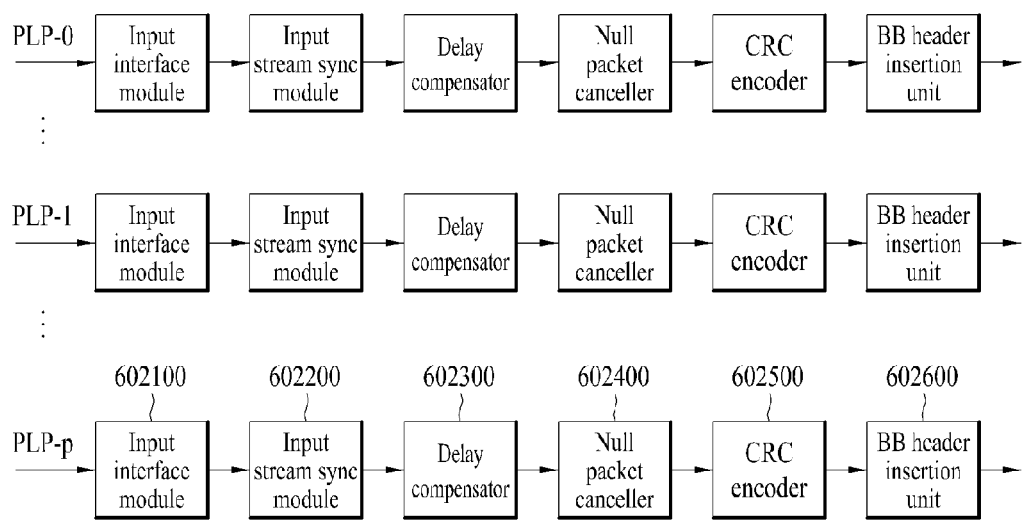
FIG. 13 shows a mode adaption module implementing a plurality of PLP as an input processor according to an embodiment of the present invention.

FIG. 12 and FIG. 13 show an input process that the broadcast signal transmitter comprises in common. Further description is as follows.

FIG. 12 shows an input processor of the broadcast signal transmitter according to an embodiment.

The input process 101200 in FIG. 1 is shown as an embodiment in FIG. 13 performing only one PLP. The input processor in FIG. 12 comprises a mode adaptation module 601100 and a stream adaptation module 601200. The mode adaptation module 601100 further comprises an input interface module 601110, a CRC-8 encoder 601120 and a BB header insertion module 601130, wherein a stream adaptation module 1020 comprises a padding insertion module 601210 and a BB scrambler 601220.

The input interface module 601110 in the input processor performing a single PLP performs mapping by distinguishing the input bit stream in a logical unit to perform FEC (BCH/LDPC) encoding at the end of the BICM encoder. The CRC-9 encoder 601120 performs CRC encoding in the mapped bit stream and a BB header insertion module 1050 inserts a BB header in the data field. In that case, the BB header includes all adaptation type (TS/GS/IP) information, user packet length information, and data field length.

Also, if the input data does not have a BB frame for FEC encoding, the stream adaptation block 601200 generates a padding insertion unit and a Pseudo Random Binary Sequence (PRBS) and includes a BB scrambler 601220 randomizing data computed by the PRBS and XOR. Such a move by the BB scrambler 601220 can ultimately lower the Peak-to-Average Power Ratio of the OFDM-modulated signal.

FIG. 13 shows a mode adaptation module implementing a plurality of PLP as an input processor according to an embodiment of the present invention.

FIG. 13 shows a mode adaptation module as an input processor of the broadcast signal transmitter performing a plurality of PLP. The mode adaptation module in FIG. 14 comprises a plurality of input interface modules 602100 performing mode adaptation for each PLP in parallel, an input stream synchronizer 602200, a compensating delay module 602300, null packet deletion module 602400, a CRC-0 encoder 602500, and a BB header insertion unit 602600. The description of the input interface module 6021000, the CRC-8 encoder 602500 and the BB header insertion unit 602600 is omitted.

The input stream synchronizer 602200 inserts timing information necessary for restoring input stream clock reference information (ISCR), transport stream (TS) or generic stream (GS). The compensating delay module 602300 synchronizes a group of PLP based on the timing information. The null packet deletion module (602400) deletes null packet that is unnecessarily transmitted and inserts the number of the deleted null packets based on the deleted position.

Figure 14:
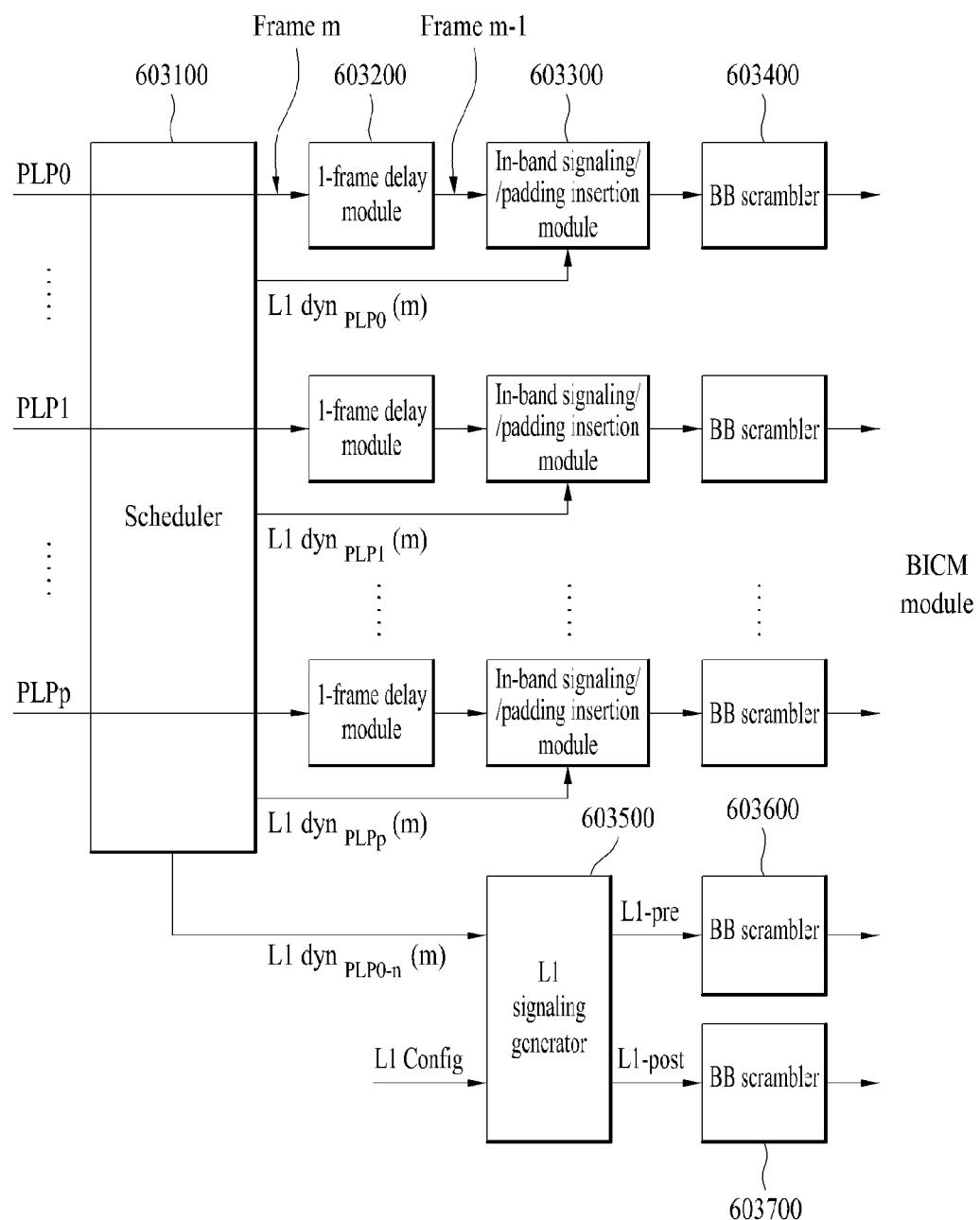
FIG. 14 shows a stream adaption module implementing a plurality of PLP as an input processor according to an embodiment of the present invention.

FIG. 14 shows a stream adaptation module implementing a plurality of PLP as an input processor according to an embodiment of the present invention.

The stream adaptation module in FIG. 14 receives PLP-based data in which mode adaptation of FIG. 13 was performed from the mode adaptation module of FIG. 13, such that it can perform stream adaptation as shown in the following description.

The scheduler 603100 performs scheduling for the MIMO transmitting system using a plurality of antennas including dual polarity and generates parameters for a demultiplexer, a cell interleaver, a time interleaver. Also, the scheduler 603100 transmits L1-dynamic signaling information for the current frame besides in-band signaling, and performs cell mapping based on the scheduling.

Figure 29:
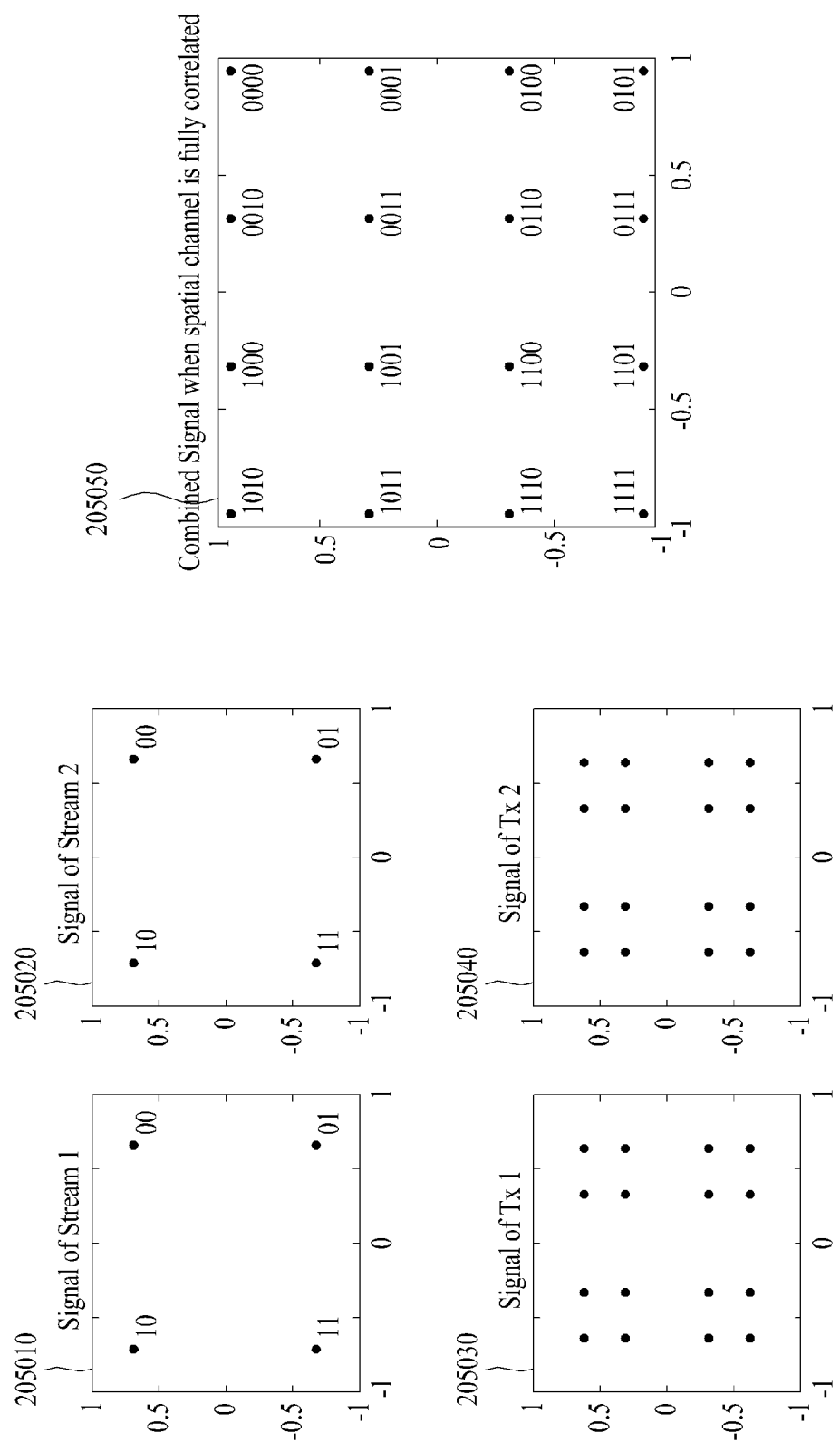
FIG. 29 illustrates input signals and a transmitted/received signal on which a MIMO encoding method according to an embodiment of the present invention has been performed.

A plurality of a 1-frame delay module 603200 executing a plurality of PLP delays one frame so that scheduling information of the next frame for in-band signaling can be included in the current frame. A plurality of in-band signaling/padding insertion module inserts L1-dynamic signaling information to the delayed data. Also, if there is any room for padding, the in-band signaling/padding insertion module 603300 inserts padding bits and in-band signaling information into the padding area. And, the BB scrambler 603400 generates a pseudo random binary sequence (PRBS) as shown in FIG. 29 and randomizes the data by computing the PRBS with XOR.

The stream adaptation module in FIG. 14 generates L1-signaling information transmitted by the preamble symbol of the frame or the spread data symbol. Such L1-signaling information includes L1-pre signaling information and L1-post signaling information. The L1-pre signaling information includes parameters necessary for performing the L1-post signaling information and static L1-signaling information, and the L1-post signaling information includes the static L1-signaling information and dynamic L1-signaling information. The L1-signaling generator 603500 can transmit the generated L1-pre signaling information and L1-post signaling information. The transmitted L1-pre signaling information and L1-post signaling information is scrambled by each BB scramble 603600, 603700. Also, according to another embodiment, the L1 signaling generator 603500 transmits L1-signaling information having L1-pre signaling and L1-post signaling information and scrambles L1-signaling information transmitted by one BB scrambler.

FIG. 15 to FIG. 18 shows a structure block of a broadcast signal transmitter according to an embodiment. Further description is as follows.

Figure 15:
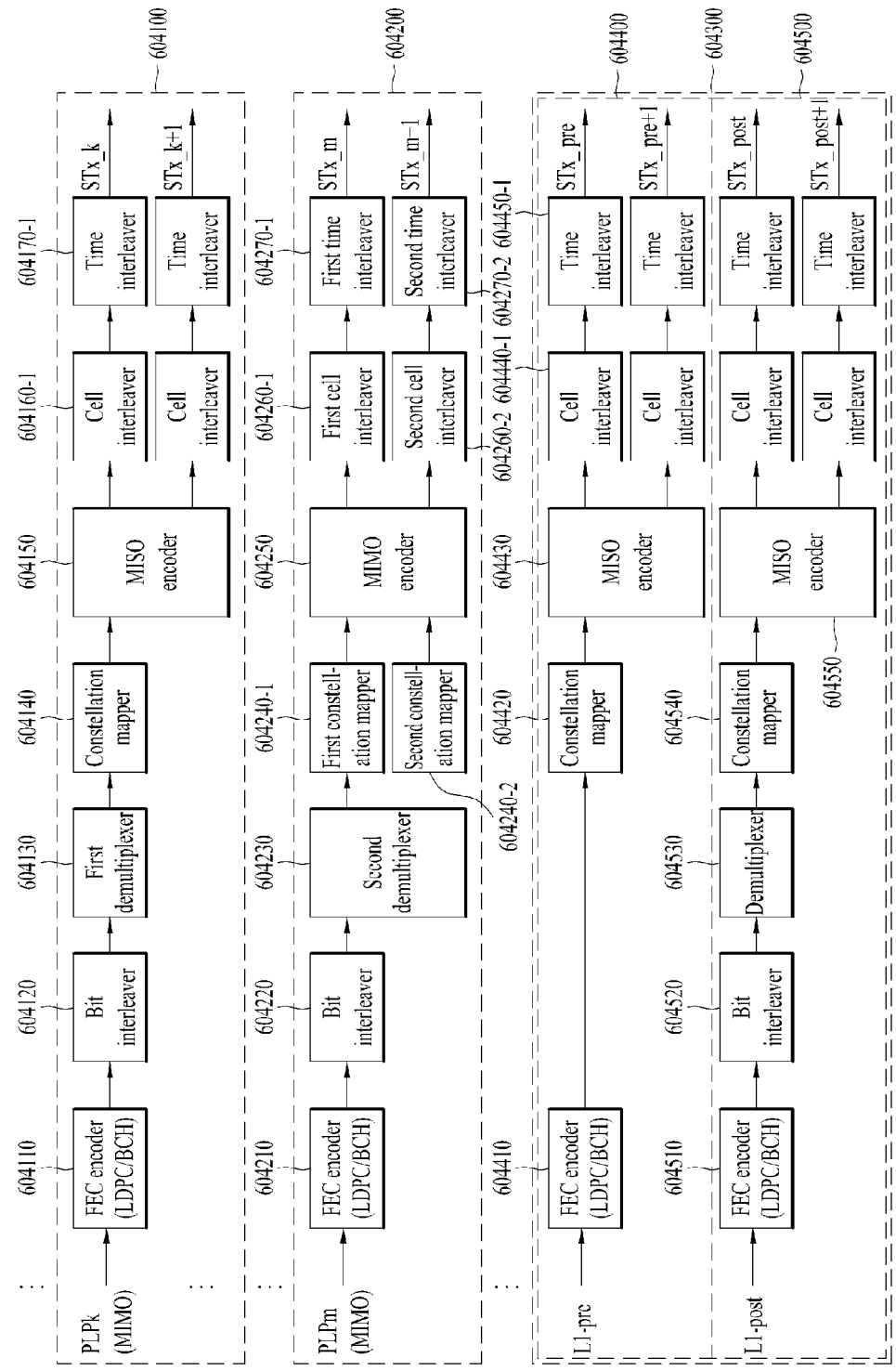
FIG. 15 shows a BICM encoder according to an embodiment of the present invention.

FIG. 15 shows a BICM encoder according to an embodiment of the present invention.

The BICM encoder shown in FIG. 15 is an embodiment of the BICM encoder 101300 in FIG. 1.

The BICM encoder according to the first embodiment performs bit-interleaving in a plurality of PLP data after performing input-processing, L1-pre signaling information, and L1-post signaling information, and encoding for correcting errors.

Also, the BICM encoder independently performs MISO or MIMO encoding in PLP data. In addition, the BICM encoder according to a first embodiment of the present invention may perform MISO encoding and MIMO encoding upon completion of constellation mapping.

The BICM encoder in FIG. 15 includes a first BICM encoding block 607100 performing MISO encoding in PLP data, a second BICM encoding block 607200 performing MIMO encoding in PLP data, and a third BICM encoding block 607300 performing MIMO encoding in signaling information. The third BICM encoding block 604300 performing MIMO encoding in signaling information. However, as the signaling information includes information necessary for restoring PLP data in a frame from the receiver, more robustness is required between the transmitter and receiver compared to PLP data. Thus, an embodiment of the present invention is the MISO process performing the signaling information. The description of data performing process for each block is as follows.

First, the first BICM encoding block 604100 includes a BICM encoder 604100, a FEC (Forward Error Correction) encoder 604110, a bit-interleaver 604120, a first demultiplexer 604130, a constellation mapper 604140, a MISO encoder 604150, a cell interleaver 604160-1, 604160-2 and a time interleaver 604170-1, 604170-2.

The FEC encoder 604110 performs BCH encoding and LDPC encoding in PLP data after performing input processing with redundancy to correct channel errors from the receiver. The bit-interleaver 604120 prepares to have robustness for bust errors by performing bit-interleaving in the FEC-encoded PLP data by each FEC block unit. In that case, the bit interleaver can perform bit interleaving by using two FEC block units. When using two FEC blocks, a pair of cell units may be generated from two different FEC blocks in the frame-builder. Thus, the broadcast signal receiver may improve the reception by ensuring the diversity of FEC blocks.

A first demultiplexer 604130 can perform demultiplexing in the bit-interleaved PLP data into one FEC block unit. In that case, the first demultiplexer 604130 uses two FEC blocks and performs demultiplexing. When using the two blocks, pairs of cells in the frame builder may be generated from different FEC blocks. Thus, the receiver can improve reception by ensuring the diversity of FEC blocks.

The constellation mapper 604140 performs mapping in the bit-demultiplexed PLP data into symbol units. In that case, the constellation mapper 604140 can rotate a certain angle depending on the modulation type. The rotated constellation mappers can be expressed in I-phase (In-phase) and Q-phase (Quadrature-phase), and the constellation mappers can delay only the Q-phase for a certain value. Then, the constellation mapper 604140 performs re-mapping in the In-phase element with the delayed Q-phase element.

The MISO encoder 604150 performs MISO encoding by using MISO encoding matrix in the time-interleaved PLP data and transmits MISO PLP data through two routes (STx_k, STxk+1). The present invention includes an OSTBC (Orthogonal Space-Time Block Code)/OSFBC(Orthogonal Space Frequency Block Code/Alamouti code) as an embodiment of a MISO encoding method.

The cell interleaver 604160-1, 604160-2 performs interleaving in the re-mapped data into cell units, and the time interleaver 604170-1, 604170-2 performs interleaving in the cell-interleaved PLP data into time units. In that case, the time interleaver 604160 uses two FEC blocks for interleaving. Through this process, as pairs of cells are generated from two different FEC blocks, the receiver can improve reception by ensuring the diversity of the FEC blocks.

The second BICM encoding block 604200 includes a FEC encoder 604210, a bit-interleaver 604220, a second demultiplexer 604230, a first constellation mapper 604240-1 and a second constellation mapper 604240-2, and a MIMO encoder 604250, a first cell interleaver 604260-1 and a second interleaver 604260-2, and a first time interleaver 604270-1 and a second cell interleaver 604270-2.

The FEC encoder 604210 and the bit-interleaver 604220 can perform the same function as the FEC encoder 604110 and the bit-interleaver 604120 of the MISO method.

The second demultiplexer 604230 can transmit the PLP data by demultiplexing to two routes necessary for MIMO transmission in addition to performing the same function as the first demultiplexer 604130 of the MISO method. In that case, the character of the data transmission for each route may be different. Thus, the second demultiplexer can randomly allocate the bit-interleaved PLP data into each route.

The first constellation mapper 604240-1 and the second constellation mapper 604240-2 can operate the same function as the constellation mapper 604140 of the MISO method.

The MIMO encoder 604270 performs MIMO encoding in the time-interleaved PLP data from by using MIMO encoding matrix and transmit MIMO PLP data to two routes (STx_m, STx_m+1). The MIMO encoding matrix of the present invention includes a spatial multiplexing, a Golden code (GC), a full-rate full diversity code, and a linear dispersion code.

The first cell interleaver 604260-1 and the second cell interleaver 604260-2 can perform cell-interleaving in only a half of the PLP data in one of the FEC blocks from the routes. Thus, the first cell interleaver 604260-1 and second cell interleaver 604260-2 can operate the same as the one cell interleaver. Also, in order to execute data from a plurality of routes, as the first cell interleaver 604260-1 and the second cell interleaver 604260-2 are not allocated additional memory, there is an advantage of performing cell interleaving by using the memory of the one cell interleaver.

The first time interleaver 604270-1 and the second time interleaver 604270-2 can operate the same as the time interleaver 604170-1, 604170-2 of the MISO method. In that case, the first time interleaver 604270-1 and the second time interleaver 604270-2 can be performed the same time interleaving or a different time interleaving.

L1-signaling information includes L1-pre signaling information and L1-post signaling information. It can independently perform MISO encoding in the L1-pre signaling information and L1-post signaling information.

Thus, the third BICM encoding block 604300 includes a first encoding block 604400 executing the L1-pre signaling information and the second encoding block 604500 executing the L1-post signaling information.

The first encoding block 604400 includes an FEC encoder 604410, a constellation mapper 604420, a MISO encoder 604430, cell interleavers 604440-1, 604440-2, and time interleavers 604450-1, 604450-2. The second encoding block 604500 includes a FEC encoder 604510, a bit interleaver 604520, demultuplexer 604530, a constellation mapper 604540, a MISO encoder 604560, cell interleavers 604560-1, 604560-2, and time interleavers 604570-1, 604570-2.

The L1-pre signaling information includes information necessary for decoding L1-post signaling information and the L1-post signaling information includes information necessary for restoring data transmitted from the receiver.

That is, the receiver needs to decode the L1-pre signaling information quickly and correctly for decoding the L1-signaling information and the data. Thus, the receiver of the present invention does not perform bit-interleaving and de-multiplexing for the L1-pre signaling information in order to perform the fast decoding.

The description of first encoding block 604400 and the second encoding block 604500 is omitted because they perform the same function as the first BICM block 604100.

As a result, to execute the L1-pre signaling information, the first encoding block 604400 performs MISO encoding in the L1-pre signaling information and transmits the free-signaling data to two routes (STx_pre, STx_pre+1). Also, to execute L1-post signaling information the second encoding block 604500 performs MISO encoding in the L1-post signaling information and transmits the L1-post signaling data to two routes (STx_post, STx_post+1).

Figure 16:
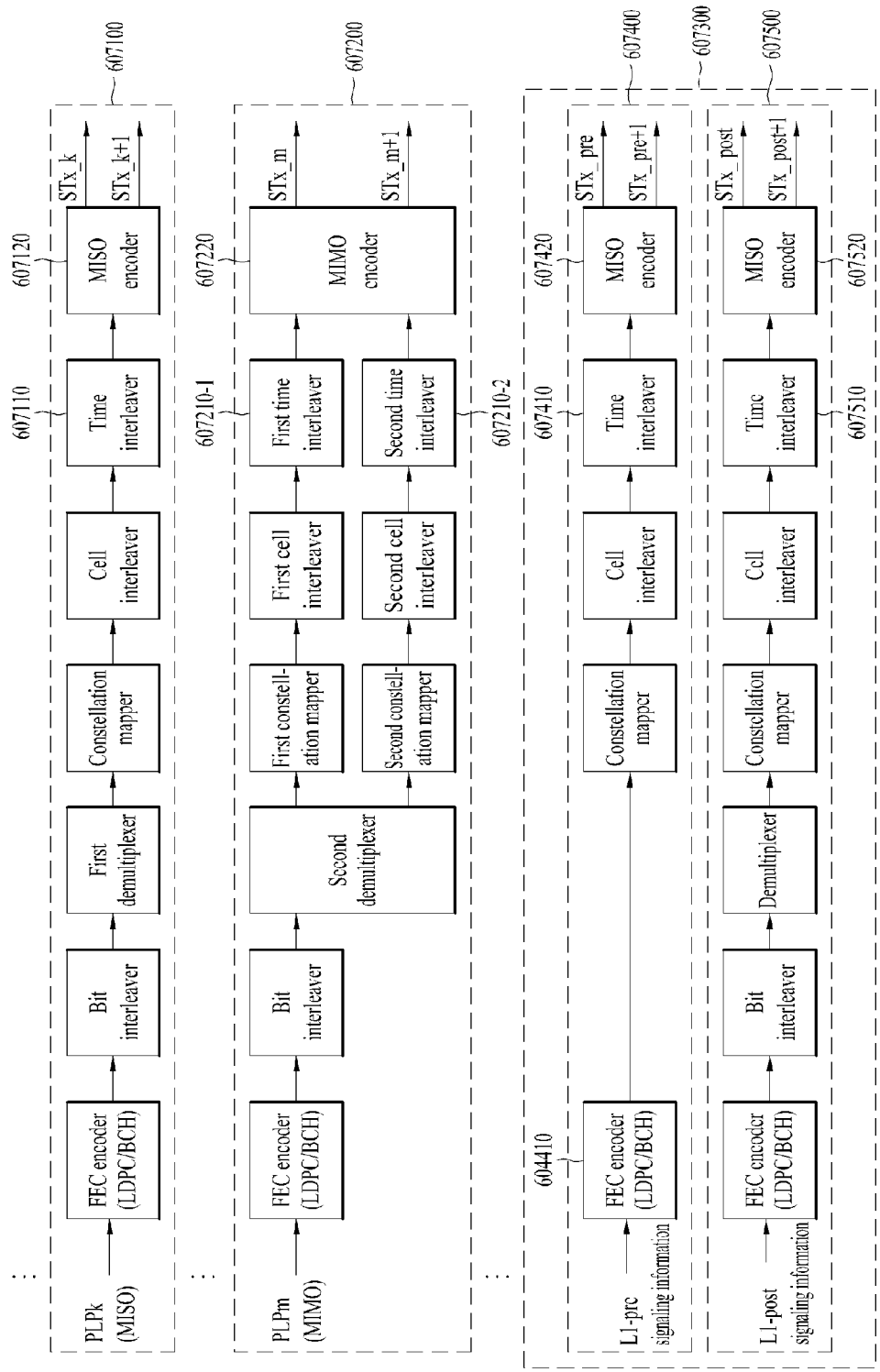
FIG. 16 shows a BICM encoder according to another embodiment of the present invention.

FIG. 16 shows a BICM encoder according to another embodiment of the present invention.

The BICM encoder shown in FIG. 16 according to the second embodiment is another embodiment of the BICM encoder 101300 in FIG. 1.

The BICM encoder according to the second embodiment performs bit-interleaving in a plurality of PLP data after performing input-processing, L1-pre signaling information, and L1-post signaling information, and encoding for correcting errors.

Also, the BICM encoder independently performs MISO and MIMO encoding in PLP data.

The BICM encoder in FIG. 16 includes a first BICM encoding block 607100 performing MISO encoding in PLP data, a second BICM encoding block 607200 performing MIMO encoding in PLP data, and a third BICM encoding block 607300 performing MIMO encoding in signaling information.

As the BICM encoding blocks in FIG. 16 operate the same as the BICM encoding blocks in FIG. 15, further description of them is omitted. However, the BICM encoding blocks of the MISO encoder 607120, 607420, 607520 and the MIMO encoder 607220 are positioned at the end of the time interleaver 607110, 607210-1~2, 607410 and 607510 which is distinguishable from the BICM encoding blocks according to the first embodiment.

Although not illustrated in FIG. 16, the BICM encoder according to the third embodiment of the present invention may include a first BICM encoding block for processing of MISO PLP data to be MISO encoded, a second BICM encoding block for processing of MIMO PLP data to be MIMO encoded, and a third BICM encoding block for processing of signaling information to be MISO encoded. The BICM encoding blocks according to the third embodiment operate in the same way as the BICM encoding blocks according to the first embodiment illustrated in FIG. 15, and thus, a detailed description thereof is omitted. However, the BICM encoding blocks according to the third embodiment is different from the BICM encoding blocks according to the first embodiment in that the BICM encoding blocks according to the third embodiment do not include a MISO encoder and a MIMO encoder.

In addition, the BICM encoder according to the fourth embodiment of the present invention is almost the same as the BICM encoder according to the third embodiment, except that the BICM encoder performs MIMO encoding on MIMO PLP data to be processed using the MIMO scheme. That is, the BICM encoder according to the fourth embodiment of the present invention may include a first BICM encoding block for processing MISO PLP data to be MISO encoded, a second BICM encoding block for processing of MIMO PLP data to be MIMO encoded, and a third BICM encoding block for processing of signaling information to be MISO encoded. Here, the third BICM encoding block may include a first encoding block for processing of L1-pre signaling information and a second encoding block for processing of L1-post signaling information. In particular, the first BICM encoding block according to the fourth embodiment may not include a MISO encoder and the second 2 BICM encoding block may include a MIMO encoder. In this case, the MIMO encoder may be positioned behind a time interleaver as in the first embodiment, or may be positioned behind a constellation mapper according to the second embodiment as in the second embodiment. The position of the MIMO encoder may be changed according to a designer's intention.

Figure 17:
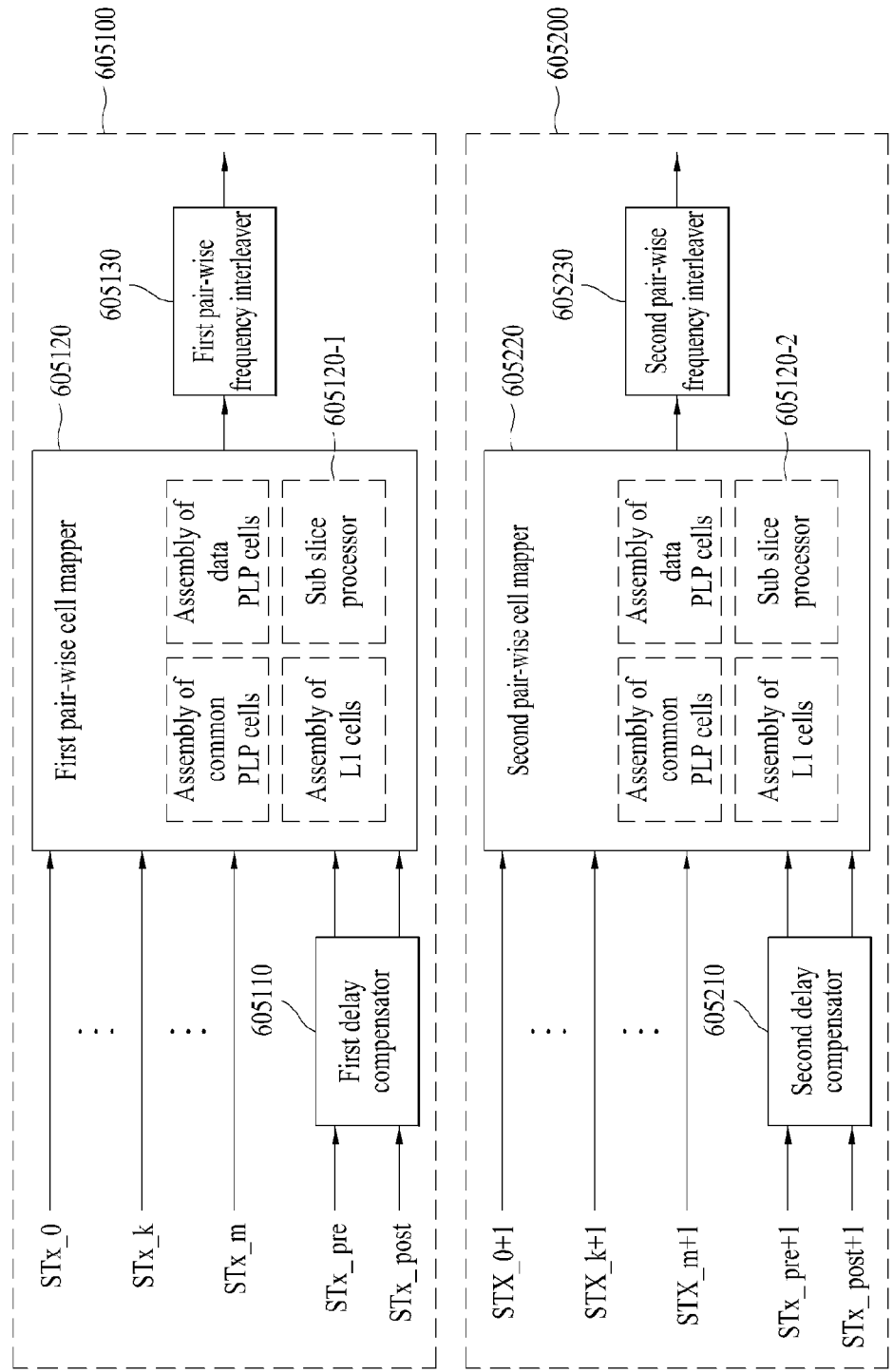
FIG. 17 shows a frame builder encoder according to an embodiment of the present invention.

FIG. 17 shows a frame builder according to an embodiment of the present invention.

The frame builder shown in FIG. 17 is an embodiment of the frame builder 101400 shown in FIG. 1.

The first BICM encoding block 604100 transmits MISO PLP data to two routes (STx_k, STx_K+1) and the second BICM encoding block 604200 transmits MIMO PLP data to two routes (STx_m, STx_m+1). Also, the third BICM encoding block 604300 transmits the L1-pre signaling information and the L1-post signaling information to two routes (STx_pre, Stx_pre_1 and STx_post, STx_post+1).

Each data is inputted into the frame builder. In that case, as shown in FIG. 17, the frame builder includes a first route receiving the BICM encoded data from STx_0 to STx_post, and a second route receiving the BICM encoded data from STx_0+1 to Stx_post+1. The data received in the first route is transmitted through a first antenna (Tx_1) and the data in the second route is transmitted through a second antenna (Tx_2).

As shown in FIG. 17, the frame builder according the first embodiment includes a first frame building block 605100 executing the data from the first route and a second frame building block 605200 executing the data from the second route. The first frame building block 605100 includes a first delay compensator 604110, a first pair-wise cell mapper 605120, and a first pair-wise frequency interleaver 605300-1, and a second frame building block 605200 includes a second delay compensator 605100-2 executing the data from the second route, a second pair-wise cell mapper 605200-2, and a second pair-wise frequency interleaver 605300-2.

The first pair-wise cell mapper 605120 and the first pair-wise frequency interleaver 605130, or the second pair-wise cell mapper 605120 and the second pair-wise frequency interleaver 605310 operate independently but the same functions in the first and the second routes respectively.

A method of performing data in the first frame building block 605100 and the second frame building block 605200.

The first delay compensator 605110 and the second delay compensator 605110 can compensate the L1-pre signaling data or the L1-post signaling data for the delay in the first frame and by the BICM encoder 604300. The L1-signaling information can include information not only in the current frame but also in the next frame. Thus, during the input processing, the L1-signaling information can be delayed one frame as opposed to PLP data inputted in the current frame. Through this process, one frame of the L1-signaling information having information about the current and the next frames.

The first pair-wise cell mapper 605120 and the second pair-wise cell mapper 605220 can perform mapping in the PLP data and the L1-signaling data in symbol units into cell units in a frame in the sub-carrier of the OFDM symbols.

In that case, the PLP data includes a common PLP DATA, a MISO/MIMO encoded PLP data and a sub-slice processor module 605120-1-2 performs frame-mapping in the PLP data in cell units for the diversity effect.

Also, the first pair-wise cell mapper 605120 and the second pairwise cell mapper 605220 can perform frame-mapping in two consecutive inputted cells in pairs.

For the better restoration performance of MISO signals, coherence between MSI transmitting channels should be secured when performing MISO encoding. Thus, in order to secure coherence, the first pair-wise cell mapper 605120 and the second pair-wise cell mapper 605220 pair up cells generated from the same PLP and perform OFDM modulating in the paired-up cells. Then coherence between the channels will be maximized. In other words, according to an embodiment of the present invention, as the MISO encoder is positioned in the front of the BICM encoder, the structure of the frames is in pairs considering such MISO encoding process.

As mentioned above, when performing bit-interleaving or time interleaving by the bit-interleaver 604120 and the time interleaver 604160 using two FEC blocks, two paired up cells can be generated from two different FEC blocks. As the receiver ensures diversity, higher reception can be obtained. The first pair-wise frequency interleaver 605130 and the second pair-wise frequency interleaver 605230 perform frequency interleaving in the data in cell units from each route and transmits the frequency-interleaved data to the OFDM generator through each route.

In that case, the first pair-wise frequency interleaver 605130 and the second pair-wise frequency interleaver 605230 pair up two consecutive cells in interleaving units and then perform frequency interleaving. This is to maximize coherence between channels.

The frame builder illustrated in FIG. 17 may be applied to the first and second embodiments of the present invention. According to the third and fourth embodiments of the present invention, the frame builder may include a first cell mapper and a second cell mapper instead of the first pair-wise cell mapper 605120 and the second pair-wise cell mapper 605220, and include a first frequency interleaver and a second frequency interleaver instead of the first pair-wise frequency interleaver 605130 and the second pair-wise frequency interleaver 605230.

According to the third embodiment, after frequency interleaving, that is, after MISO/MIMO encoding in the OFDM generating process, MIMO/MISO encoding can be done in OFDM symbol units. If the MISO PLP data cells and MIMO PLP data cells are mapped in the same OFDM symbol, the OFDM generator cannot perform MISO/MIMO encoding independently. Thus, the first cell mapper and the second cell mapper dose not map the MISO/MIMO PLP data in the same OFDM symbol.

Also, in order to simplify the transmitting system, the first and second cell mappers according to the third embodiment operate the same.

But, although the MISO PLP data, L1-pre and post signaling data is transmitted from the first route only, the MIMO PLP data can be from the first and the second routes. Therefore, depending on the data inputted, the performance of the cell mapper is different.

More detailed description is as follows.

First, the first cell mapper and the second cell mapper receive the same MISO PLP data from the first route and the same L1-pre and post signaling data from the delay compensator. In that case, the first cell mapper and the second cell mapper perform mapping in the inputted data to be allocated into a sub-carrier of the OFDM symbol.

Second, among the first cell mapper and the second cell mapper, the first cell mapper only receives the MISO PLP data and the delayed compensated L1-pre and post signaling data. In that case, the second cell mapper performs mapping only for the MIMO PLP.

The first frequency interleaver and the second frequency interleaver perform frequency interleaving in the inputted data by cell units and transmits the data to the OFDM generator.

In that case, the first frequency interleaver and the second frequency interleaver perform frequency interleaving in the OFDM symbol into interleaving units. Also, if the second cell mapper 619210 receives MIMO PLP data only, the second frequency interleaver also performs interleaving in MIMO PLP data only.

Figure 18:
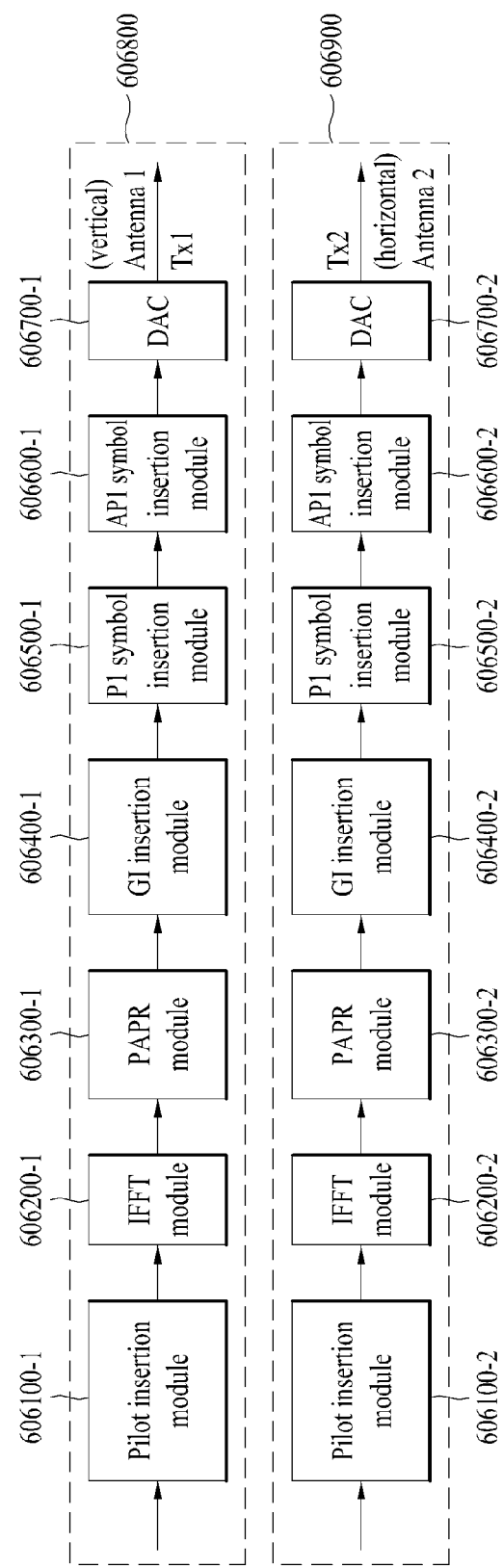
FIG. 18 shows an OFDM generator according to an embodiment of the present invention.

FIG. 18 shows an OFDM generator according to an embodiment of the present invention.

The OFDM generator in FIG. 18 is an embodiment of the OFDM generator 101500 shown in FIG. 1.

The present invention transmits broadcast signals by the MISO/MIMO method through two antennas. The OFDM generator in FIG. 19 receives and demodulates the broadcast signals through a first and a second route. It then transmits the signals to two antennas (Tx1, Tx2).

A first OFDM generating block 606800 modulates the broadcast signals through the first antenna (Tx1) and a second OFDM generating block 606900 modulates the broadcast signals through the second antenna (TX2).

If channel correlation between the first and second antennas is large, transmitted signals can apply polarity depending on the channel correlation. In the present invention, such a method is called polarity multiplexing MIMO. The first antenna is called "vertical antenna" and the second antenna is called "horizontal antenna". The first OFDM generating block 606800 performs OFDM modulating in broadcast signals through the first antenna (Tx1) and the second transmitter 606900 performs OFDM modulating in the broadcast signals from the first route and transmits the signals to the second antenna (Tx2).

Modules including the first OFDM generating block 606800 and the second OFDM generating block 606900 are as follows.

The first OFDM generating block 606800 includes a pilot insertion module 606100-1, an IFFT module 606200-1, a PAPR module 606300-1, a GI insertion module 606400-1, a P1 symbol insertion module 606500-1, an AP1 symbol insertion module 606600-1 and a DAC 606700-1, wherein modules in the first transmitting unit 606800 operate the same functions.

The second OFDM generating block 606900 includes a pilot insertion module 606100-2, an IFFT module 606200-2, a PAPR module 606300-2, a GI insertion module 606400-2, a P1 symbol insertion module 606500-2, an AP1 symbol insertion module 606600-2 and a DAC 606700-2, wherein modules in the first transmitting unit 606800 operate the same functions.

Thus, modules in the first OFDM generating block 606800 will be illustrated in more detail. The pilot insertion module inserts a pilot of the predetermined pilot pattern into a frame and transmits it to the IFFT module 606200-1. The pilot pattern information is transmitted with AP1 signaling information or L1-signaling information.

The IFFT module 606200-1 performs IFFT algorithm in the signals and transmits them to the PAPR module 606300-1.

The PAPR module 606300-1 reduces PAPR of the signals in a time domain and transmits them to the GI insertion module 606400-1. Also, feedback on necessary information based on the PAPR reduction algorithm is given to the pilot insertion module 606100-1.

The GI insertion module 606400-1 copies the end of the effective OFDM symbol, inserts guard intervals in cyclic prefix to each OFDM symbol, and transmits them to the P1 symbol insertion module 606500-1. The GI information can be transmitted through the P1 signaling information or L1-pre signaling information.

The P1 and AP1 symbol are inserted in every frame of the P1 insertion module in the OFDM generator. That is, the P1 insertion module can insert more than two preamble symbols in every frame. When using more than two preamble symbols, burst fading that can happen in the mobile fading conditions will be more strengthened and signal detection performance will be improved.

The P1 symbol insertion module 606500-1 inserts a P1 symbol in the beginning of each frame and transmits it to the AP1 symbol insertion module 606600-1.

The AP1 symbol insertion module 606600-1 inserts an AP1 symbol at the end of the P1 symbol and transmits it to the DAC 606700-1.

The DAC 606700-1 converts the signal frame having the P1 symbol to an analog signal and transmits it to the transmitting antenna (Tx1).

The OFDM generator shown in FIG. 18 may be applied to the first and second embodiments of the present invention.

Although not shown in FIG. 18, according to the third embodiment of the present invention, the OFDM generator may include a MISO/MIMO encoder, a first OFDM generating block, and a second OFDM generating block. The first OFDM generating block and the second generating block according to the third embodiment of the present invention may perform the same operations as those of the first OFDM generating block 606800 and the second OFDM generating block 606900.

If the input data is MISO PLP data or L1-pre and post signaling data from the first and second routes, the MIMO/MISO encoder 603100 performs MISO encoding in the data into OFDM symbol units by using MISO encoding matrix and transmits it to the first and second generating blocks 620200, 620300. In that case, the input data is transmitted from either of the first or second route. According to an embodiment, the MISO encoding matrix can include an OSTBC (Orthogonal Space-Time Block Code)/OSFBC(Orthogonal Space Frequency Block Code/Alamouti code).

If data from the first and second routes is MIMO PLP data, the MIMO/MISO encoder performs MIMO encoding in the data into OFDM symbol units by using MIMO encoding matrix and transmits it to the first and second OFDM generating blocks. The MIMO encoding matrix of the present invention includes a spatial multiplexing, a Golden code (GC), a full-rate full diversity code, and a linear dispersion code. Also, the MIMO encoder performs MIMO encoding by using MIMO encoding matrix.

In addition, the OFDM generator according to the fourth embodiment of the present invention may include a MISO encoder, a first OFDM generating block, and a second OFDM generating block. The first OFDM generating block and the second generating block according to the fourth embodiment of the present invention may perform the same operations as those of the first OFDM generating block 606800 and the second OFDM generating block 606900.

The MISO encoder performs MISO encoding in the frequency-interleaved MISO PLP data, L1-pre signaling data and L1-post signaling data. The MISO encoder operates the same as the MIMO/MISO encoder according to the third embodiment. In addition, if the MIMO encoded MIMO PLP data is inputted, it may be bypassed and the MISO encoder may perform MISO encoding in the MIMO encoded MIMO PLP data.

FIGS. 19 to 23 show a structure block of the broadcast signal receiver according to an embodiment of the present invention.

Figure 19:
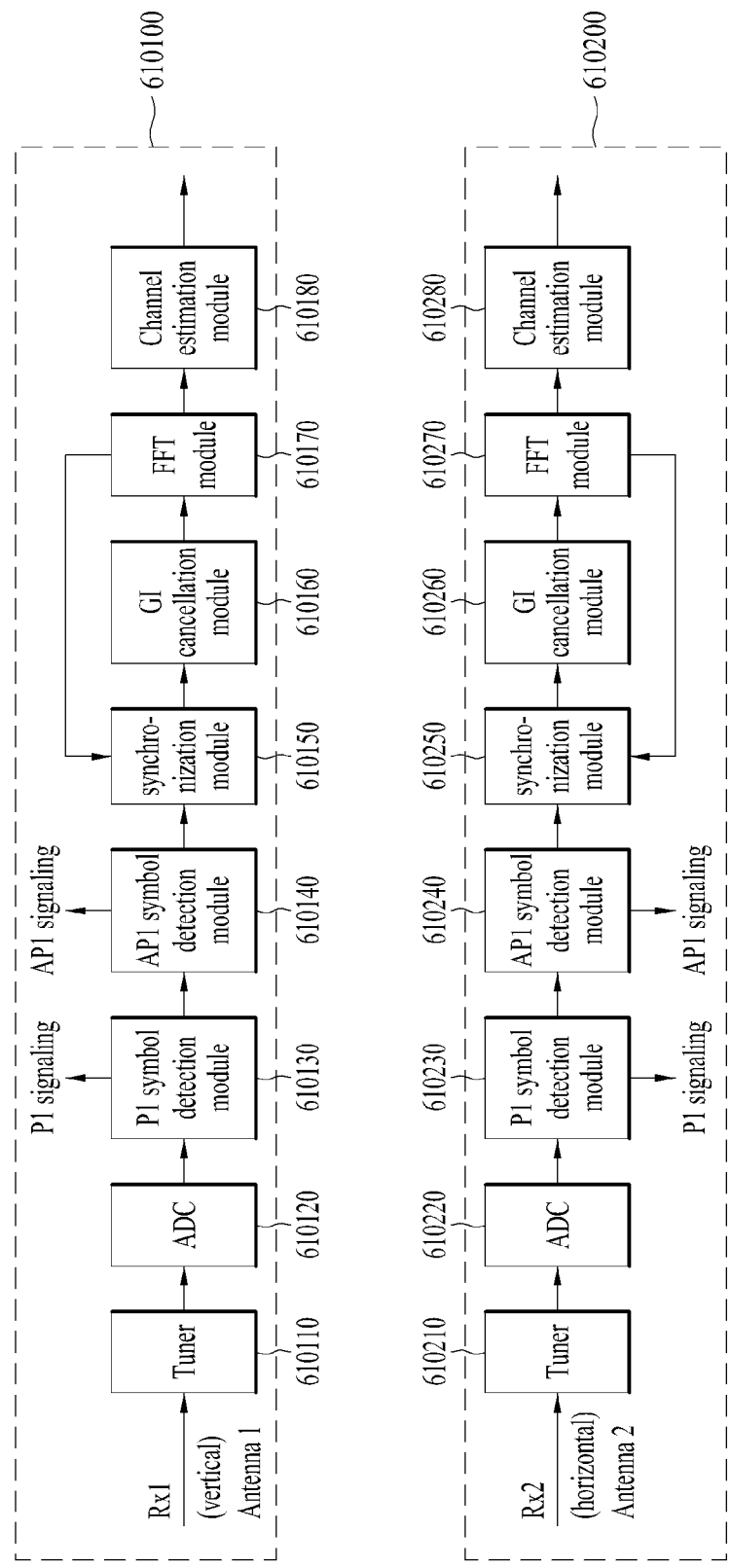
FIG. 19 shows an OFDM demodulator according to an embodiment of the present invention.

FIG. 19 shows an OFDM demodulator according to an embodiment of the present invention.

FIG. 19 shows a drawing of the OFDM demodulator according to an embodiment of the OFDM demodulator 107100 illustrated in FIG. 2.

According to an embodiment of the present invention, the present invention requires two antennas, Rx1 and Rx2, to receive transmitted signals by MIMO/MISO. The OFDM demodulator shown in FIG. 20 can perform OFDM demodulation through the Rx1 and Rx2 antennas.

A block demodulating transmitted signals through a first antenna (Rx1) is called a first OFDM demodulating block 610100 and a block demodulating transmitted signals through a second antenna (Rx2) is called a second OFDM demodulating block 610200.

In addition, the present invention can utilize polarity multiplexing MIMO according to an embodiment of the present invention. The first OFDM demodulating block 610100 performs OFDM demodulation in the broadcast signals transmitted through the first antenna (Rx1) and outputs the signals by a frame demapper to a first route, and the second demodulating block 610200 performs OFDM demodulating in the broadcast signals transmitted through the second antenna (Rx2) and outputs the signals by a frame demapper to a second route.

Also, the OFDM according to the first embodiment in FIG. 19 can perform the reverse process of the OFDM generator illustrated in FIG. 18.

The first OFDM demodulating block 610100 and the second OFDM demodulating block 610200 included in OFDM demodulator according to an embodiment of the present in invention including are as follows.

The first OFDM demodulating block 610100 includes a tuner 610110, an ADC 610120, a P1 symbol detection module 610130, an AP1 symbol detection module 610140, a synchronizing module 610150, a GI cancellation module 610160, a FFT module 610170 and a channel estimation module 610180.

The second OFDM demodulating block 610200 comprises a tuner 610210, an ADC 610220, a P1 symbol detection module 610230, an AP1 symbol detection module 610240, a synchronizing module 610250, a GI cancellation module 610260, a FFT module 610270 and a channel detection module 610280, and operates the same as the first OFDM demodulating block 610100.

Thus, modules in the first OFDM demodulating block 610100 will be further illustrated.

The tuner 610110 receives broadcast signals by selecting a frequency range and transmits it to the ADC 610120 by compensating the size of the signal.

The ADC 610120 coverts analog broadcast signals into digital signals and transmits them to the P1 symbol detection module 610130.

The P1 symbol detection module 610130 extracts P1 symbols in the P1 signaling information and decodes the P1 signaling information. Also, the P1 symbol detection module 610130 transmits the decoded P1 signaling information to the synchronizing module 610150 and a system controller (not shown in the drawing). The system controller determines which frame the received signal has by using the decoded P1 signaling information and controls other devices.

The AP1 symbol detection module 610140 extracts AP1 symbols in the AP1 signaling information and decodes the AP1 signaling information. Also, the AP1 symbol detection module 610140 transmits the decoded AP1 signaling information to the synchronizing module 610150 and a system controller (not shown in the drawing). The system controller determines the pilot pattern information in the current frame and L1-pre spread interval information by using the decoded AP1 signaling information.

The synchronizing module 610150 performs time and frequency synchronizing by using the decoded P1 signaling information and the AP1 signaling information.

The GI cancellation module 610160 deletes guard intervals included in the synchronized signals and transmits them to the FFT module 610170.

The FFT module 610170 converts the signals from the time domain to the frequency domain by performing FFT algorithm.

The channel detection module 610180 detects a transmitting channel from the transmitting antenna to the receiving antenna by using pilot signals having the converted signals. Then, the channel detection module 610180 can additionally perform equalizing for each of the received data. Signals that are converted into the frequency domain will be inputted in the frame demapper.

The OFDM demodulator illustrated in FIG. 19 may be applied to the first and second embodiments of the present invention.

Although not illustrated in FIG. 19, according to the third embodiment of the present invention, the OFDM demodulator may include a first OFDM demodulating block, a second OFDM demodulating block, and a MISO/MIMO decoder. The first OFDM demodulating block and the second OFDM demodulating block according to the third embodiment of the present invention may perform the same operations as those of the first OFDM demodulating block 610100 and the second OFDM demodulating block 610200. However, the OFDM demodulator according to the third embodiment may include a MIMO/MISO decoder 626300, a detailed operation of which will be described below.

The OFDM according to the fourth embodiment of the present invention may include a first OFDM demodulating block, a second OFDM demodulating block, and a MISO decoder. The first OFDM demodulating block and second OFDM demodulating block according to the fourth embodiment of the present invention may perform the same operations as those of the first OFDM demodulating block 610100 and the second OFDM demodulating block 610200.

Figure 20:
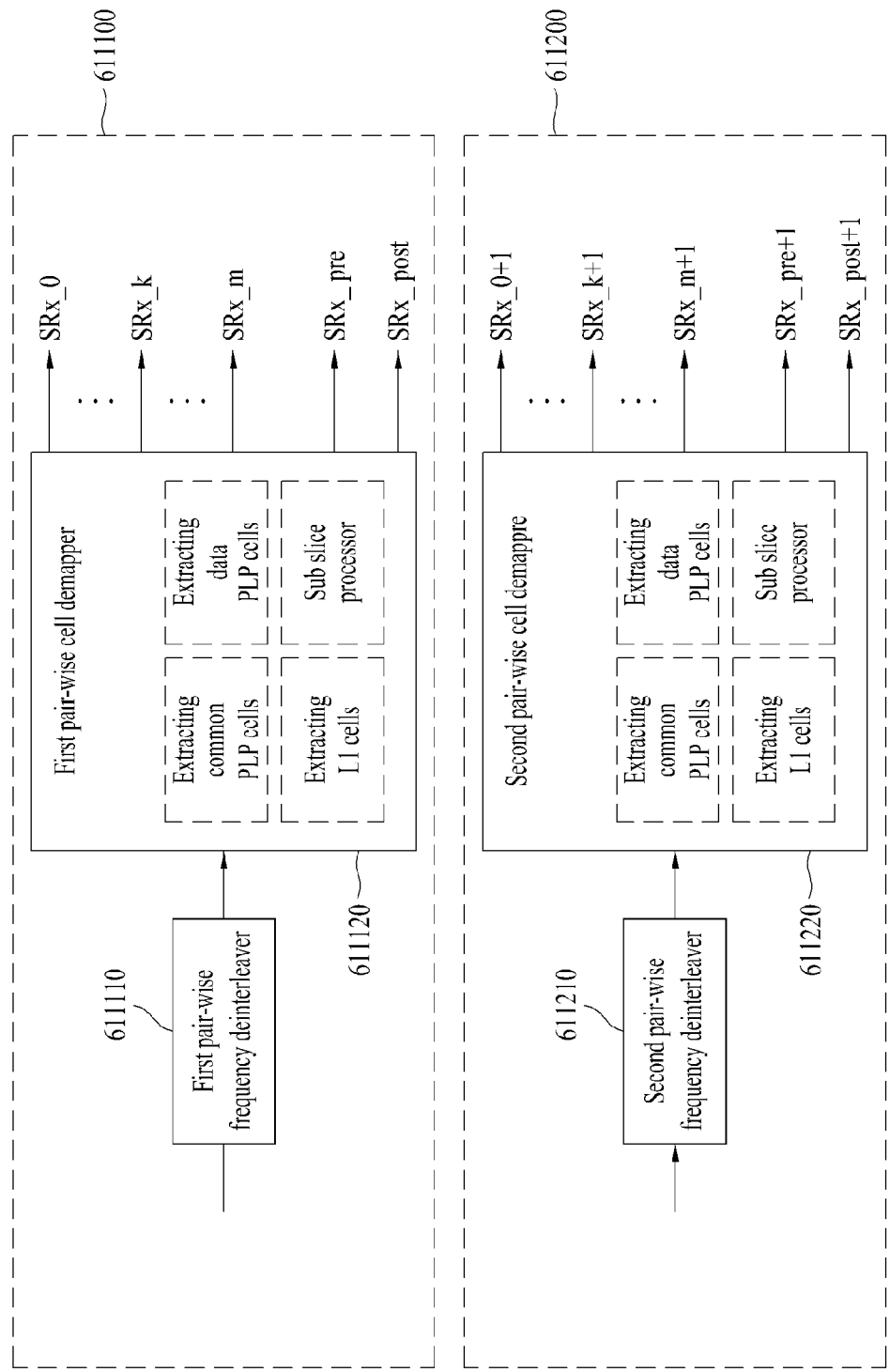
FIG. 20 shows a frame demapper according to an embodiment of the present invention.

FIG. 20 shows a frame demapper according to an embodiment of the present invention.

The frame demapper in FIG. 20 is an embodiment of the frame demapper 107200 in FIG. 2.

The frame demapper illustrated in FIG. 20 includes the first frame demapping block 611100 executing data from a first route and a second frame demapping block 611200 executing data from a second route. The first frame demapping block 611100 includes a first pair-wise frequency deinterleaver 611110 and a first pair-wise cell demapper 611120, and the second demapping block 611200 includes a second pair-wise frequency deinterleaver 611210 and a second pair-wise cell demapper 611220.

Also, the first pair-wise frequency deinterleaver 61110 and the first pair-wise cell demapper 611120 or the second pair-wise frequency deinterleaver 611210 and the second pair-wise cell demapper 611220 can operate independently and the same through a first route and a second route respectively.

Also, the frame demapper illustrated in FIG. 20 can perform the reverse process of the frame builder illustrated in FIG. 17.

A method of performing data by blocks included in the first frame builder demapping block 611100 and the second frame builder demapping block 611200 is as follows.

The first pair-wise frequency deinterleaver 611110 and the second pair-wise frequency deinterleaver 611210 perform deinterleaving in data in the frequency domain through the first and second routes into cell units in that case, the first pair-wise frequency deinterleaver 611110 and the second frequency deinterleaver 611210 pair up two consecutive cells in deinterleaving units and perform frequency deinterleaving. The deinterleaving process can be performed in a reverse direction of the interleaving process in the transmitting unit. The frequency-deinterleaved data will be transmitted in the original order.

The first pair-wise cell demapper 611120 and the second pair-wise cell demapper 611220 can extract common PLP data, PLP data and L1-signaling information in cell units from the de-interleaved data. The extracted PLP data includes MISO PLP data for the MISO method and MIMO PLP data for the MIMO method, and the extracted L1-signaling data includes information necessary for the current and next frames. Also, if the transmitter performs sub-slicing in the PLP data, the first and the second pair-wise cell demappers 611120, 611220 can merge the sliced PLP data and generate it in one stream.

Also, the first pair-wise cell demapper 611120 and the second pair-wise cell demapper 611220 can pair up two consecutive cells.

Data transmitted through the first route is inputted to the BICM decoder by the route from SRx_0 to SRx_post and data transmitted through the second route is inputted to the BICM decoder by the route from SRx_0+1 to SRx_post+1.

The frame demapper shown in FIG. 20 may be applied to the first and second embodiments of the present invention. In accordance with the third and fourth embodiments of the present invention, the frame demapper includes a first frame demapping block 627100 performing data from a first route and a second frame demapping block 627200 performing data from a second route.

The first frame demapping block includes a first frequency deinterleaver, a first cell demapper, a first combiner, a second combiner and a third combiner, and the second frame demapping block includes a second frequency deinterleaver and a second cell demapper.

Also, the first frequency deinterleaver and the first cell demapper or the second frequency deinterleaver and the second cell demapper can operate independently and the same through a first route and a second route respectively.

The first frequency deinterleaver and the second frequency deinterleaver perform deinterleaving in data in the frequency domain through the first and second routes into cell units.

The first and second cell demppers perform extracting common PLP data, PLP data and L1-signaling data from the deinterleaved data by cell units. The extracted PLP data includes the MISO decoded MISO PLP data and MIMO decoded MIMO PLP data, and the extracted L1-signaling data includes information necessary for the current and next frames. Also, if the transmitter performs sub-slicing in the PLP data, the first sub-slice processor 627120-1, 627220-1 of the first and the second cell demappers 627120, 627220 can merge the sliced PLP data and generate it in one stream.

The first combiner can combine the MISO decoded MISO PLP data if it does not combine the MISO PLP data in the MIMO/MISO decoder.

The second combiner and the third combiner can operate the same as the first combiner but it deals with L1-pre and L1-post signaling data.

Figure 21:
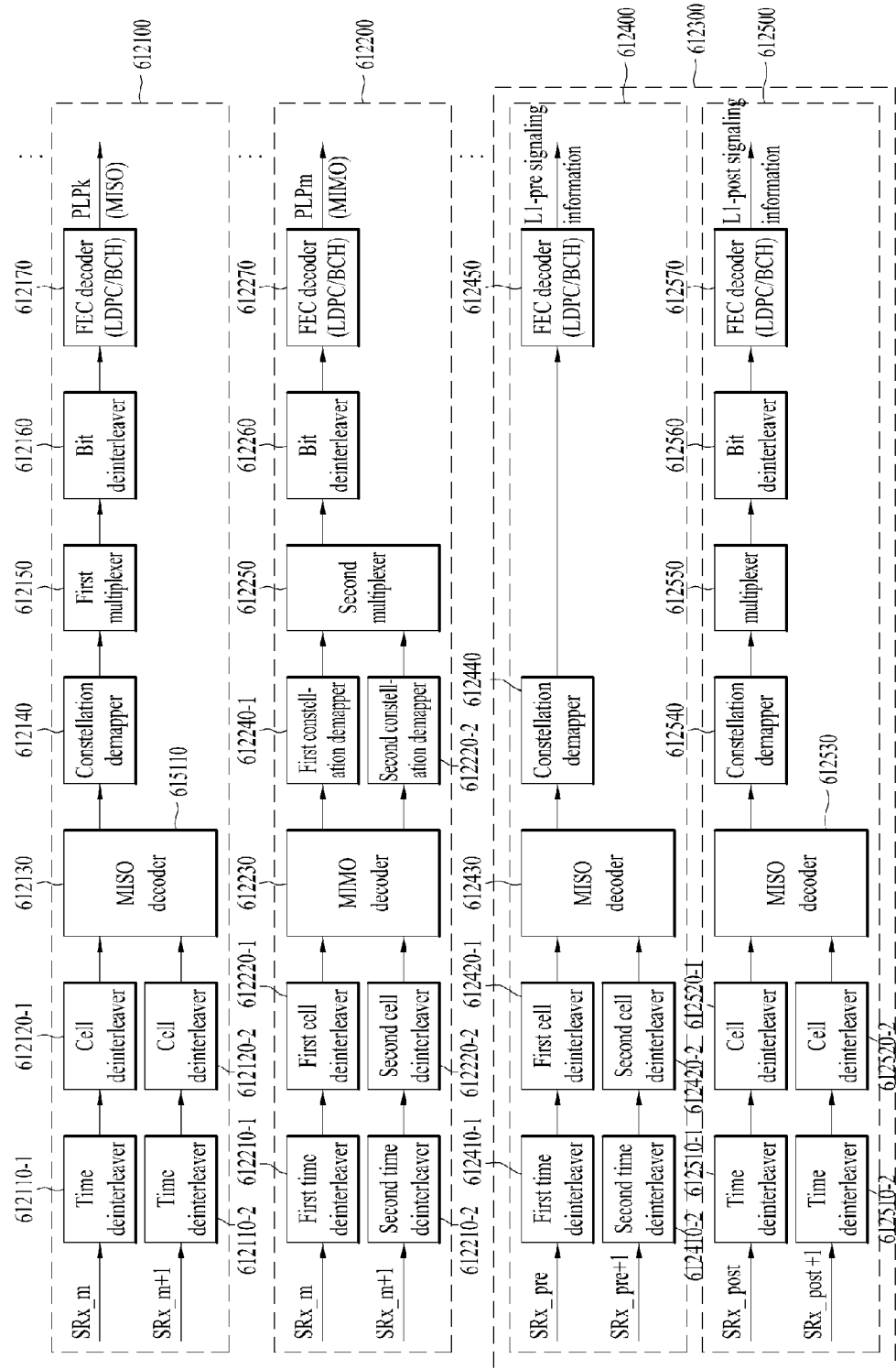
FIG. 21 shows a BICM decoder according to an embodiment of the present invention.

FIG. 21 shows a BICM encoder according to an embodiment of the present invention.

The BICM encoder in FIG. 21 according to the first embodiment of the present invention is an embodiment of the BICM encoder 107300 in FIG. 2.

The BICM decoder according to the first embodiment receives data from the first route via SRx_0 to SRx_post by a frame demapper and data from the second route via SRx_0+1 to SRx_post+1 and performs BICM decoding.

Also, the BICM decoder according to the first embodiment independently performs MISO/MIMO encoding in each of the data.

That is, the BICM decoder in FIG. 21 includes a first BICM decoding block 612100 performing MISO PLP data from SRx_k and SRx_k+1, a second BICM decoding block 612200 performing MIMO PLP data from SRx_m and SRx_m+1, and a third BICM decoding block 612300 performing MISO encoding in the L1-signaling information from SRx_pre, SRx_pre+1, SRx_post, and SRx_post+1.

Also, the BICM decoder according to the first embodiment of the present invention can perform the reverse process of the BICM encoder according to the first embodiment of the present invention illustrated in FIG. 15.

Data-performation method for each block is illustrated.

First, the first BICM decoding block 612100 includes a time deinterleaver 612110-1, 612110-2, a cell deinterleaver 612120-1, 612120-2, a MISO decoder 612130, a constellation demapper 612140, a first demultiplexer 612150, a bit deinterleaver 612160, and a FEC decoder 612170.

The time deinterleaver 612110-1, 612110-2 restores the MISO decoded data into a time domain and the cell deinterleaver 612120-1, 612120-2 performs deinterleaving in the time-deinterleaved data into cell units.

The MISO decoder 612130 can perform MISO decoding in MISO PLP data. The MISO decoder 612130 can perform four functions.

First, if the channel estimation modules 610180, 610280 included in the OFDM demodulator illustrated in FIG. 19 do not perform channel equalizing, the MISO decoder 612130 applies the effect of the channel detection regarding every transmissible reference point and computes an LLR value. Therefore, it will have the same effect.

Second, the MISO decoder 612130 performs the following functions based on the performance of the constellation mapper 604140. If the BICM encoder of the broadcast signal transmitter rotates the constellation mapper with a certain angle and delays the Q-phase element of the constellation for a certain value, the MISO decoder 612130 delays the I-phase element of the constellation for a certain value and computes a 2D-LLR value based on the rotation angle.

If the constellation mapper 604140 does not rotate constellation and does not delay the Q-phase of constellation for a certain value, the MSIO decoder 612130 can compute the 2-D LLR value based on the normal QAM.

Third, the MISO decoder 612130 selects a decoding matrix to perform the reverse process based on the encoding matrix used by the MISO encoder 604150.

Fourth, the MISO decoder 612130 can combine signals inputted from two antennas. The signal combining method includes maximum ratio combining, equal gain combining, and selective combining and obtains the diversity effect by maximizing the SNR of the combined signals.

The MISO decoder 612130 performs MISO decoding in the combined signal and combine the MISO-decoded combined signals.

The constellation demapper 612140 can perform the following functions based on the performance of the MISO decoder 612130.

First, if the MISO decoder 612130 does not transmit the LLR value directly and only performs MISO decoding, the constellation demapper 612140 can compute the LLR value. In more detail, if the constellation demapper 604140 in the BICM encoder performs constellation rotation or Q-phase element delay, the constellation demapper 612140 delay the I-phase LLR element and computes the LLR value. If the constellation demapper 604140 does not perform the constellation rotation and Q-phase element delay, the constellation demapper 612140 can compute the LLR value based on the normal QAM.

The computing the LLR value includes computing 2-D LLR and computing 1-D LLR. When computing the 1-D LLR, the complexity of the LLR computation can be reduced by executing either one of a first or a second route.

The first multiplexer 612150 restores demapped data in bit stream.

The bit-interleaver 612160 performs deinterleaving in the bit-stream, FEC decoding in the deinterleaved data, and outputs MISO PLP data by correcting errors in the transmitting channels.

The second BICM decoding block 612200 includes a first time deinterleaver 612210-0 and a second time deinterleaver 612210-1, a first cell deinterleaver 612220-0 and a second cell deinterleaver 612220-1, a MIMO decoder 612230, a first constellation demapper 612240-0 and a second constellation demapper 612240-1, a second multiplexer 612250, a bit interleaver 612260 and a FEC decoder 612270.

The first time deinterleaver 612210-0 and the second time deinterleaver 612210-1 perform deinterleaving in the MIMO decoded data into cell units. In that case, the first cell deinterleaver 612220-0 and the second deinterleaver 612220-1 performs cell deinterleaving in only a half of the cell data in one FEC block. As a result, cell deinterleaving by the first and second cell deinterleaver 612220-0, 612220-1 has the same effect as deinterleaving by a cell deinterleaver using one FEC block.

The MIMO decoder 612230 performs in MIMO PLP data from SRx_m and SRx_m+1. The MIMO decoder 612210 can perform the four functions of the MISO decoder 612110 except for the fourth function in which the signals are to be combined. Then, the MIMO decoder 612230 performs decoding by using MIMO encoding matrix of the first and sixth embodiment.

The first constellation demapper 612240-0, the second constellation demapper 612240-1, the second multiplexer 612250, bitinterleaver 612260 and FEC decoder 612270 operates the same as those according to the first BICM decoding block 612100.

The third BICM decoding block 612300 includes a first decoding block 612400 performing L1-pre signaling data and a second decoding block 612500 performing L1-post signaling data. The first decoding block 612400 includes a time deinterleaver 612410-1, 612410-2, a cell deinterleaver 612420-1, 612420-2, a MISO decoder 612430, a constellation demapper 612440, and a FEC decoder 612450, and the second decoding block 612500 includes a time deinterleaver 612510-1, 612510-2, a cell deinterleaver 612520-1, 612520-

2, a MISO decoder 612530, a constellation demapper 612540, a multiplexer 612550, a bit deinterleaver 612560, and a FEC decoder 612570.

As the first decoding block 612400 and the second decoding block 612500 have the same functions, the description of the first BICM decoding block 612100 is omitted.

As a result, the first BICM decoding block 612100 outputs the BICM decoded MISO PLP data to an output processor and the second BICM decoding block 612200 transmits the BICM decoded MIMO PLP data to the output processor.

The first decoding block 612400 in the third BICM decoding block 612300 performs MSIO decoding in L1-pre signaling data and transmits the data. Also, the second decoding block 612500 in the third BCIM decoding block 612300 performs MISO decoding in L1-post signaling data and transmits one L1-post signaling information.

Figure 22:
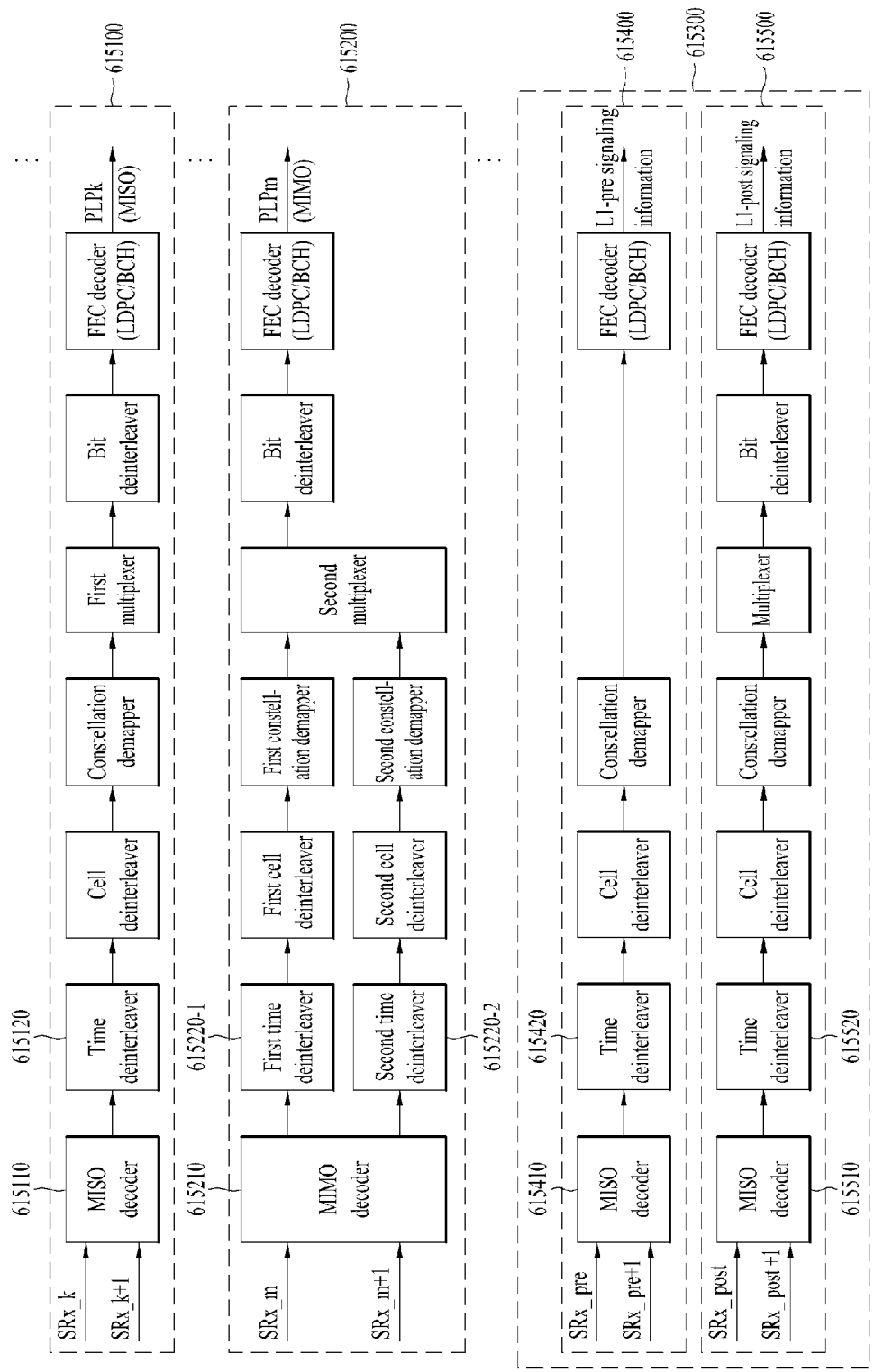
FIG. 22 shows a BICM decoder according to another embodiment of the present invention.

FIG. 22 shows a BICM decoder according to another embodiment of the present invention.

The BICM decoder in FIG. 22 according to the second embodiment of the present invention is an embodiment of the BICM decoder 107300 in FIG. 2.

The BICM decoder according to the second embodiment receives data transmitted from a first route to a route of from SRx_0 to SRx_post and data transmitted from a second route to a route of from SRx_0+1 to SRx_post+1, and performs BICM decoding. Also, the BICM decoder according to the second embodiment can independently apply the MISO/MIMO process.

That is, the BICM decoder in FIG. 22 includes a first BICM decoding block 615100 performing MISO encoding in MSIO PLP data from SRx_k and SRx_k+1, a second BICM decoding block 615200 performing in MIMO PLP data from SRx_post and SRx_post+1, and a third BICM decoding block 615300 performing MISO encoding in L1-signaling data from SRx_pre, SRx_pre+1, SRx_post, and SRx_m+1.

Also, the third BICM decoding block 615300 includes a first decoding block 615400 performing the L1-pre signaling data and a second decoding block 615500 performing L1-post signaling data.

Also, the BICM decoder according to the second embodiment can perform the reverse process of the BICM encoder according to the second embodiment illustrated in FIG. 16.

The decoding blocks according to the second embodiment in FIG. 22 operate the same as the decoding blocks according to the first embodiment in FIG. 21. Therefore, further description is omitted. However, the only difference is that in the BICM decoder the MISO decoder 615110, 615410, 615510 and the MIMO decoder 615310 are located in front of the time deinterleaver deinterleaver 615120, 615220-1, 615220-2, 615420, 615520.

As above described, the PLP data and the signaling information are performed into symbol units after the constellation mapping. In addition, the broadcast signal receiver may perform BICM decoding on data received in reverse processes to those of the BICM encoding blocks according to the first embodiment or the second embodiment. In this case, a MISO decoder, a MIMO decoder, a time deinterleaver, and a cell deinterleaver of the broadcast signal receiver may perform the received data in symbol units. However, the BICM decoder of the broadcast signal receiver may first perform MISO decoding or MIMO decoding for each data, and thus, each data is output in bit units. Then, the BICM decoder of the broadcast signal receiver may perform time deinterleaving and cell deinterleaving processes, but requires information regarding a symbol unit of data output in bit units. Thus, the broadcast signal receiver may store information regarding symbol mapping of input bits required for the deinterleaving processes.

As not shown in drawings, the BICM decoder according to the third embodiment includes a first BICM decoding block processing the MISO decoded MISO PLP data transmitted through one path, a second BICM decoding block processing the MIMO decoded MIMO PLP data transmitted through two paths, and a third BICM decoding block processing the MISO encoded L1-signaling data transmitted through two paths. Also, the third BICM decoding block includes a first decoding block processing L1-pre signaling data and a second decoding block processing L1-post signaling data.

Also, as the BICM decoder according to the third embodiment operates the same as the BICM encoding blocks according to the first embodiment in FIG. 21. However, the only difference is that the BICM decoding blocks according to the third embodiment do not include MISO/MIMO decoders.

Also, the BICM decoder according to the fourth embodiment of the present invention includes a first BICM decoding block processing MISO PLP data transmitted through one path, a second BICM decoding block processing MIMO PLP data transmitted through two paths, and a third BICM decoding block processing MISO decoded L1-signaling data transmitted through two paths.

Also, the third BICM decoding block includes a first decoding block processing L1-signaling data and a second decoding block processing L1-post signaling data.

As the first BICM decoding block according to the fourth embodiment operates the same as the BICM decoding blocks illustrated in FIG. 21.

But, the only difference is that the second BICM decoding block includes the MIMO decoder as opposed to the third embodiment of the present invention. In that case, the transmitting character of MIMO PLP data from a first and a second route may or may not be the same. Also, if the modulation orders of the two MIMO PLP data are the same, a second constellation mapper, a second cell interleaver and a second time interleaver may not be used. Thus, two of the MIMO PLP data will be merged into one input in the first time deinterleaver, the first cell deinterleaver, the first constellation demapper, and then will be inputted to the second multiplexer. In addition, the MIMO decoder may be positioned in front of the time deinterleavers as in the first embodiment or may be positioned in front of the constellation demappers as in the second embodiment.

Figure 23:
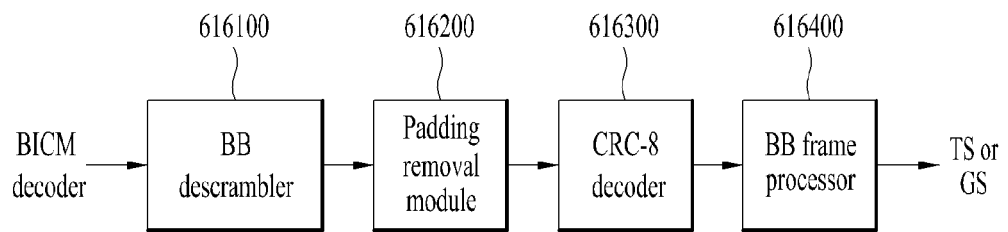
FIG. 23 shows an output processor according to an embodiment of the present invention.
Figure 24:
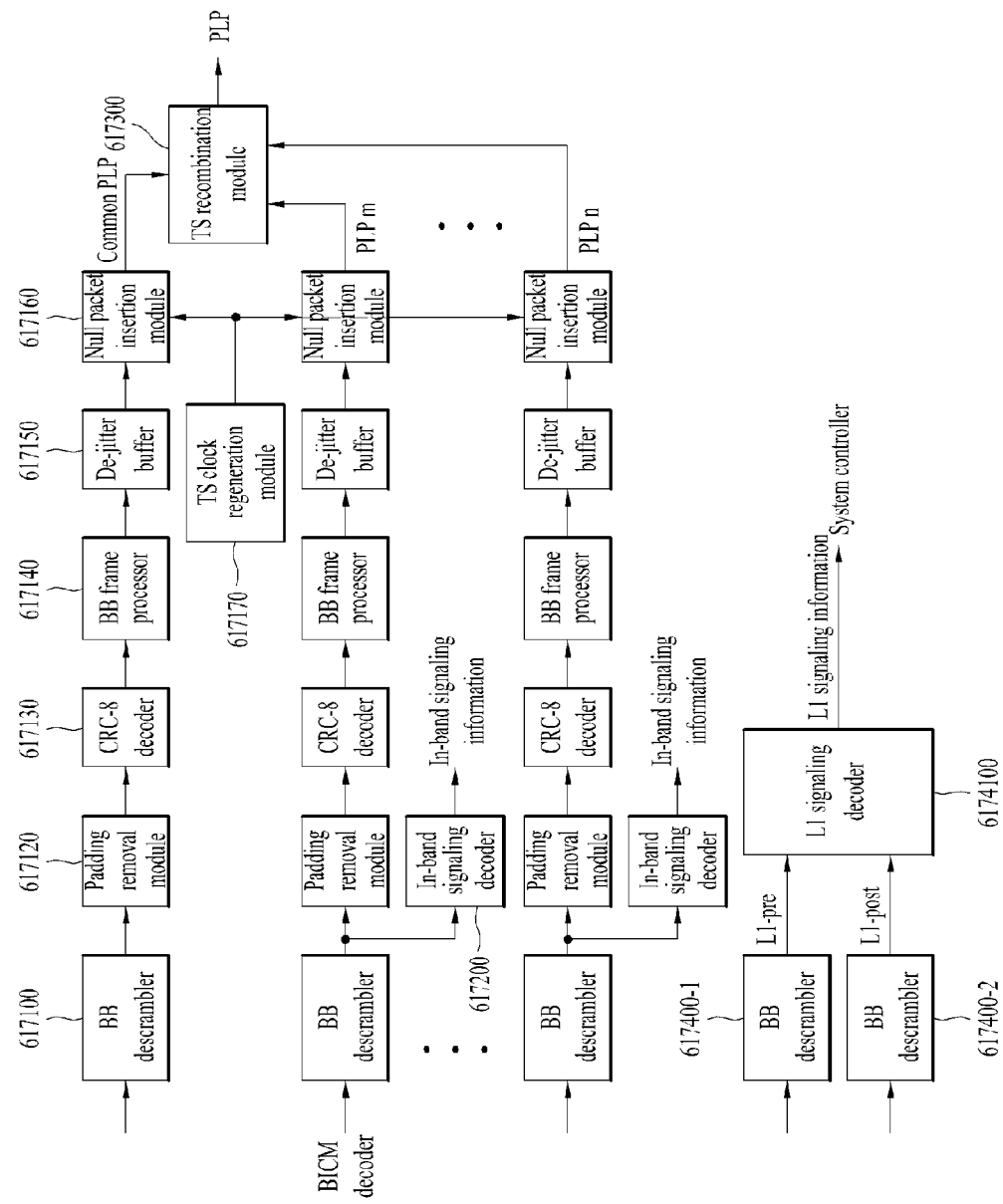
FIG. 24 shows an output processor according to another embodiment of the present invention.

FIG. 23 and FIG. 24 show an embodiment of an output processor included broadcast signal receiver according to an embodiment of the present invention. The following is a specific description of the output processor.

FIG. 23 shows an output processor of the broadcast signal receiver according to an embodiment.

The output processor in FIG. 23 is an embodiment of the output processor 107400 in FIG. 2.

The output processor in FIG. 23 as opposed to an input processor performing single PLP in FIG. 12 performs the reverse process of it and includes a BB descrambler 616100, a padding remove module 616200, a CRC-8 decoder 616300 and a BB frame processor 616400. The output processor performs the reverse process of the input processor illustrated in FIG. 13 by receiving bit stream from the BICM decoder.

The BB descrambler 616100 receives bit stream, performs XOR algorithm with the same bit-string as PRBS processed by the BB scrambler and outputs it. The padding remove module 616200 removes, if necessary, padding bits inserted in the padding insertion module. The CRC-8 decoder 616300 performs CRC decoding in the bit-stream and the BB frame processor 616400 decodes information in the BB frame header and restores TS or GS by using the decoded information.

FIG. 24 shows another embodiment of an output processor of the present invention.

The output processor in FIG. 24 as opposed to the input processor in FIG. 13 and FIG. 14 performing a plurality of PLP performs the reverse process of it. The output processor includes a plurality of blocks for a plurality of PLP. The blocks are as follows. The output processor includes a BB descrambler 617100, 617400-1, 617400-2 and a padding removal module 617120, a CRC-8 decoder 617130, a BB frame processor 617140, a De-jitter buffer 617150, a null packet insertion module 617160, a TS clock regeneration module 617170, an in-band signaling decoder 617180, a TS recombination module 617300 and a L1 signaling decoder 617410. The same blocks as in FIG. 23 are omitted.

Processing for a plurality of PLP can be shown as decoding PLP data regarding common PLP or decoding service components like scalable video service or a plurality of services at once. The BB descrambler 617110, the padding removal module 617120, the CRC-8 decoder 617130 and the BB frame processor 617140 operate the same as those in FIG. 23.

The De-jitter buffer 617150 compensates a temporarily inserted delay for the synchronization of a plurality of PLP based on Time To Output (TTO) parameters. The null packet insertion module 617160 restores the deleted null packet based on the Deleted Null Packet (DNP) information. The TS clock regeneration module restores the detailed time synchronization of the outputted packet based on Input Stream Time Reference information. The TS recombination module 617300 receives the restored common PLP and related PLP data and transmit the original TS, IP or GS. The TTO parameters, DNP information, and ICSR information are obtained by the BB frame processor and it can transmit the data to each block or a system controller.

The in-band signaling decoder 617200 restores in-band signaling information via the padding bit filed of PLP data and transmits it.

As for L1 signaling information, the BB descramblers 617400-1, 617400-2 performs descrambling in the corresponding L1 pre signaling information data and L1-post signaling information, and the L1 signaling decoder 6174100 decodes the descrambled data and restores the L1 signaling information. The restored L1-signaling information includes L1-pre signaling information and L1-post signaling information. It will also be transmitted to the system controller and provides parameters for BICM decoding, frame demapping, and OFDM demodulating. The L1 signaling information can be inputted as one BB descrambler and will be descrambled.

As described above, the Spatial Multiplexing (SM) scheme and the Golden Code (GC) may be used as the MIMO scheme. A detailed description thereof will be given below FIG. 25 illustrates MIMO transmission and reception systems according to an embodiment of the present invention.

As shown in FIG. 25, the MIMO transmission system includes an input signal generator 201010, a MIMO encoder 201020, a first transmit antenna 201030, and a second transmit antenna 201040. In the following, the input signal generator 201010 may be referred to as a divider and the MIMO encoder 201020 may be referred to as a MIMO processor.

The MIMO reception system may include a first receive antenna 201050, a second receive antenna 201060, a MIMO decoder 201070, and an output signal generator 201080. In the following, the output signal generator 201080 may be referred to as a merger and the MIMO decoder 101070 may be referred to as an ML detector.

In the MIMO transmission system, the input signal generator 201010 generates a plurality of input signals for transmission through a plurality of antennas. In the following, the input signal generator 201010 may be referred to as a divider. Specifically, the input signal generator 201010 may divide an input signal for transmission into 2 input signals and output the first input signal S1 and the second input signal S2 for MIMO transmission.

The MIMO encoder 201020 may perform MIMO encoding on the plurality of input signals S1 and S2 and output a first transmission signal St1 and a second transmission signal St2 for MIMO transmission and the output transmission signals may be transmitted through a first antenna 201030 and a second antenna 201040 via required signal processing and modulation procedures. The MIMO encoding 201020 may perform encoding on a per symbol basis. The SM scheme or the GC scheme may be used as the MIMO encoding method. In the following, the MIMO encoder may be referred to as a MIMO processor. Specifically, the MIMO encoder may process a plurality of input signals according to a MIMO matrix and a parameter value of the MIMO matrix which are described below.

The input signal generator 201010 is an element that outputs a plurality of input signals for MIMO encoding and may also be an element such as a demultiplexer or a frame builder depending on the transmission system. The input signal generator 201010 may also be included in the MIMO encoder 201020 such that the MIMO encoder 201020 generates a plurality of input signals and performs encoding on the plurality of input signals. The MIMO encoder 201020 may be a device that performs MIMO encoding or MIMO processing on a plurality of signals and outputs the encoded or processed signals so as to acquire diversity gain and multiplexing gain of the transmission system.

Since signal processing should be performed on a plurality of input signals after the input signal generator 201010, a plurality of devices may be provided next to the input signal generator 201010 to process signals in parallel or one device including one memory may be provided to sequentially process signals or to simultaneously process signals in parallel.

The MIMO reception system receives a first reception signal Sr1 and a second reception signal Sr2 using a first receive antenna 201050 and a second receive antenna 201060. The MIMO decoder 201070 then processes the first reception signal and the second reception signal and outputs a first output signal and a second output signal. The MIMO decoder 201070 processes the first reception signal and the second reception signal according to the MIMO encoding method used by the MIMO encoder 201020. As an ML detector, the MIMO decoder 201070 outputs a first output signal and a second output signal using information regarding the channel environment, reception signals, and the MIMO matrix used by the MIMO encoder in the transmission system. In an embodiment, when ML detection is performed, the first output signal and the second output signal may include probability information of bits rather than bit values and may also be converted into bit values through FEC decoding.

The MIMO decoder of the MIMO reception system processes the first reception signal and the second reception signal according to the QAM type of the first input signal and the second input signal processed in the MIMO transmission system. Since the first reception signal and the second reception signal received by the MIMO reception system are signals that have been transmitted after being generated by performing MIMO encoding on the first input signal and the second input signal of the same QAM type or different QAM types, the MIMO reception system may determine a combination of QAM types of the reception signals to perform MIMO decoding on the reception signals. Accordingly, the MIMO transmission system may transmit information identifying the QAM type of each transmission signal in the transmission signal and the QAM type identification information may be included in a preamble portion of the transmission signal. The MIMO reception system may determine the combination of the QAM types of the reception signals from the QAM type identification information of the transmission signals and perform MIMO decoding on the reception signals based on the determination.

Thereafter, the output signal generator 201080 may generate an output signal by merging the first output signal and the second output signal.

The following is a description of a MIMO encoder and a MIMO encoding method that have low system complexity, high data transmission efficiency, and high signal reconstruction (or restoration) performance in various channel environments according to an embodiment of the present invention.

The SM scheme is a method in which data is simultaneously transmitted through a plurality of antennas without MIMO encoding. In this case, the receiver can acquire information from data that is simultaneously received through a plurality of receive antennas. The SM scheme has an advantage in that the complexity of a Maximum Likelihood (ML) decoder that the receiver uses to perform signal reconstruction (or restoration) is relatively low since the decoder only needs to check a combination of received signals. However, the SM scheme has a disadvantage in that transmit diversity cannot be achieved at the transmitting side. In the case of the SM scheme, the MIMO encoder bypasses a plurality of input signals. In the following, such a bypass process may be referred to as MIMO encoding.

The GC scheme is a method in which data is transmitted through a plurality of antennas after the data is encoded according to a predetermined rule (for example, according to an encoding method using golden code). When the number of the antennas is 2, transmit diversity is acquired at the transmitting side since encoding is performed using a 2×2 matrix. However, there is a disadvantage in that the complexity of the ML decoder of the receiver is high since the ML decoder needs to check 4 signal combinations.

The GC scheme has an advantage in that it is possible to perform more robust communication than using the SM scheme since transmit diversity is achieved. However, such a comparison has been made when only the GC scheme and the SM scheme are used for data processing for data transmission and, if data is transmitted using additional data coding (which may also be referred to as outer coding), transmit diversity of the GC scheme may fail to yield additional gain. This failure easily occurs especially when such outer coding has a large minimum Hamming distance. For example, the transmit diversity of the GC scheme may fail to yield additional gain compared to the SM scheme when data is transmitted after being encoded by adding redundancy for error correction using a Low Density Parity Check (LDPC) code having a large minimum Hamming distance. In this case, it may be advantageous for the broadcast system to use the SM scheme having low complexity.

Figure 26:
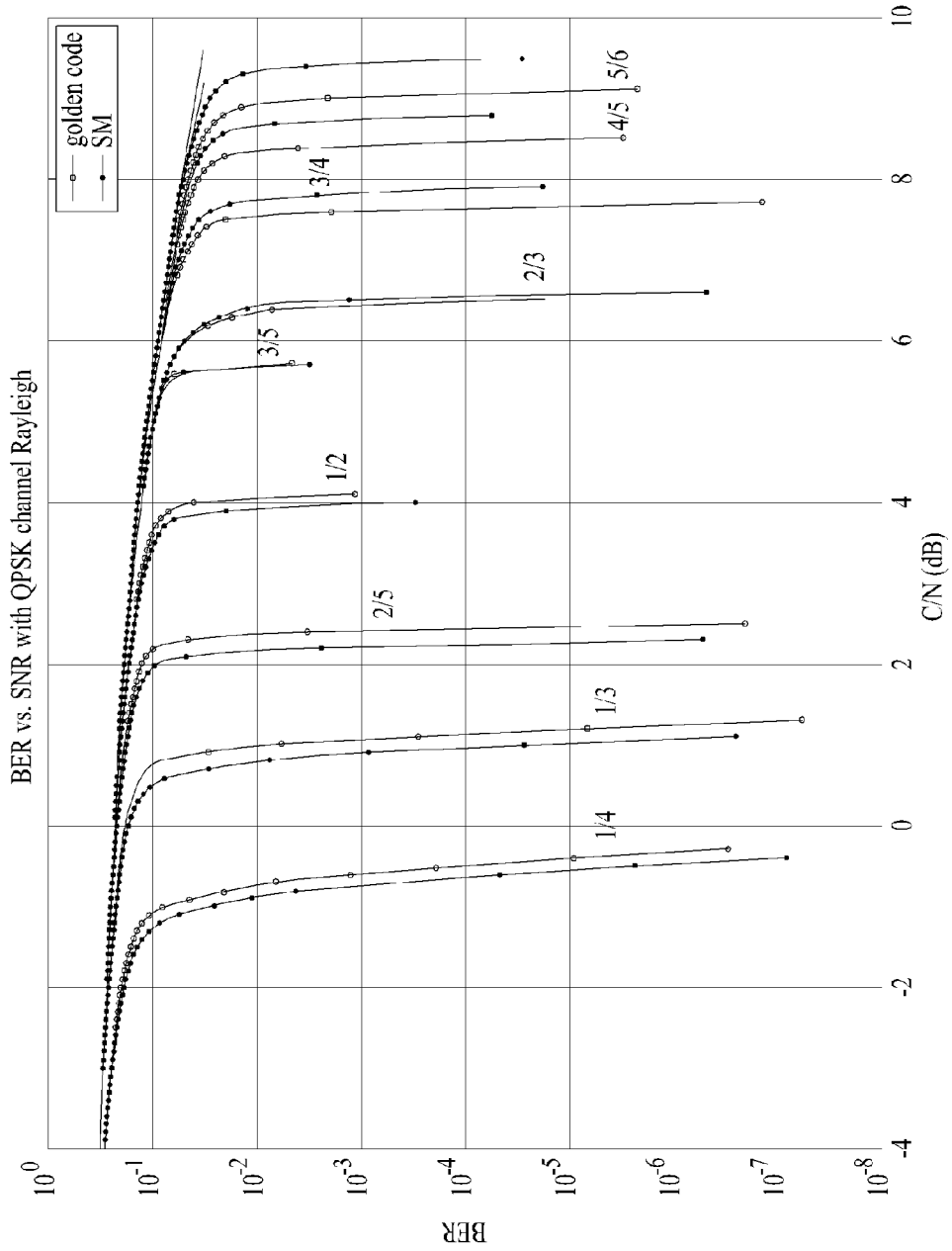
FIG. 26 is a BER/SNR chart showing a performance difference between a GC scheme and an SM scheme using an outer code according to an embodiment of the present invention.

FIG. 26 illustrates a BER/SNR chart showing the performance difference between the SM scheme and the GC scheme using the outer code according to an embodiment of the present invention.

Specifically, FIG. 26 shows BER/SNR performance of the SC scheme and the GC scheme according to the code rate of the outer code under the assumption that a QPSK modulation scheme is used and channels are in a Rayleigh channel environment. In charts described below, the term "Rayleigh channel environment" refers to an environment in which channels have no correlation between paths when MIMO transmission and reception is performed.

From FIG. 26, it can be seen that the SM scheme exhibits higher performance than the GC scheme at a low code rate (1/4, 1/3, 2/5, 1/2) having a large minimum Hamming distance. However, it can also be seen that the GC scheme exhibits higher performance than the SM scheme at a high code rate (2/3, 3/4, 4/5, 5/6) having a small minimum Hamming distance since the transmit diversity gain of the GC scheme is high compared to performance improvement due to coding.

Figure 27:
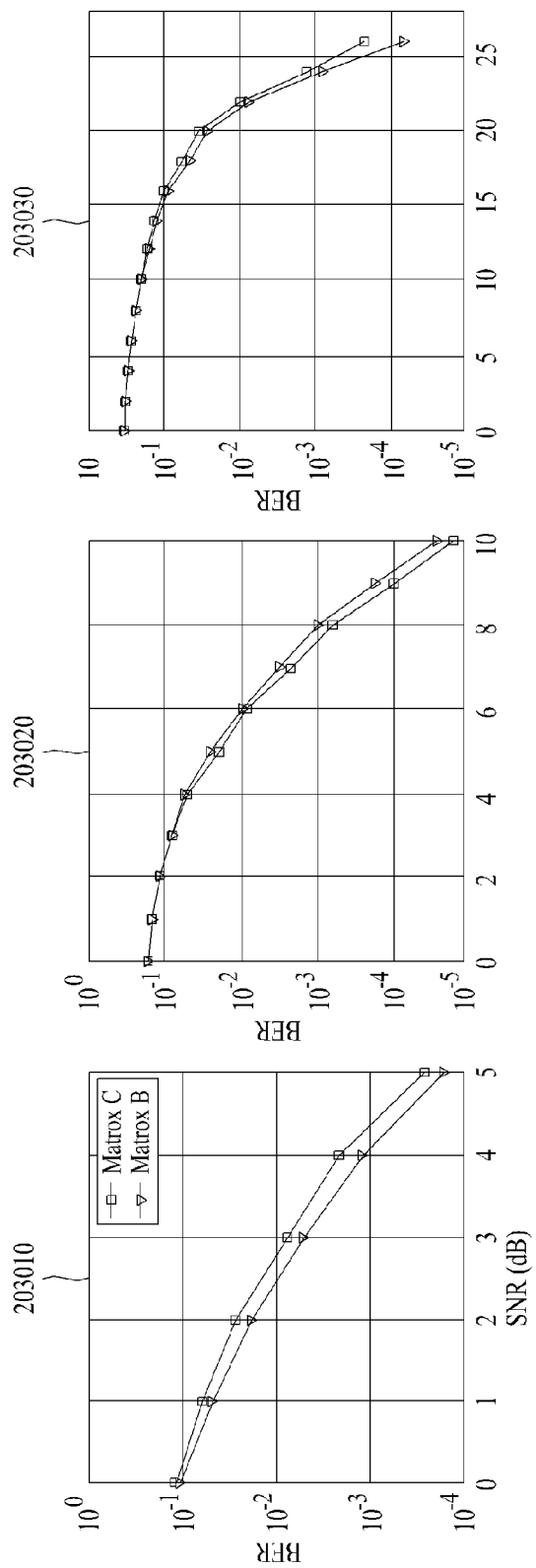
FIG. 27 is a BER/SNR chart showing a performance difference between a GC scheme and an SM scheme according to modulation schemes and a code rate of an outer code according to an embodiment of the present invention.

FIG. 27 illustrates BER/SNR charts showing the performance difference between the SM scheme and the GC scheme according to the code rate of the outer code and the modulation scheme according to an embodiment of the present invention.

The chart 203010 of FIG. 27 shows the case in which an outer code having a code rate of 1/2 and a QPSK modulation scheme are used, the chart 203020 shows the case in which an outer code having a code rate of 3/4 and a QPSK modulation scheme are used, and the chart 203030 shows the case in which an outer code having a code rate of 5/6 and a 64-QAM modulation scheme are used.

From comparison of the charts 203010 to 203030, it can be seen that the SM scheme exhibits higher performance than the GC scheme when a low code rate (1/2) is used as shown in the chart 203010 and when a large QAM size (64-QAM) is applied as shown in the chart 203030.

Accordingly, the present invention suggests that a more efficient MIMO broadcast system be designed using a robust outer code while using an SM scheme having low complexity. However, the SM scheme may have a problem associated with reception signal reconstruction (or restoration) depending on the degree of correlation between a plurality of MIMO transmission and reception channels.

Figure 28:
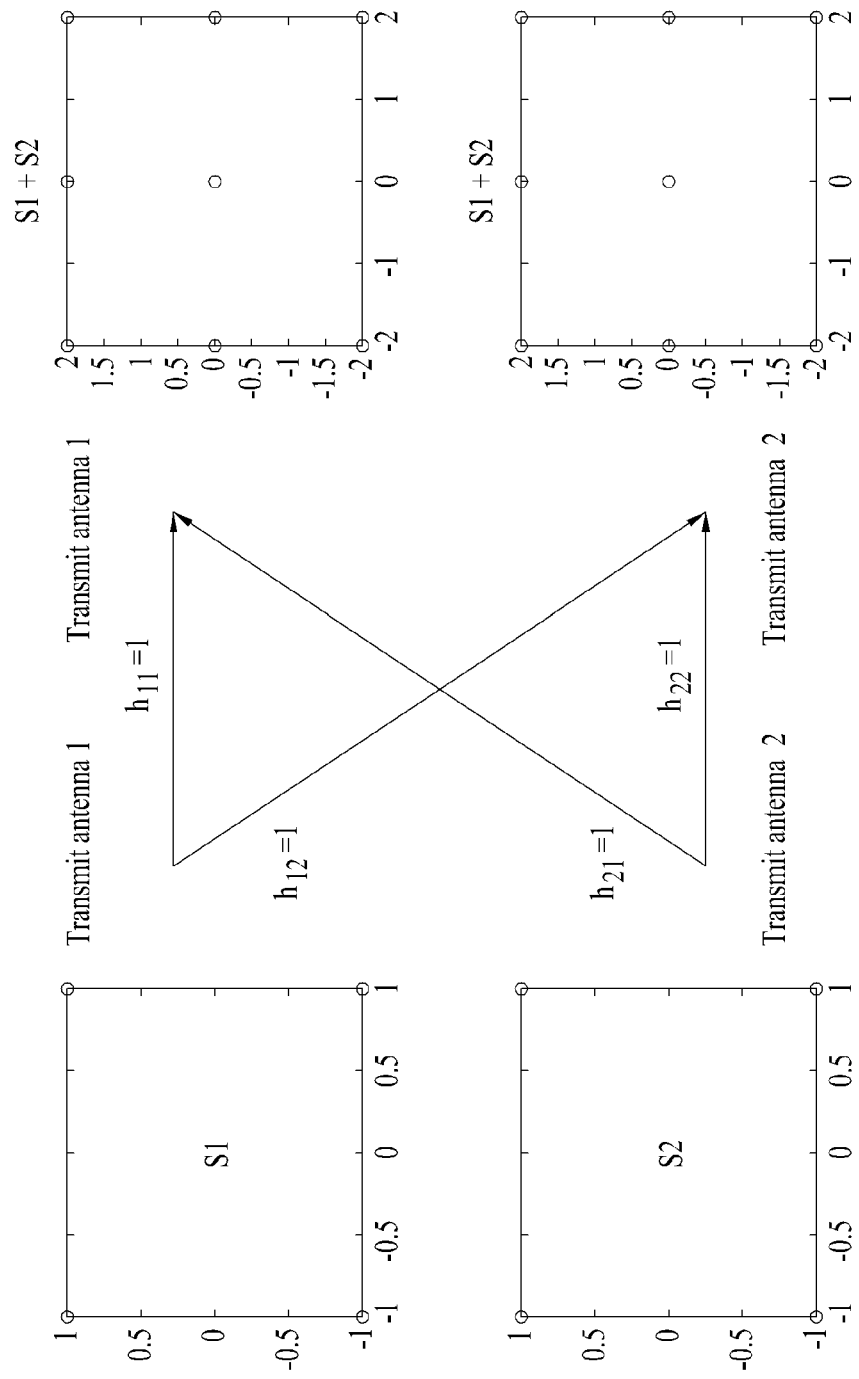
FIG. 28 illustrates a data transceiving method based on MIMO transmission of SM scheme in a channel environment according to an embodiment of the present invention.

FIG. 28 illustrates a data transmission and reception method according to MIMO transmission of the SM scheme in a channel environment according to an embodiment of the present invention.

The MIMO transmission system may transmit input signal 1 (S1) and input signal 2 (S2) respectively through transmit antenna 1 and transmit antenna 2 according to the SM scheme. FIG. 28 illustrates an embodiment in which the transmitting side transmits a symbol modulated according to 4-QAM.

The reception antenna 1 receives a signal through two paths. In the channel environment of FIG. 28, the received signal of the receive antenna 1 is $S1*h_{11}+S2h_{21}$ and the received signal of the receive antenna 2 is $S1*h_{12}+S2h_{22}$.

The receiving side may acquire S1 and S2 through channel estimation to reconstruct data.

This is a scenario in which the transmission and reception paths are independent of each other. In the following, such an environment is referred to as being uncorrelated. On the other hand, channels of the transmission and reception paths may have a very high correlation with each other as in a Line Of Sight (LOS) environment, which is referred to as being fully correlated in the following description.

In the case in which channels are fully correlated in MIMO, each channel may be represented by a 2×2 matrix whose elements are all 1 (i.e., $h_{11}=h_{12}=h_{21}=h_{22}=1$) as shown in FIG. 28. Here, the receive antenna 1 and the receive antenna 2 receive the same reception signal (S1+S2). That is, if signals transmitted through 2 transmit antennas pass through the same channel and are received by 2 receive antennas, a reception signal received by the receiver, i.e., data added (or combined) through the channel, cannot express both symbols S1 and S2. As shown in FIG. 27, in the fully correlated channel environment, the receiver cannot receive a 16-QAM symbol, into which the signal S1 represented by a 4-QAM symbol and the signal S2 represented by a 4-QAM symbol are combined and the receiver cannot separate and reconstruct the signals S1 and S2 since the receiver receives a combined signal S1+S2 represented by 9 symbols as shown on the right side of FIG. 28.

In this case, the receiver cannot reconstruct a signal received according to MIMO using the SM scheme even when the receiver is in a very high SNR environment. In the case of a communication system, communication is generally performed in two ways and therefore such a channel environment may be signaled to the transmitter through a feedback channel established between the transmitter and the receiver to allow the transmitter to change the transmission method. However, in the case of a broadcast system, it may be difficult to perform bidirectional communication through a feedback channel and one transmitter covers a large number of receivers and a large range and therefore it may be difficult to deal with various channel environment changes. Accordingly, if the SM scheme is used in such a fully correlated channel environment, the receiver cannot receive services and it is difficult to deal with such an environment, increasing costs, unless the coverage of the broadcast network is reduced.

The following is a description of a method for dealing with the case in which the correlation between MIMO channels is 1, i.e., the case in which channels are in a fully correlated channel environment.

The present invention suggests that a MIMO system be designed such that signals received through MIMO channels satisfy the following conditions so as to deal with the case in which the MIMO channels are fully correlated.

1) A received signal should be able to represent both original signals S1 and S2. That is, coordinates of a constellation received by the receiver should be able to uniquely represent sequences of S1 and S2.

2) A minimum Euclidean distance of a received signal should be increased so as to reduce symbol error rate.

3) Hamming distance characteristics of a received signal should be good so as to reduce bit error rate.

First, the present invention suggests a MIMO encoding method that uses a MIMO encoding matrix including an encoding factor "a" as expressed in the following Expression 2 so as to satisfy such requirements.

$$\begin{bmatrix} 1 & a \\ a & -1 \end{bmatrix}$$ [Expression 2]

When a MIMO encoder encodes input signals S1 and S2 using a MIMO encoding matrix as shown in Expression 2, reception signal 1 (Rx1) and reception signal 2 (Rx2) received by antenna 1 and antenna 2 are calculated as expressed in the following Expression 3. The reception signal 1 (Rx1) and reception signal 2 (Rx2) are calculated as expressed in the last line of Expression 3, especially, when MIMO channels are fully correlated.

$Rx_1 = h_{11}(S1+aS2) + h_{21}(aS1-S2)$ $Rx_2 = h_{12}(S1+aS2) + h_{22}(aS1-S2)$, if
$h_{11} = h_{21} = h_{12} = h_{22} = h$, $R = Rx_1 = Rx_2 = h\{(a+1)S1 + (a-1)S2\}$  [Expression 3]

First, when MIMO channels are uncorrelated, the reception signal 1 (Rx1) is calculated as Rx1=$h_{11}$(S1+a*S2)+$h_{21}$(a*S1−S1) and the reception signal 2 (Rx2) is calculated as Rx2=$h_{12}$(S1+a*S2)+$h_{22}$(a*S1−S2). Thus, since the signals S1 and S2 have the same power, it is possible to use gain of the MIMO system together with the SM scheme. When MIMO channels are fully correlated, the reception signals (R=Rx1=Rx2) expressed as R=h{(a+1)S1+(a−1)S2} are acquired and therefore it is possible to separate and acquire the signals S1 and S2 and the signals S1 and S2 are designed such that both have different power and therefore it is possible to secure robustness accordingly.

That is, the MIMO encoder may encode input signals S1 and S2 such that the input signals S1 and S2 have different powers according to the encoding factor "a" and are also received with different distributions even in fully correlated channels. For example, input signals S1 and S2 may be encoded such that both have different powers and the encoded signals may then be transmitted using constellations which have different Euclidean distances through normalization to allow the receiver to separate and reconstruct the input signals even when the signals have passed through fully correlated channels.

The MIMO encoding matrix described above may be represented as Expression 4 taking into consideration a normalization factor.

$$\frac{1}{\sqrt{1+a^2}} \begin{pmatrix} 1 & a \\ a & -1 \end{pmatrix} =$$  [Expression 4]

$$\begin{pmatrix} \frac{1}{\sqrt{1+a^2}} & \frac{a}{\sqrt{1+a^2}} \\ \frac{a}{\sqrt{1+a^2}} & \frac{-1}{\sqrt{1+a^2}} \end{pmatrix} = \begin{bmatrix} \cos\theta & \sin\theta \\ \sin\theta & -\cos\theta \end{bmatrix}$$

MIMO encoding of the MIMO encoder that uses the MIMO encoding matrix (or rotation matrix) shown in Expression 4 may be considered as rotating the input signals by an arbitrary angle of θ that can be represented by the encoding factor a, separating the cosine and sine components (or real and imaginary components) of the rotated signals, assigning positive and negative (+/−) signs to the separated components, and transmitting the separated components through different antennas. For example, the MIMO encoder may encode the input signals S1 and S2 such that the cosine component of the input signal S1 and the sine component of the input signal S2 are transmitted through one transmit antenna and the sine component of the input signal S1 and the cosine component of the input signal S2 to which a negative sign is attached are transmitted through another transmit antenna. The angle, by which the input signals are rotated, changes according to change of the value of the encoding factor "a" and the power distributions of the input signals S1 and S2 become different according to the value of the factor and the angle. Since the power distribution difference can be represented by a distance between symbol coordinates in the constellations, the encoded input signals can be represented by different constellations even when the input signals are received by the receiving side via fully correlated channels such that it is possible to identify and separate the signals, thereby enabling reconstruction of the original input signals.

Specifically, the Euclidian distances of transmission signals change as the power distributions change, the transmission signals received by the receiving side can be represented by identifiable constellations having different Euclidian distances such that it is possible to reconstruct the signals even when the signals have passed through a fully correlated channel. That is, the MIMO encoder can encode the input signal S1 and the input signal S2 into signals having different Euclidian distances according to the value "a" and the receiving side can receive and reconstruct the encoded and transmitted signals using identifiable constellations.

The MIMO encoder may perform encoding on input signals using the MIMO encoding matrix described above while additionally adjusting the encoding factor a. That is, it is possible to adjust and optimize the encoding factor "a" taking into consideration additional data reconstruction performance of the MIMO transmission and reception system.

1. First Embodiment

MIMO Encoding Method that Optimizes the Encoding Factor "a" Taking into Consideration Euclidian Distances (in a Fully Correlated MIMO Channel Environment).

It is possible to calculate the encoding factor value "a" taking into consideration the Euclidean distance while using the MIMO encoding matrix. In a MIMO system having two transmit antennas and two receive antennas, when transmission signal St1 is an M-QAM symbol and transmission signal St2 is an N-QAM symbol, a signal St1+St2 that is received by the receiving side via a fully correlated MIMO channel is an (M*N)-QAM signal.

FIG. 29 illustrates input signals and transmission and reception signals when a MIMO encoding method has been performed according to an embodiment of the present invention.

In the embodiment of FIG. 29, an input signal S1 has a constellation 205010 as a 4-QAM symbol and an input signal S2 has a constellation 205020 as a 4-QAM symbol. When the input signal S1 and the input signal S2 are MIMO-encoded using the MIMO encoding matrix, the encoded transmission signals St1 and St2 transmitted through antenna 1 (Tx1) and antenna 2 (Tx2) are 16-QAM symbols and have a constellation 205030 and a constellation 205040 as shown in FIG. 29.

The first embodiment of the present invention suggests a method for optimizing the value "a" such that symbols have the same Euclidian distance in a constellation 205050 of a symbol of a reception signal that has passed through a fully correlated channel as shown in FIG. 28. That is, in the case in which input signals are encoded using the MIMO matrix, it is possible to calculate or set the value of the encoding factor "a" such that reception symbols have the same Euclidean distances in a constellation of a reception signal that has passed through a fully correlated channel and to encode the input signals using the calculated or set value "a" of the encoding factor. Such a value "a" may be represented by Expression 5 for each modulation scheme combination.

$$a = \begin{cases} 3, & \text{for } QPSK + QPSK \\ (4+\sqrt{5})/(4-\sqrt{5}), & \text{for } QPSK + 16QAM \\ 0.6, & \text{for } 16QAM + 16QAM \end{cases}$$ [Expression 5]

In the embodiment of FIG. 29, the constellation 205050 of the reception symbols corresponds to a constellation in which the value "a" has been set to 3 and input signals have been MIMO-encoded through a combination of 4-QAM and 4-QAM (i.e., QPSK+QPSK). That is, the distribution and constellation of the transmission and reception symbols change according to modulation schemes of the reception signals and a combination of the modulation schemes and the Euclidean distance changes according to the distribution and constellation of the symbols and therefore the value "a" for optimizing the Euclidean distance may also change accordingly. Expression 5 also shows an encoding factor value "a" for optimizing the Euclidean distance calculated when transmission and reception signals are a combination of 4-QAM and 16-QAM (i.e., QPSK+16-QAM) and an encoding factor value "a" calculated when transmission and reception signals are a combination of 16-QAM and 16-QAM (i.e., 16-QAM+16-QAM).

Figure 30:
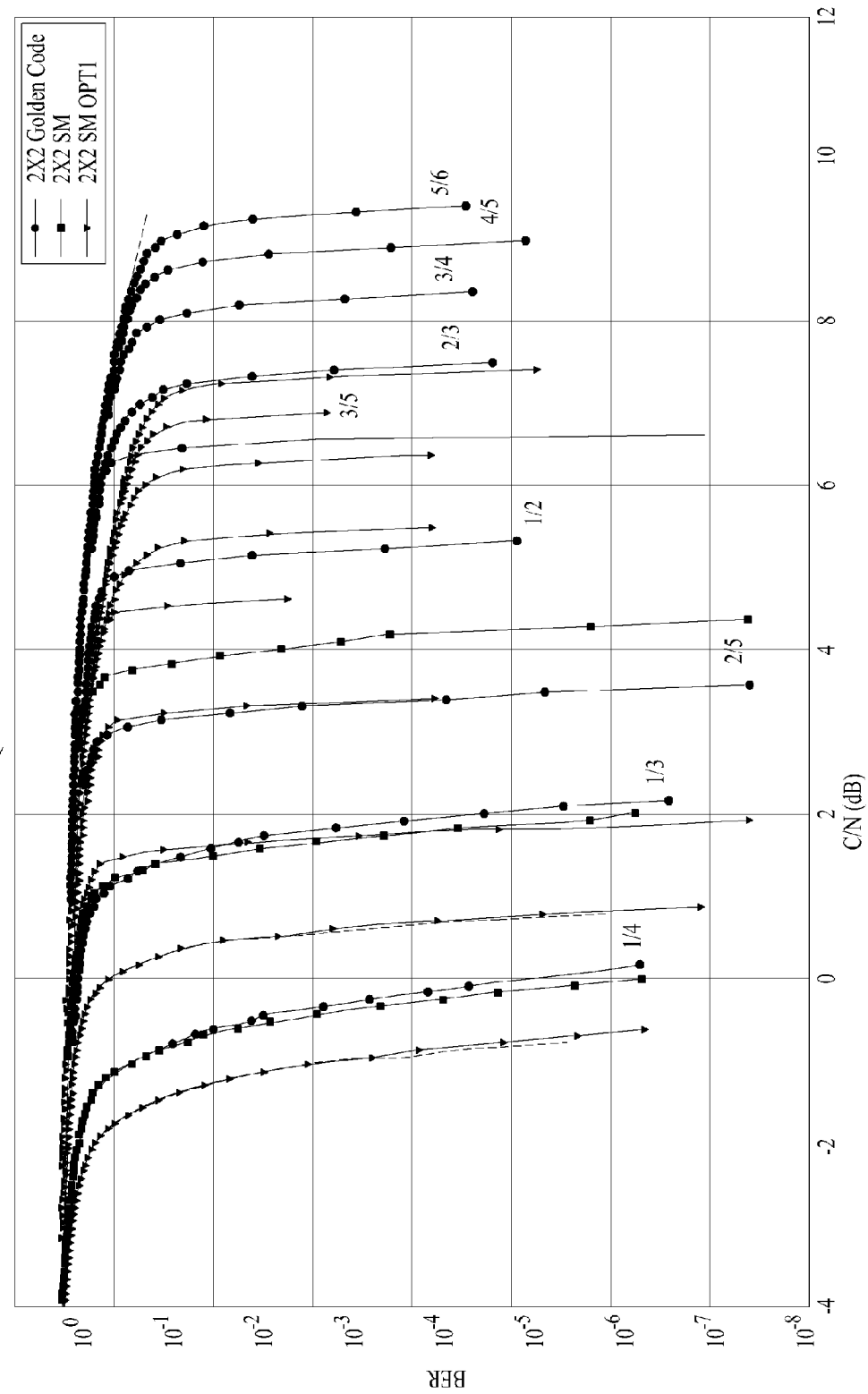
FIG. 30 is a BER/SNR chart showing the performance of a MIMO encoding method according to a first embodiment of the present invention.

FIG. 30 illustrates a BER/SNR chart showing the performance of the MIMO encoding method according to the first embodiment of the present invention.

Specifically, FIG. 30 shows a simulated performance difference between the Golden Code (GC) scheme, the SM scheme, and the MIMO encoding method (SM OPT1) according to the first embodiment when transmission and reception signals are of 16-QAM in a fully correlated channel and 2 transmit antennas and 2 receive antennas are provided. The following charts also show simulation results when an AWGN channel environment having the same channel according to the MIMO transmission and reception paths is a fully correlated channel environment as in FIG. 30.

It can be seen from FIG. 3—that the MIMO encoding method according to the first embodiment exhibits significantly better performance than the GC scheme or the SM scheme. In the chart of FIG. 30, an arrow shows an SNR gain of the first embodiment of the present invention. Specifically, it can be seen from FIG. 30 that the SNR gain increases as the code rate of the outer code increases. Especially, it can be seen that, in the case of the SM scheme, decoding cannot be performed in a fully correlated MIMO channel environment and services cannot be received regardless of the SNR at a code rate higher than 2/5.

Figure 31:
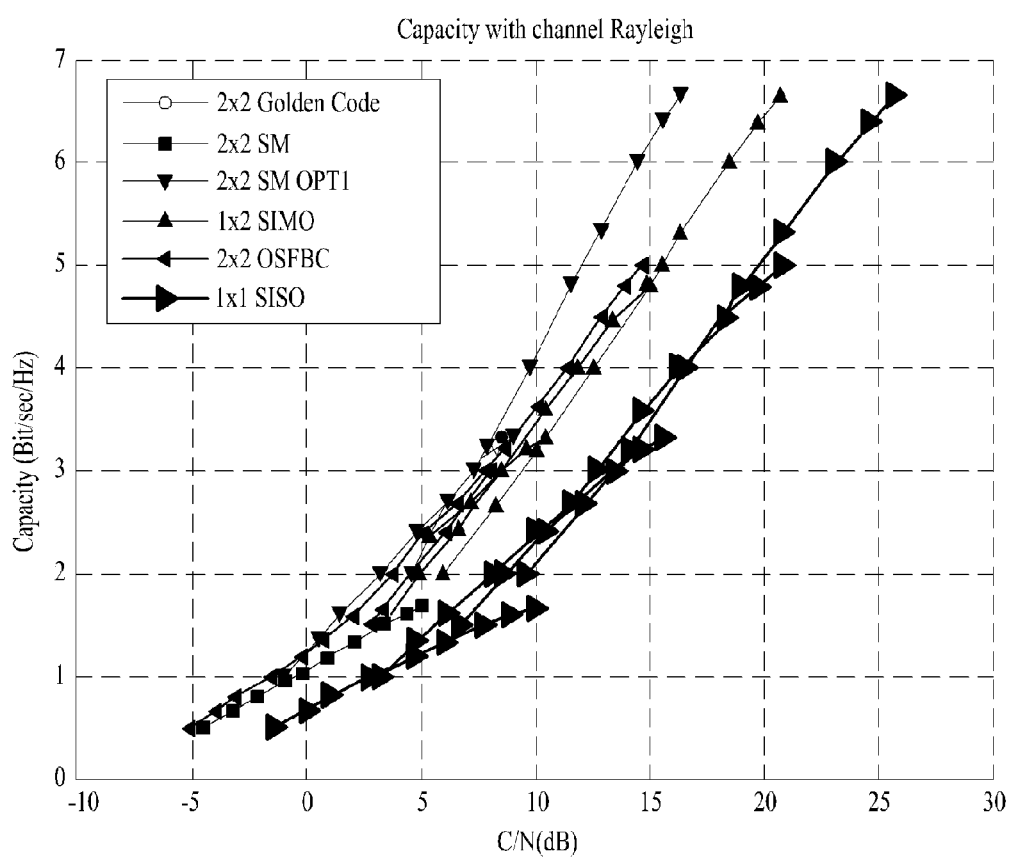
FIG. 31 is a capacity/SNR chart showing the performance of the MIMO encoding method according to the first embodiment of the present invention in an uncorrelated channel.

FIG. 31 illustrates a capacity/SNR chart showing the performance of the MIMO encoding method according to the first embodiment of the present invention in an uncorrelated channel.

In FIG. 31, a capacity satisfying a specific error rate on the horizontal axis representing the SNR is shown according to each MIMO scheme. In the chart of FIG. 31, OSFBC denotes the Alamouti scheme. From the chart, it can be seen that the MIMO encoding method of the first embodiment of the present invention exhibits the same performance as the SM scheme while exhibiting the best performance among other schemes.

Figure 32:
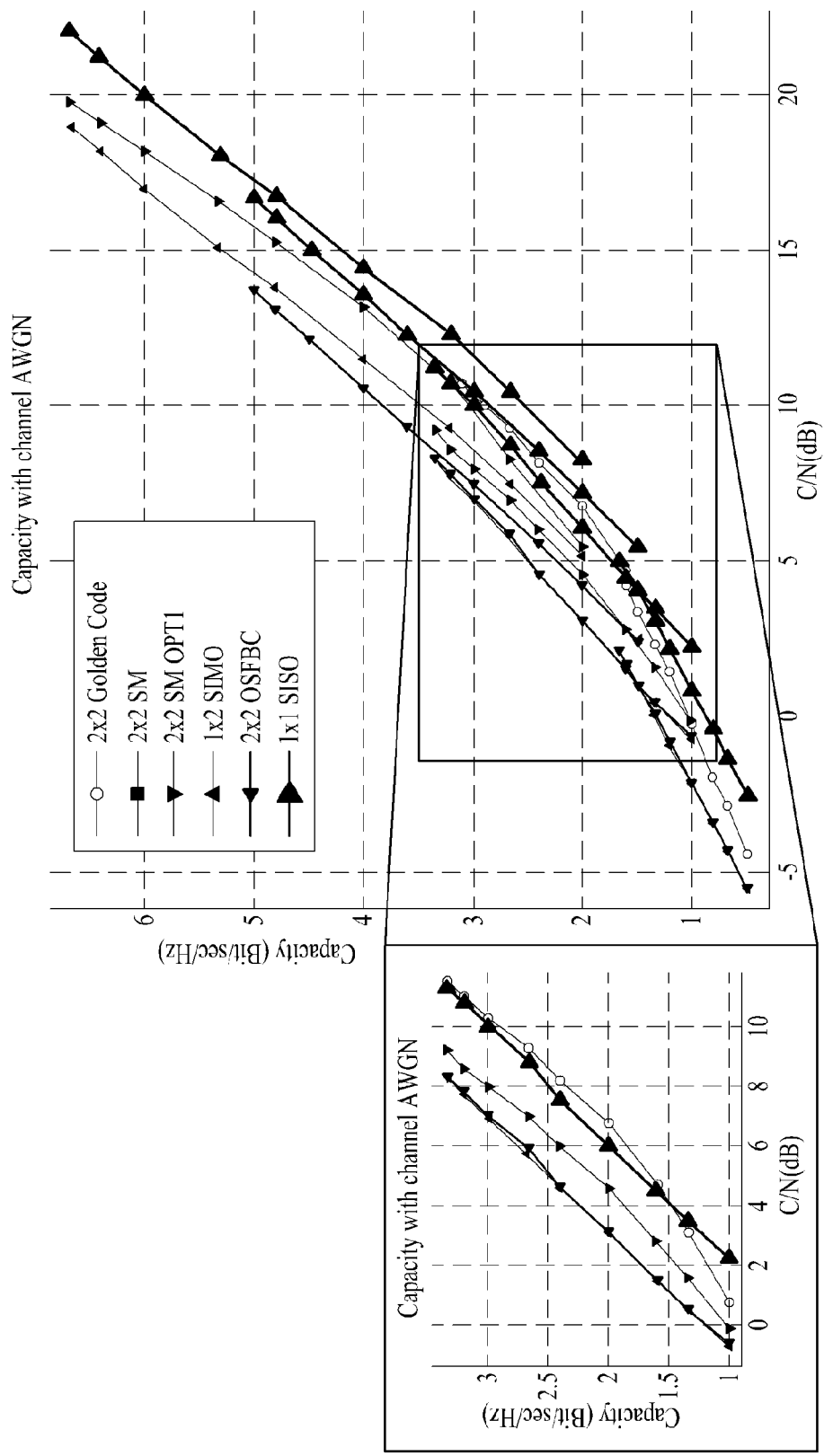
FIG. 32 is a capacity/SNR chart showing the performance of the MIMO encoding method according to the first embodiment of the present invention in a fully correlated channel.

FIG. 32 illustrates a capacity/SNR chart showing the performance of the MIMO encoding method according to the first embodiment of the present invention in a fully correlated channel.

It can be seen from FIG. 32 that, in a fully correlated MIMO channel, the MIMO encoding method according to the first embodiment exhibits significantly better SNR performance than the SM scheme and the GC scheme and also exhibits better performance than the SISO scheme.

Accordingly, it can been from the charts of FIGS. 31 and 32, the MIMO encoding method according to the first embodiment of the present invention can achieve higher performance than the GC scheme while using a system having lower complexity than the GC scheme and can also achieve significantly better performance than the SM scheme having similar complexity in a fully correlated channel environment.

In another embodiment of the present invention, a GC subset may be used as a MIMO encoding matrix when MIMO encoding is performed. In this case, the MIMO encoding matrix is represented by Expression 6.

$$\begin{bmatrix} \alpha & \alpha\theta \\ i\bar{\alpha} & i\bar{\alpha}\bar{\theta} \end{bmatrix} \begin{bmatrix} S1 \\ S2 \end{bmatrix}, \alpha = 1 + (1-\theta)i,$$ [Expression 6]

$$\bar{\alpha} = 1 + (1-\bar{\theta})i, \theta = \frac{1+\sqrt{5}}{2}, \bar{\theta} = \frac{1-\sqrt{5}}{2}$$

Using the encoding matrix of Expression 6 exhibits better performance than the first embodiment of the present invention.

Figure 33:
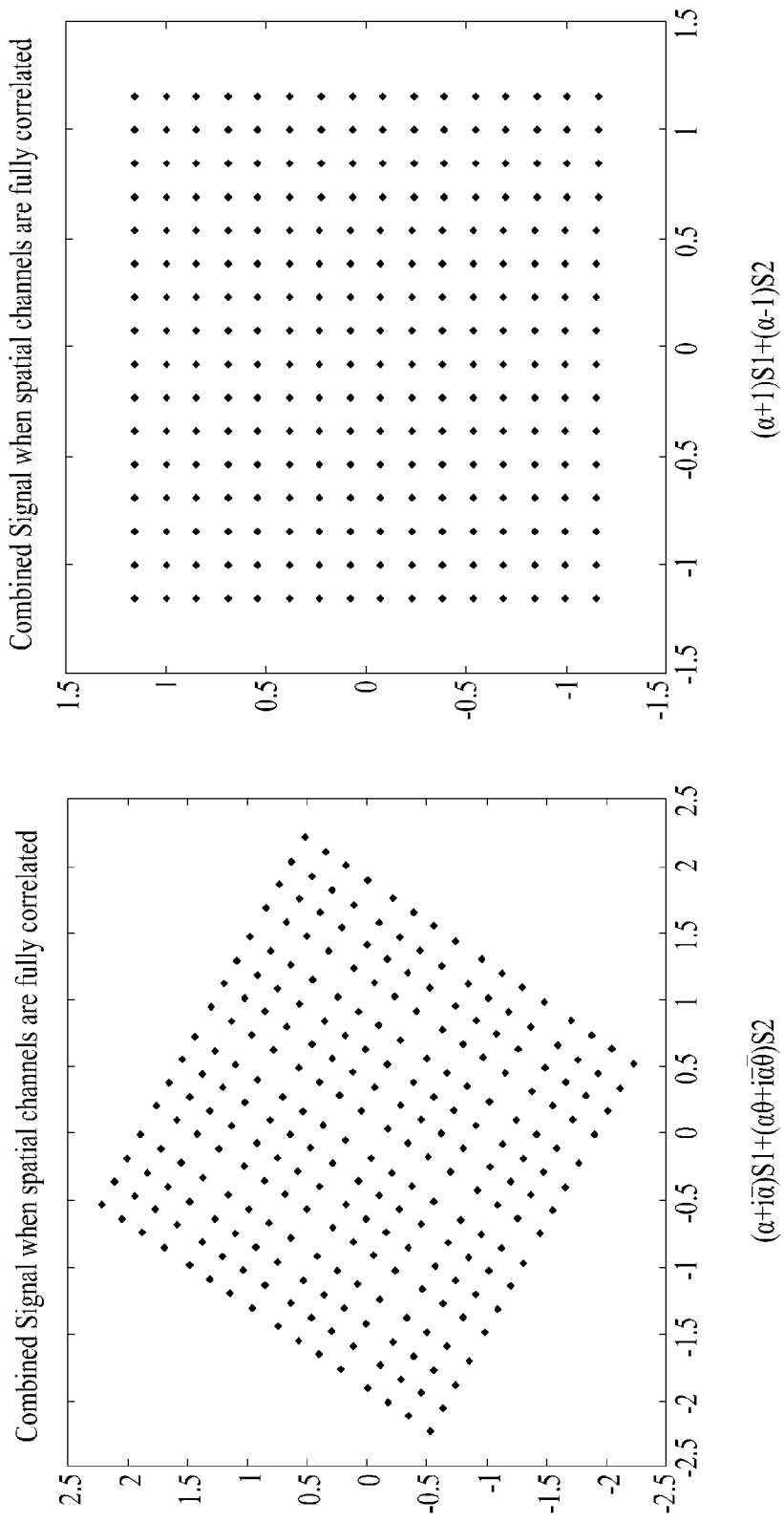
FIG. 33 shows constellations when a sub-set of GS is used as a MIMO encoding matrix and in the case of the first embodiment of the present invention.

FIG. 33 illustrates a constellation when a GC subset is used as a MIMO encoding matrix and a constellation when the first embodiment is applied.

The constellation of FIG. 33 is a constellation in the case in which a 16-QAM type input signal S1 and 16-QAM type input signal S2 are MIMO-encoded using a MIMO encoding matrix and signals transmitted through 2 transmit antennas are received by a receiver through a fully correlated channel. The left part of FIG. 33 shows a reception constellation when a GC subset is used and the right part shows a reception constellation when the first embodiment is used.

Figure 34:
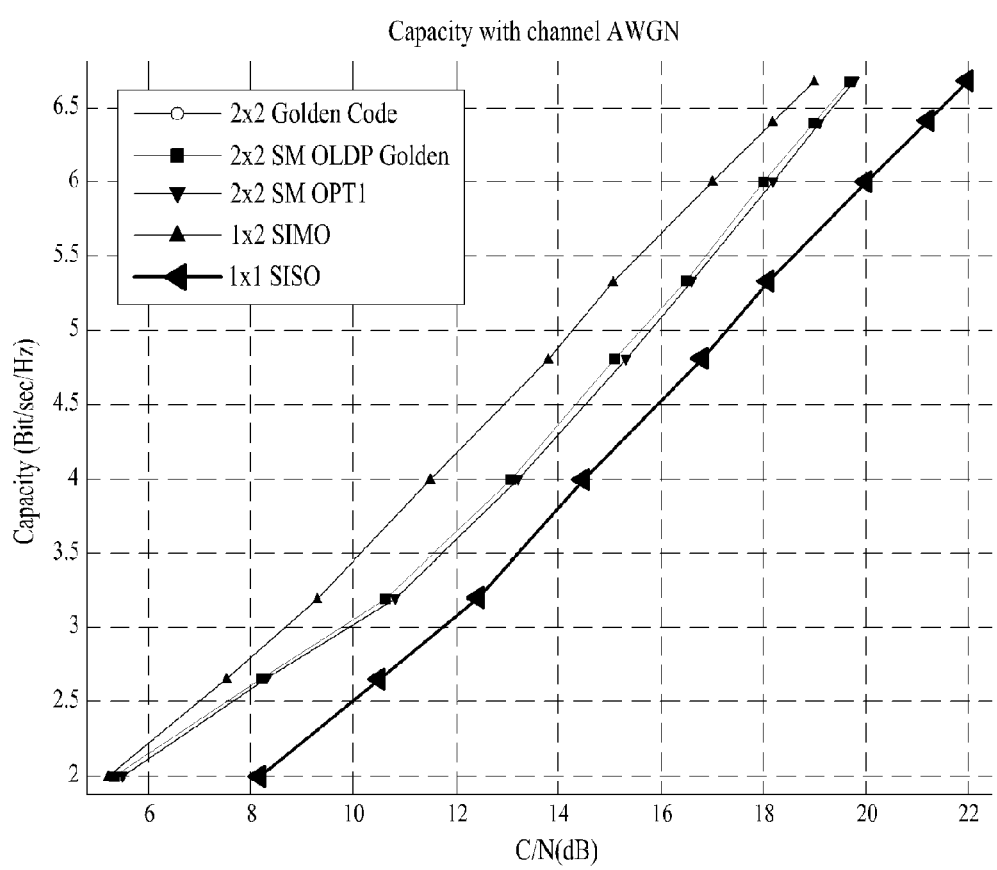
FIG. 34 is a capacity/SNR chart showing performances when the sub-set of GS is used as the MIMO encoding matrix and in the case of the first embodiment of the present invention.

FIG. 34 illustrates a capacity/SNR chart showing a performance comparison between when a GC subset is used as a MIMO encoding matrix and when the first embodiment is used.

As can be seen from the chart, SNR performance is higher when the GC subset is used while the minimum Euclidean distance of a constellation of a reception signal when the first embodiment (SM OPT1) is applied is greater than when the GC subset is used. Thus, the performance of the first embodiment differs due to a factor other than the Euclidian distance, the reason of which is described below.

Figure 35:
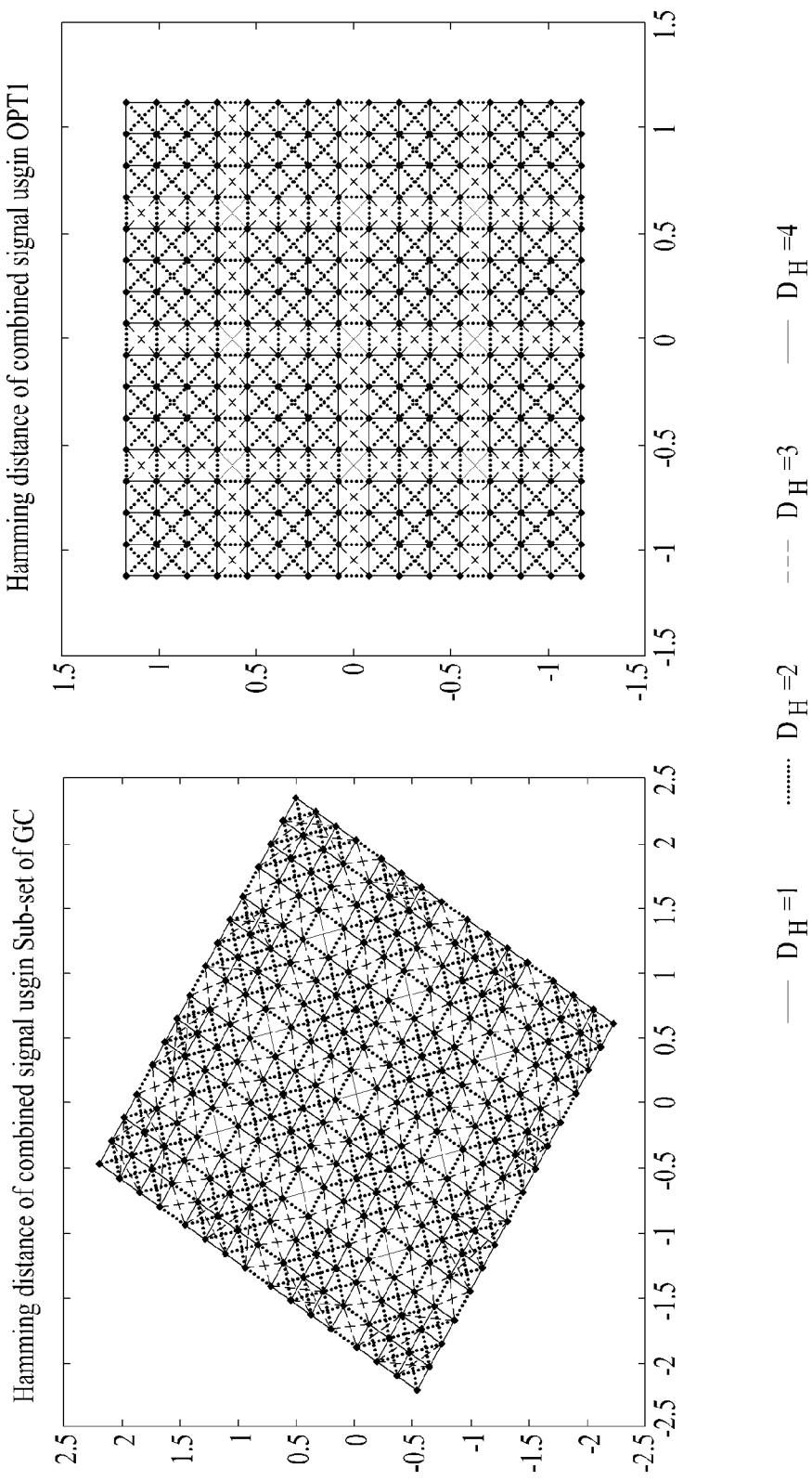
FIG. 35 illustrate the relationship between a Euclidean distance and hamming distance in the constellations when a sub-set of GS is used as a MIMO encoding matrix and in the case of the first embodiment of the present invention.

FIG. 35 illustrates a relationship between Euclidean distance and Hamming distance in a constellation when a GC subset is used as a MIMO encoding matrix and in a constellation when the first embodiment is used.

The reason why the SNR performance of the first embodiment is lower than that when the GC subset is used although the minimum Euclidean distance of the first embodiment is greater than when the GC subset is used is associated with the relationship between the Euclidian distance and the Hamming distance.

Hamming distance distributions when the first embodiment is applied and when the GC subset is used are similar and have no gray mapping. However, it can be seen from FIG. 35 that the Euclidian distance of a green line pair or a black line pair having a greater Hamming distance when the GC subset is used is greater than that when the first embodiment is applied. That is, although internal Euclidian distances of 4 by 4 16-QAM constellations which are distributed over 16 areas in the total constellation are similar in both cases, the Euclidian distance between the 4 by 4 16-QAM constellations when the GC subset is used is greater, thereby compensating for the Hamming distance performance difference.

Due to such characteristics, the case of using the GC subset exhibits higher BER performance than the case of the first embodiment although the minimum Euclidean distance when the GC subset is used is smaller than when the first embodiment is applied. Accordingly, in the following, the present invention suggests a MIMO encoding method having higher SNR performance or BER performance.

2. Second Embodiment

MIMO Encoding Method Taking into Consideration Gray Mapping in Addition to Euclidian Distance The second embodiment suggests a MIMO encoding method in which an encoding factor value "a" is set so as to optimize the Euclidean distance, similar to the first embodiment, and MIMO encoding is performed such that a reception signal that has passed through a fully correlated channel has a gray mapping (or gray mapping form).

In the MIMO encoding method of the second embodiment, at the receiving side, the signs of real and imaginary parts of the input signal S2 among the input signals S1 and S2 may be changed according to a value of the input signal S1 such that each signal becomes a gray mapping signal. Data values included in the input signal S2 may be changed using a method represented by the following Expression 7.

$S1 = b_0 b_1 \ldots b_{n-1}$, $N = \log_2 M$, $M = $QAM size of $S1$ $\text{real}(S1) = b_0 b_1 \ldots b_{N-2}$ $\text{imag}(S1) = b_1 b_3 \ldots b_{N-1}$ for $i = 1 \ldots N-1$ $si = sq = 1$ if $i = $index of real($S1$) and $b_i = 1$ $si = -si$ if $i = $index of imag($S1$) and $b_i = 1$ $sq = -sq$ end for $S2 = si \cdot \text{real}(S2) + i \cdot sq \cdot \text{imag}(S2)$ [Expression 7]

Figure 36:
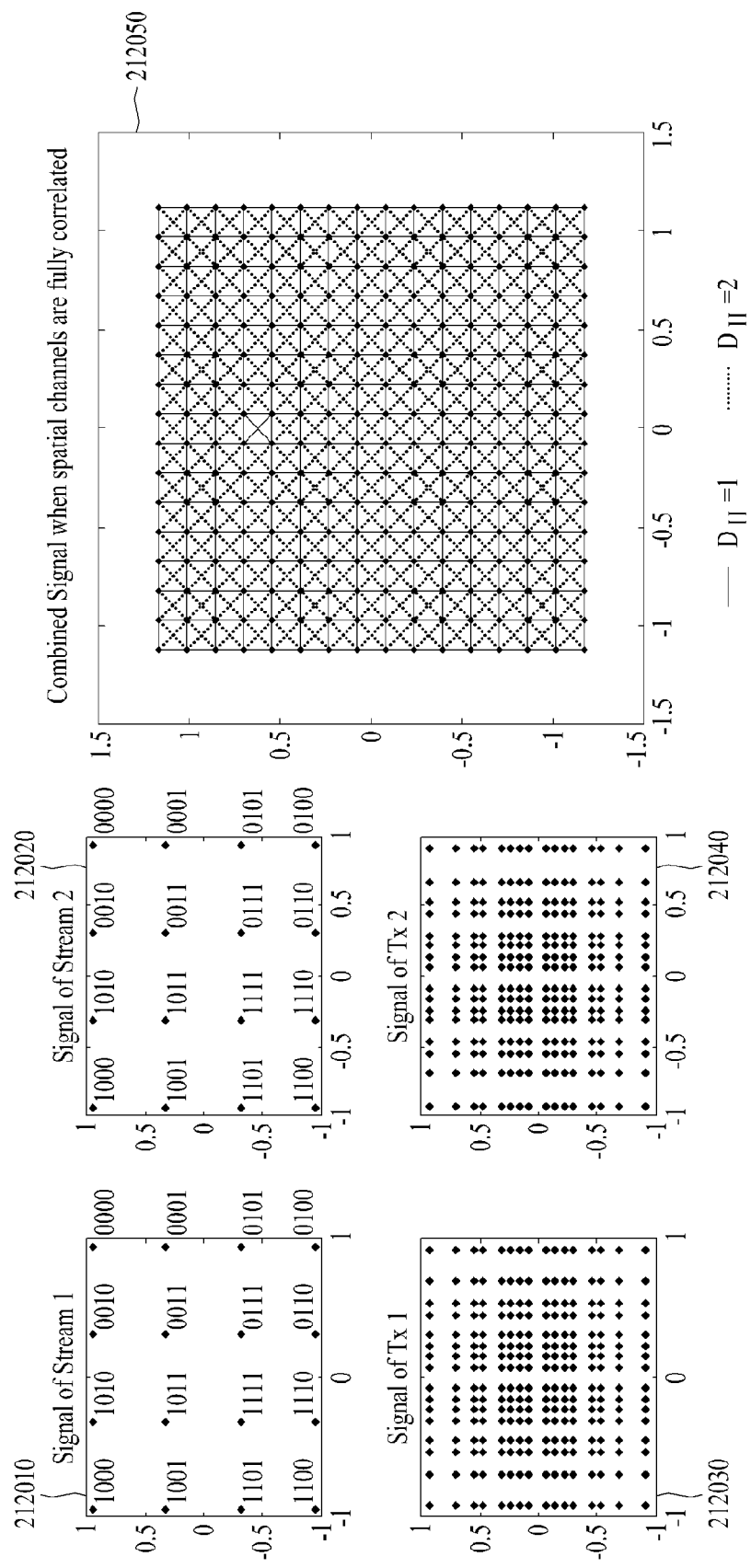
FIG. 36 illustrates input signals and a transmitted/received signal on which a MIMO encoding method according to a second embodiment of the present invention has been performed.

FIG. 36 illustrates input signals and transmission and reception signals when a MIMO encoding method has been performed according to the second embodiment of the present invention.

If bit values assigned to the real and imaginary parts of the input signal S1 212010 among the input signals S1 and S2 212010 and 212020 are XORed as in Expression 7 and the signs of the real and imaginary parts are determined according to the XORed value and transmission signal 1 202030 and transmission signal 2 212040 are transmitted respectively through antenna 1 and antenna 2, then reception symbols of a reception signal 212050, which is received by the receiver via a fully correlated channel, have a gray mapping form such that the Hamming distance between adjacent symbols in the constellation does not exceed 2 as shown in FIG. 36.

Since an (M*N)-QAM signal received by the receiver has a minimum Euclidean distance and a gray mapping form, the second embodiment may achieve the same performance as the SIMO scheme even in a fully correlated MIMO channel environment. However, when signals S1 and S2 are acquired by decoding the reception signal at the ML decoder, complexity may be increased since the value of S2 depends on the value of S1 and performance may be degraded due to the correlation between input signals in an uncorrelated MIMO channel.

3. Third Embodiment

MIMO Encoding Method that Sets MIMO Encoding Factor Taking into Consideration Hamming Distance in Addition to Euclidian Distance The third embodiment suggests a method in which MIMO encoding is performed by setting an encoding factor value "a" so as to optimize the Euclidian distance taking into consideration the Hamming distance of a reception signal rather than allowing the entire constellation of the reception signal to have a Euclidian distance as in the first embodiment.

Figure 37:
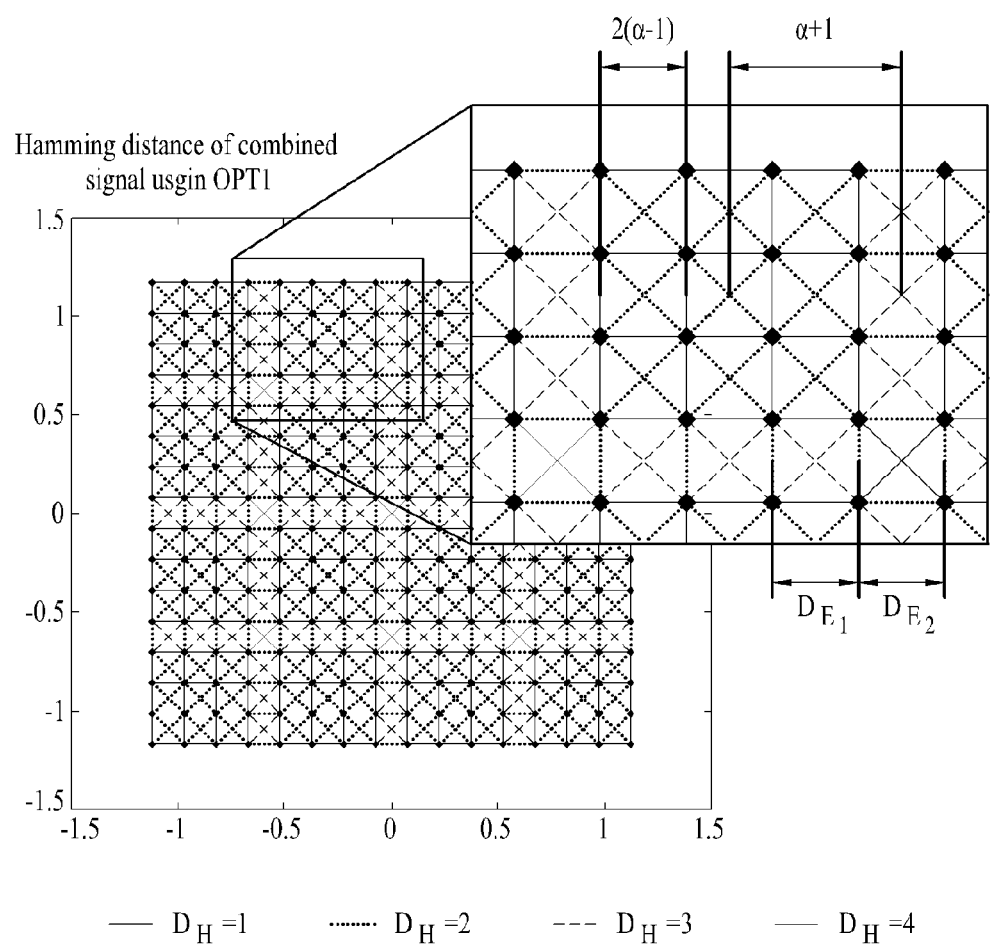
FIG. 37 illustrates a MIMO encoding method according to a third embodiment of the present invention.

FIG. 37 illustrates a MIMO encoding method according to the third embodiment of the present invention.

FIG. 37 illustrates a relationship between the value of an encoding factor "a" of a MIMO encoding matrix and a Hamming distance in a constellation of a reception signal received through a fully correlated MIMO channel. In the third embodiment, a Hamming distance of interval D_E1 is smaller than a Hamming distance of interval D_E2 in the constellation of the reception signal and therefore the Euclidian distance is adjusted so as to compensate for the Hamming distance difference by maintaining the power difference between the interval D_E1 and the interval D_E2 such that the power of the interval D_E1 is twice the power of the interval D_E2. That is, the Euclidian distance is adjusted so as to compensate for the reconstruction performance difference due to the Hamming distance difference using the power difference.

In the example of FIG. 37, the Hamming distance of the interval D_E2 is twice higher than that of the interval D_E1. That is, the Euclidian distance between adjacent symbols in an interval, whose Hamming distance is twice greater than another interval since the number of bits thereof is twice greater than the other interval, can be increased so as to increase power of the interval, thereby compensating for performance degradation due to the Hamming distance difference when a reception signal is reconstructed. First, a relative Euclidian distance of a reception signal into which 2 transmission signals St1 and St2 received by the receiver are combined as shown in FIG. 36 is determined. It can be seen from the above Expression 1 that the minimum Euclidean distance of a 16-QAM symbol whose power is reduced is $2(a-1)$ and the minimum Euclidean distance of a 16-QAM symbol whose power is increased is $2(a+1)$ (since one reception signal is expressed as $R = h\{(a+1)S1 + (a-1)S2\}$). It can be seen from FIG. 36 that d_E1 is equal to the Euclidian distance of 16-QAM symbols whose power has been reduced. It can also be seen from FIG. 20 that D_E2 is twice a distance obtained by subtracting 3/2 of the Euclidean distance of 16-QAM symbols whose power has been reduced from 1/2 of the Euclidean distance of 16-QAM symbols whose power has been increased. This may be represented by Expression 8.

$$2D_{H_1} = D_{H_2}$$
$$\sqrt{2}\,D_{E_1} = D_{E_2}$$
$$2\sqrt{2}\,(a-1) = 2((a+1) - 3(a-1))$$
$$a = \frac{\sqrt{2}+4}{\sqrt{2}+2}$$
[Expression 8]

That is, the MIMO encoder performs MIMO encoding on input signals by distributing different powers to the input signals using the MIMO matrix such that the signals have different Euclidian distances. In this case, the MIMO encoder may perform MIMO encoding by calculating and setting the encoding factor value "a" such that input signals with distributed power have Euclidian distances for compensating for a Hamming distance difference according to the third embodiment.

Figure 38:
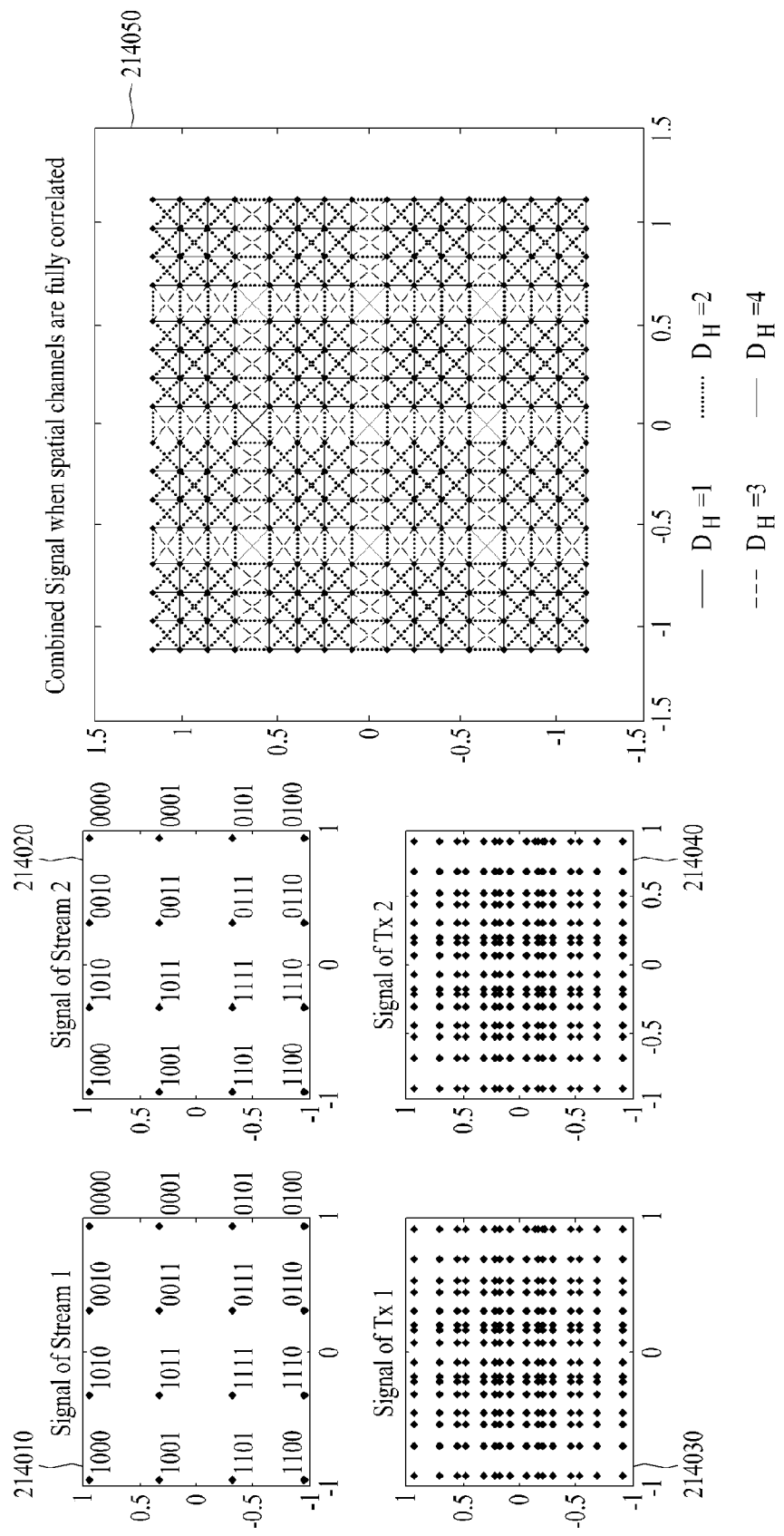
FIG. 38 illustrates input signals and a transmitted/received signal on which the MIMO encoding method according to the third embodiment of the present invention has been performed.

FIG. 38 illustrates input signals and transmission and reception signals when a MIMO encoding method has been performed according to the third embodiment of the present invention.

In the example of FIG. 38, when an input signal S1 (214010) and an input signal S2 (214020) are MIMO-encoded according to the third embodiment, the encoded transmission signals have constellations (214030) and (214040). When the transmission signals are transmitted through a MIMO channel, a reception signal received by the receiver has a constellation 214050. It can be seen from the constellation of the reception signal 214050 that the Euclidean distance has been adjusted according to the Hamming distance.

In the example described above with reference to FIGS. 37 and 38, the value "a" is calculated when the input signal S1 is a 16-QAM signal and the input signal S2 is also a 16-QAM signal. The value "a" of a different modulation scheme may be calculated as shown in Expression 8 using the same principle.

$$a = \begin{cases} \sqrt{2}+1, & \text{for } QPSK+QPSK \\ (\sqrt{2}+3\sqrt{5})/(\sqrt{2}+3-\sqrt{5}), & \text{for } QPSK+16QAM \\ (\sqrt{2}+4)/(\sqrt{2}+2), & \text{for } 16QAM+16QAM \end{cases}$$
[Expression 9]

Here, it is assumed that, in the case of QPSK+16-QAM MIMO, the values suggested above are obtained when power of the input signals S1 and S2 has been normalized to 1 after the input signals S1 and S2 are QAM-modulated through QPSK and 16-QAM, respectively, at the symbol mapper. When the power has not been normalized, the value "a" may be modified accordingly.

In addition, in the case of QPSK+16-QAM, a value of 4.0 other than the above-suggested values may be used as the value "a". The reason for this is that the combined signal can represent all input signals S1 and S2 even when the SM scheme is applied in a fully correlated channel environment. In this case, a value of 4.0 or a value close to 4.0 may be used instead of the value calculated using Expression 9 in order to compensate a high code rate of the outer code.

Figure 39:
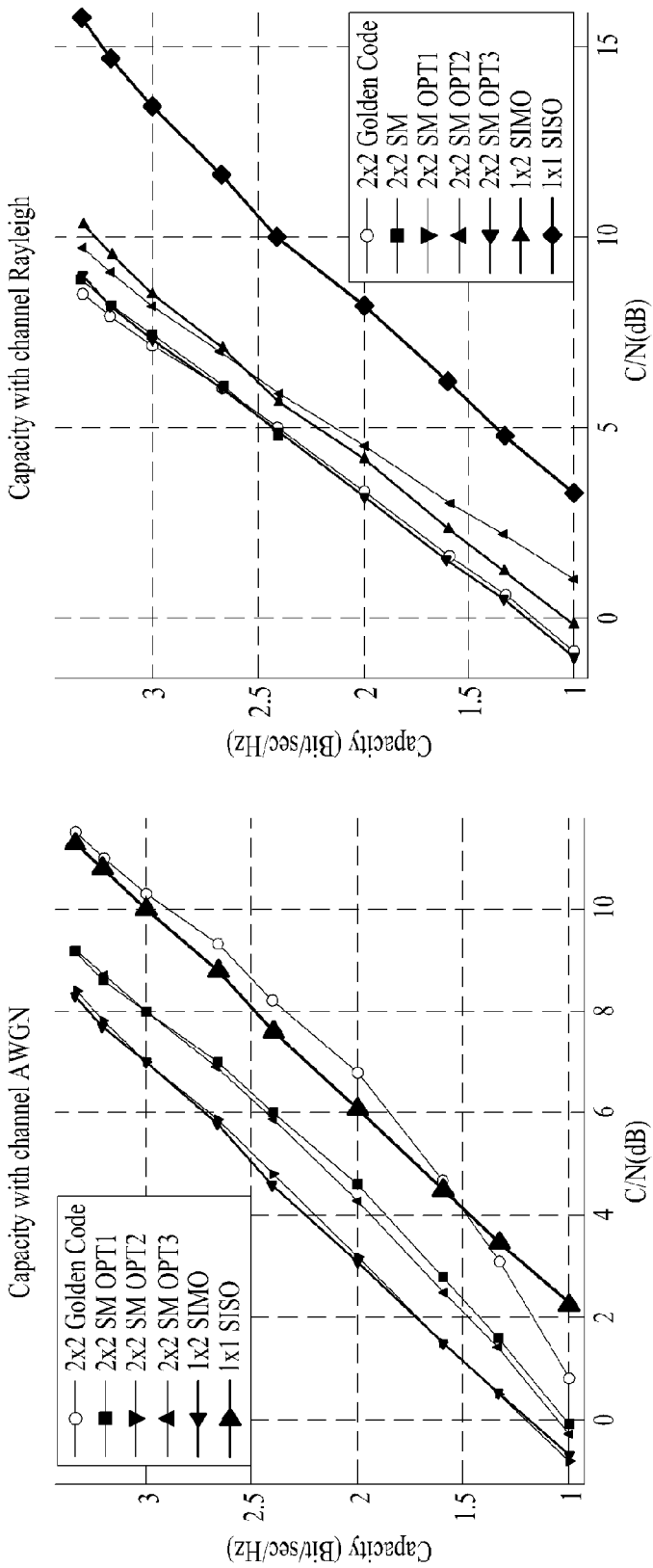
FIG. 39 is a capacity/SNR chart showing performances of the MIMO encoding methods according to the present invention.

FIG. 39 illustrates capacity/SNR charts showing a performance comparison of MIMO encoding methods according to the present invention.

It can be seen from the left chart that, in a fully correlated MIMO channel environment, the MIMO encoding method (SM OPT2) of the second embodiment has almost the same performance as the SIMO scheme. However, it can be seen from the right chart that, in an uncorrelated MIMO channel environment, the MIMO encoding method (SM OPT2) of the second embodiment suffers from performance degradation due to the relationship between the MIMO-encoded and transmitted signals S1 and S1, specifically, since the signal S2 depends on the signal S1 as described above.

It can also be seen that the MIMO encoding method (SM OPT3) of the third embodiment experiences no performance loss in an uncorrelated MIMO channel while exhibiting performance better than the first embodiment (SM OPT1) in a fully correlated MIMO channel (or channel environment).

Figure 40:
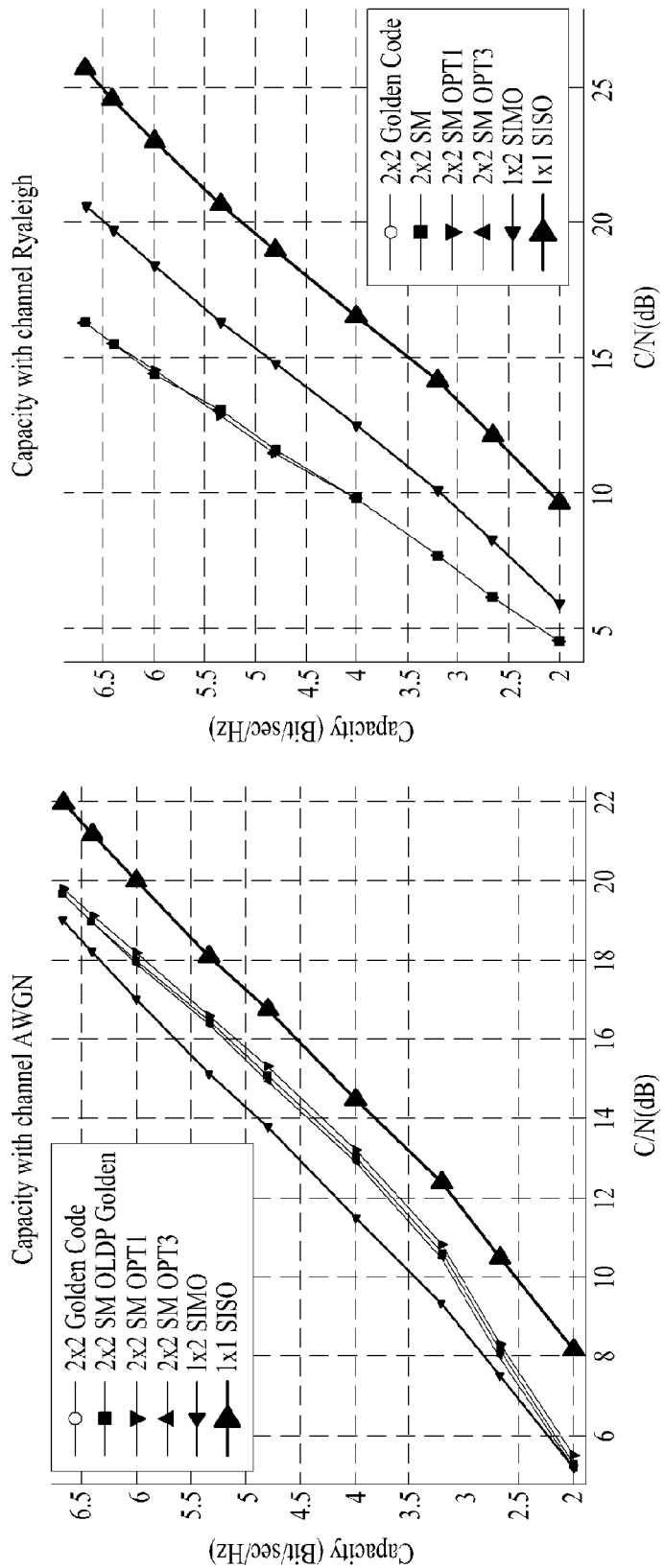
FIG. 40 is another capacity/SNR chart showing performances of the MIMO encoding methods according to the present invention.

FIG. 40 illustrates different capacity/SNR charts showing a performance comparison of MIMO encoding methods according to the present invention.

It can be seen from the left chart that, in a fully correlated MIMO channel environment, the MIMO encoding method (SM OPT3) of the third embodiment exhibits better performance than the first embodiment (SM OPT1) and the MIMO encoding method (SM OLDP Golden) that uses a subset of Gold Code (GC) and it can also be seen from the right chart that the MIMO encoding method (SM OPT3) of the third embodiment experiences no performance loss in an uncorrelated MIMO channel environment.

When the second embodiment and the third embodiment are compared with reference to the above descriptions and charts, it can be seen that the second embodiment exhibits the same performance as SIMO in a fully correlated MIMO channel environment and thus does not suffer any performance loss, thereby solving the problems of the MIMO scheme in a fully correlated MIMO channel environment. However, in the second embodiment, input signals S1 and S2 are not independent of each other due to MIMO encoding such that the signal S2 changes according to the signal S1, thereby causing performance degradation in an uncorrelated channel as can be seen from FIGS. 39 and 40. Accordingly, iterative ML detection may be used in order to solve the problem that reception and decoding errors of the signal S1 are reflected in the signal S2, causing an additional decoding error of the signal S2.

In the iterative ML detection method, an outer code is included in an iterative loop and a detection error of the signal S1 is reduced using a soft posteriori probability value of the signal S1 output from an outer port as an a priori probability value of the ML detector, thereby reducing the probability of application of the detection error of the signal S1 for detection of the signal S2. This method allows the MIMO encoding method of the second embodiment to exhibit performance of the SIMO system in a fully correlated MIMO channel environment and exhibit performance of the SIMO system in an uncorrelated MIMO channel environment.

In the MIMO encoding method of the third embodiment, a reception signal received through a fully correlated MIMO channel is designed taking into consideration both the Hamming distance and the Euclidian distance. Accordingly, the MIMO encoding method of the third embodiment not only has better performance in a fully correlated MIMO channel but also has no performance loss compared to the SM scheme in an uncorrelated MIMO channel such that it is possible to use both MIMO transmission and reception gains. In this case, there is an advantage in implementation of the receiver since the receiver has complexity similar to the SM scheme.

FIG. 41 illustrates capacity/SNR charts showing a performance comparison of combinations of modulation schemes in the MIMO encoding method according to the third embodiment of the present invention.

Specifically, FIG. 41 shows a performance comparison of a QPSK+QPSK MIMO transmission scheme and a 16-QAM+16-QAM MIMO transmission scheme of the third embodiment with SIMO schemes of 16-QAM, 64-QAM, and 256-QAM and SISO schemes of 16-QAM, 64-QAM, and 256-QAM.

From the left chart, it can be seen that, in an uncorrelated channel environment, the third embodiment achieves the MIMO transmission and reception gain and exhibits significantly better performance than the SIMO or SISO scheme. From the right chart, it can also be seen that, in a fully correlated channel environment, the third embodiment exhibits better performance than the SISO scheme but there is a performance difference between the QPSK+QPSK MIMO transmission scheme and the 16-QAM+16-QAM MIMO transmission scheme as shown. A QPSK+16-QAM transmission scheme may be used to compensate for the performance difference. In the QPSK+16-QAM transmission scheme, data of one of the input signals S1 and S2 used for MIMO encoding/decoding is a QPSK symbol and data of the other is a 16-QAM symbol. In this case, the amount of data that is transmitted at once is similar to 64-QAM of the SISO scheme.

Figure 42:
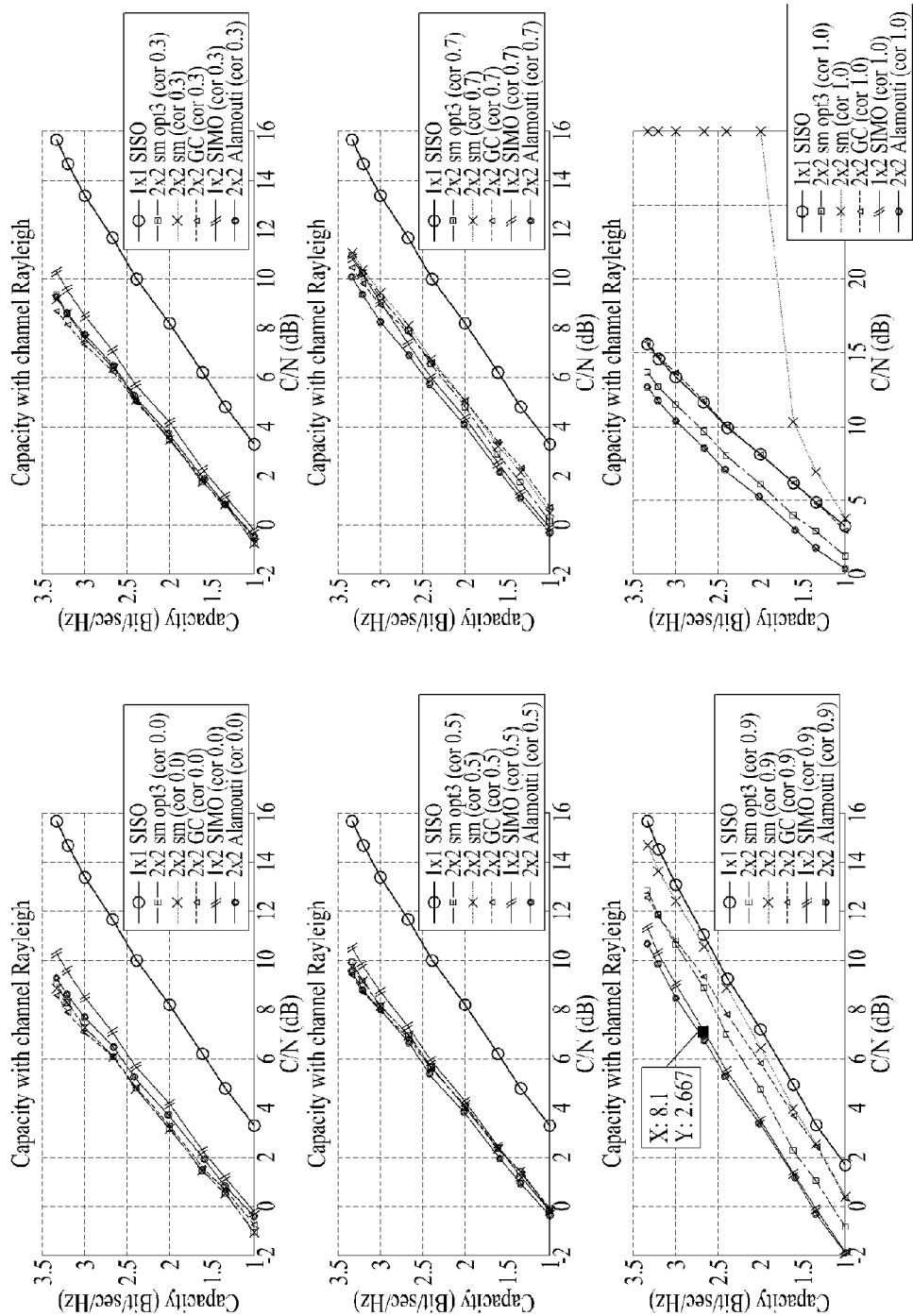
FIG. 42 is a capacity/SNR chart showing performances according to channel correlation when QPSK+QPSK MIMO transmission scheme is used in the MIMO encoding method according to the third embodiment of the present invention.

FIG. 42 illustrates capacity/SNR charts showing a performance comparison of different channel correlation levels when a QPSK+QPSK MIMO transmission scheme is used in the MIMO encoding method according to the third embodiment of the present invention.

The charts of FIG. 42 show measured performance of different MIMO channel correlation levels. A range from (cor 0.0) corresponding to a correlation level of 0 to (cor 1.0) corresponding to a correlation level of 1 is divided into 0.0, 0.3, 0.5, 0.7, 0.9, and 1.0 and performance of each correlation level is shown in a corresponding chart.

From the charts of FIG. 42, it can be seen that, when the encoding method of the third embodiment uses a QPSK+QPSK MIMO transmission scheme, performance increases as the correlation between channels increases. It can also be seen that performance is degraded to the extent that decoding is not possible in the case of a fully correlated MIMO channel (cor 1.0) when the SM scheme is used.

When the GC scheme is used, the encoding method may exhibit performance which increases as the code rate increases. However, the increased performance may still be small and the method exhibits performance lower than the embodiments of the present invention at a low code rate. From the chart of FIG. 42, it can be seen that the performance of the GC scheme is seriously degraded in a fully correlated MIMO channel environment.

Figure 43:
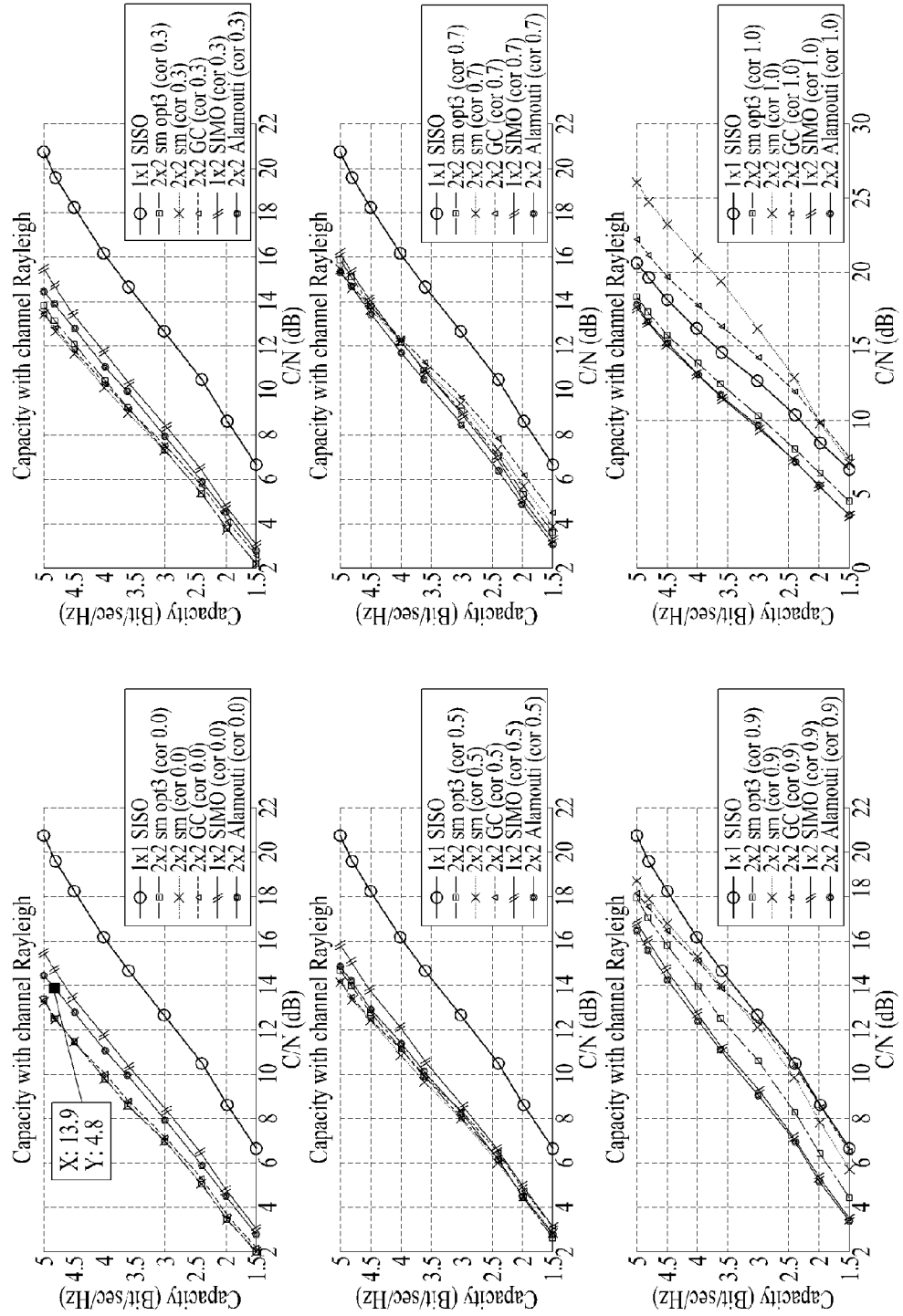
FIG. 43 is a capacity/SNR chart showing performances according to channel correlation when QPSK+16-QAM MIMO transmission scheme is used in the MIMO encoding method according to the third embodiment of the present invention.

FIG. 43 illustrates capacity/SNR charts showing a performance comparison of different channel correlation levels when a QPSK+16-QAM MIMO transmission scheme is used in the MIMO encoding method according to the third embodiment of the present invention.

The charts of FIG. 43 show measured performance of different MIMO channel correlation levels. A range from (cor 0.0) corresponding to a correlation level of 0 to (cor 1.0) corresponding to a correlation level of 1 is divided into 0.0, 0.3, 0.5, 0.7, 0.9, and 1.0 and performance of each correlation level is shown in a corresponding chart.

From the charts of FIG. 43, it can be seen that, when the encoding method of the third embodiment uses a QPSK+16-QAM MIMO transmission scheme, performance increases as the correlation between channels increases. It can also be seen that performance is significantly degraded in a fully correlated MIMO channel (cor 1.0) when the SM scheme or the GC scheme is used.

Figure 44:
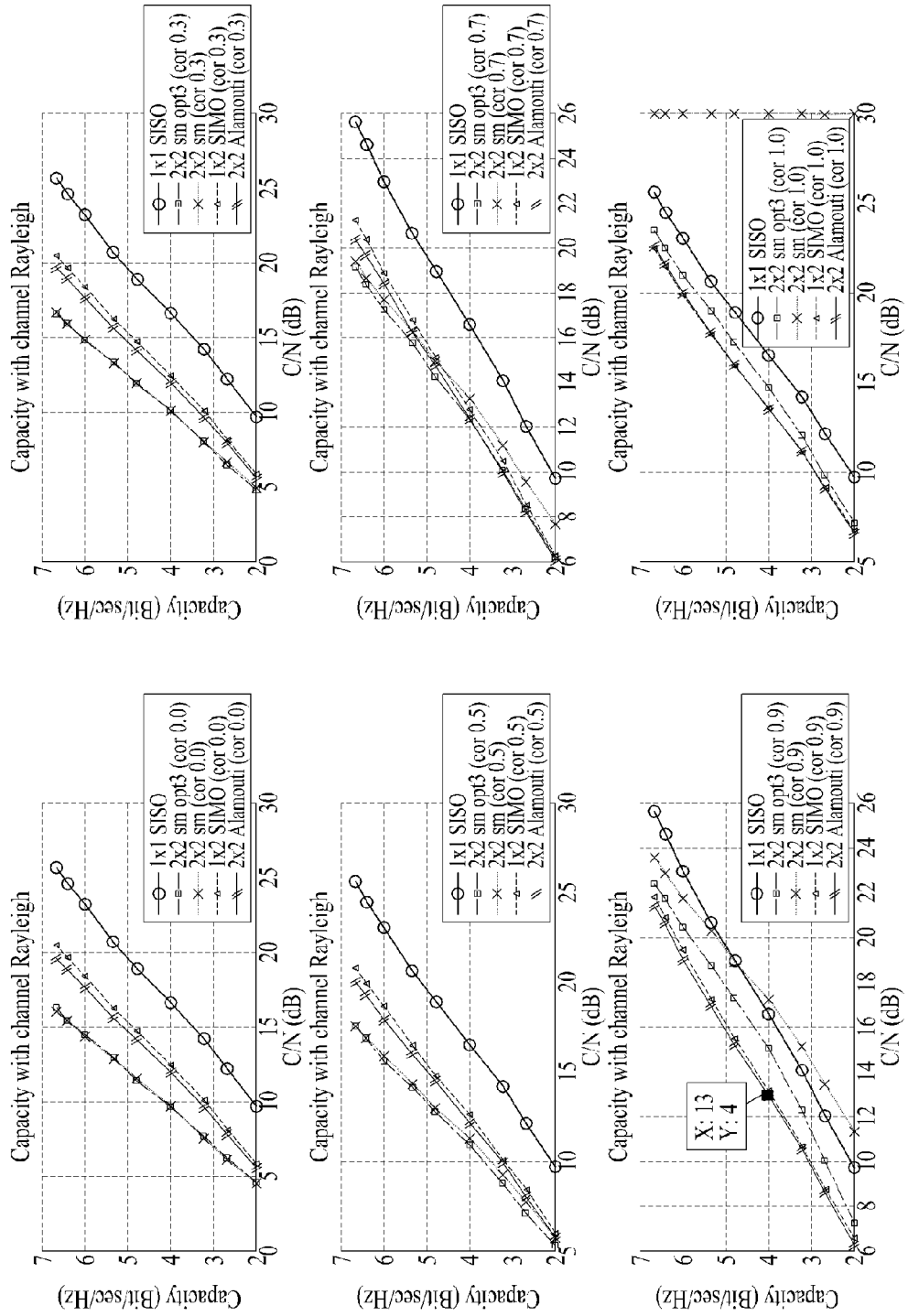
FIG. 44 is a capacity/SNR chart showing performances according to channel correlation when 16-QAM+16-QAM MIMO transmission scheme is used in the MIMO encoding method according to the third embodiment of the present invention.

FIG. 44 illustrates capacity/SNR charts showing a performance comparison of different channel correlation levels when a 16-QAM+16-QAM MIMO transmission scheme is used in the MIMO encoding method according to the third embodiment of the present invention.

The charts of FIG. 44 show measured performance of different MIMO channel correlation levels. A range from (cor 0.0) corresponding to a correlation level of 0 to (cor 1.0) corresponding to a correlation level of 1 is divided into 0.0, 0.3, 0.5, 0.7, 0.9, and 1.0 and performance of each correlation level is shown in a corresponding chart.

From the charts of FIG. 44, it can be seen that, when the encoding method of the third embodiment uses a 16-QAM+16-QAM MIMO transmission scheme, performance increases as the correlation between channels increases. It can also be seen that performance is significantly degraded in a fully correlated MIMO channel (cor 1.0) when the SM scheme or the GC scheme is used. Especially, it can be seen that, when the SM scheme is used, decoding is not possible at all code rates in a fully correlated MIMO channel environment.

Power imbalance may occur between signals that are transmitted through respective communication paths when MIMO transmission and reception is performed. That is, signals transmitted through a plurality of transmission antennas may be received by a receiver with different powers. In the worst case, only a signal transmitted by one transmission antenna may be received by the receiver. The following is a description of a MIMO encoding method which can minimize performance degradation in such a power imbalance situation.

4. Fourth Embodiment

MIMO Encoding Method that Optimizes the Encoding Factor "a" Taking into Consideration Euclidian Distances of Transmission Signals It is possible to calculate the encoding factor value "a" taking into consideration the Euclidean distance while using the MIMO encoding matrix. In a MIMO system having two transmit antennas and two receive antennas, when transmission signal St1 is an M-QAM symbol and transmission signal St2 is an N-QAM symbol, a signal St1+St2 that is received by the receiving side via a fully correlated MIMO channel is an (M*N)-QAM signal.

Figure 45:
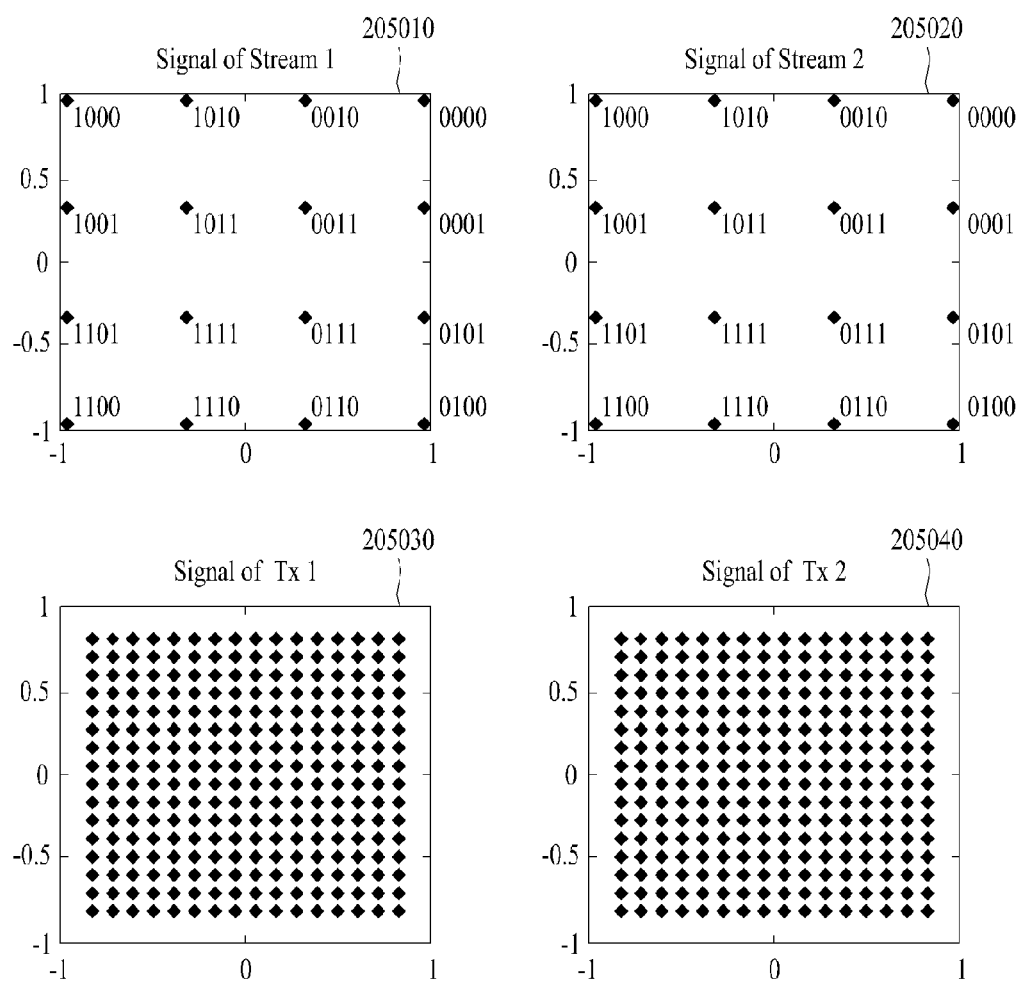
FIG. 45 illustrates input signals and transmission signals on which a MIMO encoding method according to a fourth embodiment of the present invention has been performed.

FIG. 45 illustrates input signals and transmission signals on which a MIMO encoding method according to a fourth embodiment of the present invention has been performed.

In the embodiment of FIG. 45, the input signal S1 has a constellation 221010 as a 16-QAM symbol and the input signal S2 has a constellation 221020 as a 16-QAM symbol. If the input signal S1 and the input signal S2 are MIMO-encoded using the MIMO encoding matrix, the encoded transmission signals St1 and St2 transmitted through antenna 1 (Tx1) and antenna 2 (Tx2) are 256-QAM symbols and the constellations of the encoded transmission signals have no minimum Euclidean distance. Although the value "a" may be determined by optimizing the Euclidian distance with reference to a reception signal, this may degrade decoding performance in a power imbalance situation. Accordingly, if the Euclidian distance is optimized with reference to transmission signals from the transmitting side, it is possible to minimize performance degradation that occurs in a power imbalance situation at the receiving side. Optimization of Euclidean distance means arrangement of symbols at an equal interval in a signal constellation and maximization of a minimum Euclidean distance in the constellation. The value "a" for optimizing the Euclidian distance with reference to transmission signals may be represented by Expression 10.

$$a = \begin{cases} 2, & \text{for } QPSK + QPSK \\ 4, & \text{for } 16QAM + 16QAM \end{cases} \quad \text{[Expression 10]}$$

When the value "a" determined according to Expression 10 is used, i.e., when the value "a" is set to 4 and MIMO encoding is performed using the same in the example of expressions 1 or 3, the transmission signals St1 and St2 have a constellation 221030 and a constellation 221040, respectively. From the constellations 221030 and 221040 of the transmission signals St1 and St2, it can be seen that the Euclidian distance is distributed uniformly. Accordingly, it can be understood that, when the MIMO encoding method of the first embodiment is used, it is possible to minimize reception performance degradation since the Euclidian distance of the transmission signals received in a power imbalance situation has been optimized However, a different value needs to be used when symbol types of input signals are different as in the QPSK+16-QAM transmission method. The reason for this is that, when modulation schemes of input signals used for MIMO transmission are different, a trade-off problem occurs such that, if the optimized value "a" is used for one transmission antenna, then a signal having relatively low performance is transmitted through another transmission antenna.

5. Fifth Embodiment

MIMO Encoding Method Taking into Consideration Gray Mapping in Addition to Euclidian Distance The fifth embodiment suggests a MIMO encoding method in which an encoding factor value "a" is set so as to optimize the Euclidean distance, similar to the first embodiment, and MIMO encoding is performed such that a reception signal that has passed through a fully correlated channel has a gray mapping (or gray mapping form).

In the MIMO encoding method of the second embodiment, at the receiving side, the signs of real and imaginary parts of the input signal S2 among the input signals S1 and S2 may be changed according to a value of the input signal S1 such that each signal becomes a gray mapping signal. Data values included in the input signal S2 may be changed using a method represented by the following Expression 7.

That is, the MIMO encoder may perform MIMO encoding after changing signs of the input signal S2 according to the value of the input signal S1 while using the same MIMO encoding factor as used in the first embodiment. In other words, the sign of the input signal S2 may be determined according to the sign of the input signal S1, and then the MIMO encoding matrix may be applied to the first and second input signals S1 and S2 to output the first and second transmission signals, as described above.

Since an (M*N)-QAM signal received by the receiver has a minimum Euclidean distance and a gray mapping form, the second embodiment may achieve the same performance as the SIMO scheme even in a fully correlated MIMO channel environment. However, when signals S1 and S2 are acquired by decoding the reception signal at the ML decoder, complexity may be increased since the value of S2 depends on the value of S1 and performance may be degraded due to the correlation between input signals in an uncorrelated MIMO channel.

6. Sixth Embodiment

MIMO Encoding Method that Sets MIMO Encoding Factor Taking into Consideration Hamming Distance in Addition to Euclidian Distance The sixth embodiment suggests a method in which MIMO encoding is performed by setting an encoding factor value "a" so as to optimize the Euclidian distance taking into consideration the Hamming distance of a reception signal rather than allowing the entire constellation of the reception signal to have a Euclidian distance as in the first embodiment. Specifically, it is possible to design an encoding matrix such that the square of the Euclidian distance between adjacent constellation points when the Hamming distance between the adjacent constellation points is 2 is twice the square of the Euclidian distance between the points when the Hamming distance is 1. That is, the Euclidian distance is adjusted such that a reconstruction performance difference due to a Hamming distance difference can be compensated for using a power difference.

Assuming that FIG. 37 shows a constellation of a transmit signal, a Hamming distance of the interval D_E1 is a half of a Hamming distance of the interval D_E2 in the constellation of the transmission signal, and therefore the Euclidian distance is adjusted so as to compensate for the hamming distance difference by maintaining the power difference between the interval D_E1 and the interval D_E2 such that the power of the interval D_E1 is twice the power of the interval D_E2. That is, the Hamming distance of the interval D_E2 is twice higher than that of the interval D_E1. That is, the Euclidian distance between adjacent symbols in an interval, whose Hamming distance is twice greater than another interval since the number of bits thereof is twice greater than the other interval, can be increased so as to increase power of the interval, thereby compensating for performance degradation due to the Hamming distance difference when a reception signal is reconstructed.

The value "a" may be obtained using the above conditions, which may be represented by Expression 7.

$$a = \begin{cases} \sqrt{2} + 1, & \text{for } QPSK + QPSK \\ \sqrt{2} + 3, & \text{for } 16QAM + 16QAM \end{cases} \quad \text{[Expression 11]}$$

Figure 46:
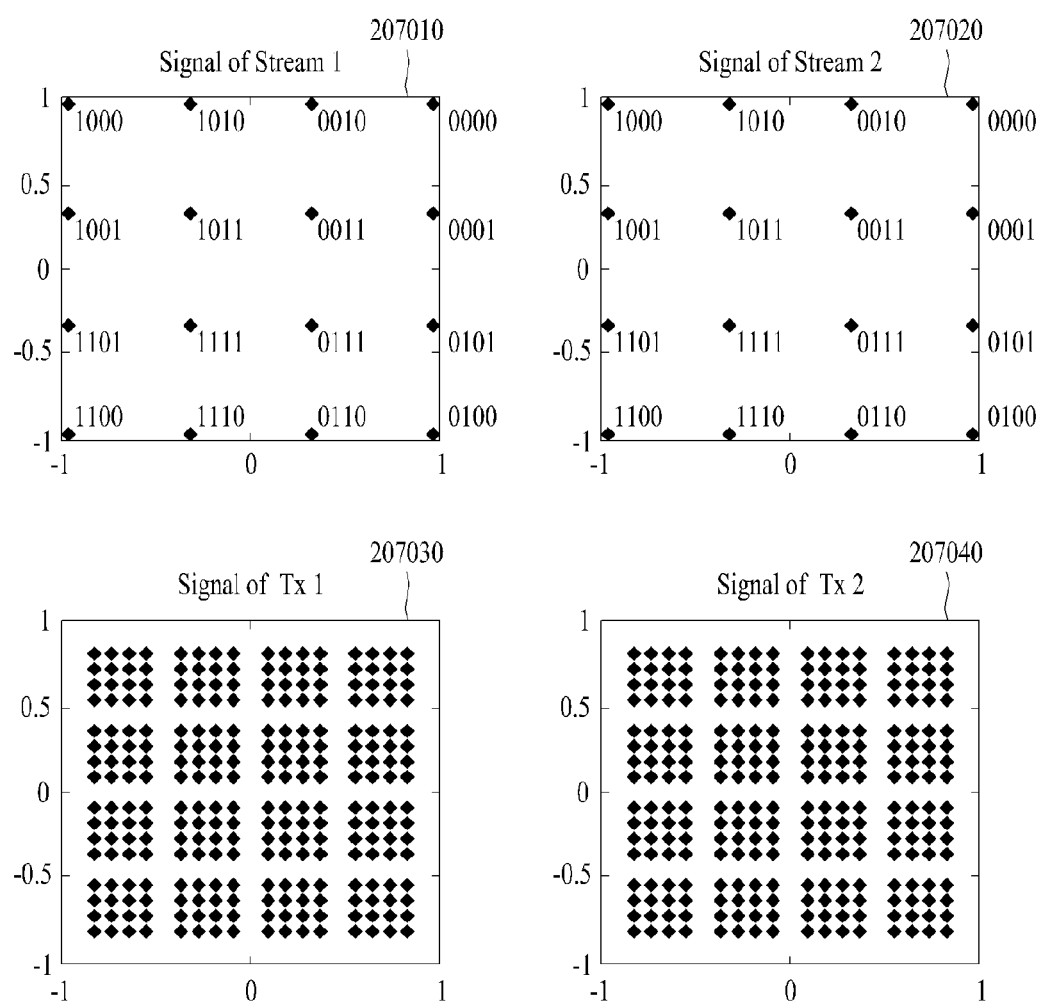
FIG. 46 illustrates input signals and transmission signals on which a MIMO encoding method according to a sixth embodiment of the present invention has been performed.

FIG. 46 illustrates input signals and transmission signals on which a MIMO encoding method according to a sixth embodiment of the present invention has been performed.

In the embodiment of FIG. 46, an input signal S1 corresponds to 16-QAM symbols and has a constellation 207010, whereas an input signal S2 corresponds to 16-QAM symbols and has a constellation 207020. When the input signal S1 and the input signal S2 are encoded using a MIMO encoding matrix including an encoding parameter set according to the third embodiment, encoded transmission signals St1 and St2, which are transmitted through antenna 1 (Tx1) and antenna 2 (Tx2), become 256-QAM symbols and respectively have constellations 207030 and 207040 having Euclidean distances taking Hamming distance into account. Furthermore, the transmission signals have symbol distributions having the Euclidean distances taking the hamming distance into account, and thus performance loss can be minimized even when a receiver receives and decodes only one of the transmission signals in a power imbalance situation.

However, when the input signals have different symbol types as in a QPSK+16-QAM transmission method, it is necessary to use different values 'a'. This is because, if a value 'a' optimized for one of the transmission antennas is used, a signal having lower quality may be transmitted through the other transmission antenna when different modulation schemes are employed for the input signals used for MIMO transmission, that is, trade-off may be generated.

Among the above-mentioned MIMO encoding schemes, the precoding matrix can be used to improve throughput or performance of the SM scheme according to one embodiment of the present invention. In the case of using the precoding matrix, input signals S1 and S2 associated with all correlation channels can be represented through Antenna 1 and Antenna 2, respectively, resulting in an increased diversity. Detailed precoding matrices are represented by Equation 4 and Equations 12 to 14.

$$\frac{1}{\sqrt{a^2+1}}\begin{bmatrix} 1 & -a \\ a & 1 \end{bmatrix}\begin{bmatrix} s_1 \\ s_2 \end{bmatrix} \quad \text{[Equation 12]}$$

$$\begin{bmatrix} \cos\theta & -\sin\theta \\ \sin\theta & \cos\theta \end{bmatrix}\begin{bmatrix} s_1 \\ s_2 \end{bmatrix}, \theta = \operatorname{atan}(a) \quad \text{[Equation 13]}$$

$$\begin{bmatrix} \cos\theta(n) & -\sin\theta(n) \\ \sin\theta(n) & \cos\theta(n) \end{bmatrix}\begin{bmatrix} s_1 \\ s_2 \end{bmatrix}, \theta(n) = \frac{2\pi}{N}n, \quad \text{[Equation 14]}$$
$$n = 0, \ldots, N-1$$

Equations 12 and 13 are different from Equation 4 in terms of representation, but the Equations 12 and 13 have the same mathematical meaning as that of Equation 4. In Equation 14, a rotation angle of the matrix is not fixed, is changed according to the value of n, such that the changed result can be used. In this case, n may be changed according to an OFDM carrier index or an OFDM symbol index. Here, after the receiver is synchronized with the transmitter to obtain the value of n, the receiver may perform decoding. In addition, the embodiment based on Equation 14 does not follow MIMO encoding performance given according to a specific rotation angle of the matrix, and may follow average performance of several rotation angles.

In order to improve performance of the above-mentioned SM scheme, a matrix may be used in consideration of the precoding matrix and the phase rotation according to one embodiment of the present invention.

In this case, influence caused by channel variation according to transmitter characteristics can be minimized, and additional diversity can be obtained. In addition, a phase rotation may also be applied only to a path of any one of several antennas. This example may be changed according to a designer's intention.

Equation 15 is a matrix obtained when phase rotation is applied to the precoding matrix.

$$\begin{bmatrix} 1 & 0 \\ 0 & e^{j\phi(k)} \end{bmatrix}\begin{bmatrix} \text{Precoding} \\ \text{Matrix} \end{bmatrix}\begin{bmatrix} s_1 \\ s_2 \end{bmatrix}, \quad \text{[Equation 15]}$$

$$\phi(k) = \frac{2\pi}{N}k, k = 1, \ldots, N-1$$

The precoding matrix located at the center part of Equation 15 may be set to any one of Equation 4 and Equations 4 to 14. In the case of using the matrix of Equation 15, signals transmitted from Antenna 1 and Antenna 2 may represent Signal S1 and Signal S2 as necessary. Therefore, the transmitter minimizes channel variation influence caused by transmitter characteristics, and transmits signals using the minimized channel variation. The receiver may separate the signals S1 and S2 from each other using only signals transmitted from the transmitter, and may recover each of the signals S1 and S2. In more detail, the receiver may synchronize and obtain the index K of the phase rotation used for the matrix, and may calculate LLR using the precoding matrix.

Equation 15 may also be represented by Equation 16 and Equation 17.

$$\begin{bmatrix} 1 & 0 \\ 0 & e^{j\phi(k)} \end{bmatrix}\begin{bmatrix} \cos\theta & -\sin\theta \\ \sin\theta & \cos\theta \end{bmatrix}\begin{bmatrix} s_1 \\ s_2 \end{bmatrix}, \quad \text{[Equation 16]}$$

$$\theta = \begin{cases} \operatorname{atan}(\sqrt{2}+1), & \text{for } QPSK+QPSK \\ \operatorname{atan}((\sqrt{2}+4)/(\sqrt{2}+2)), & \text{for } 16QAM+16QAM \end{cases}$$

Equation 16 may also be denoted by the following Equation 17.

$$\frac{1}{\sqrt{a^2+1}}\begin{bmatrix} 1 & 0 \\ 0 & e^{j\phi(k)} \end{bmatrix}\begin{bmatrix} 1 & a \\ a & -1 \end{bmatrix}\begin{bmatrix} s_1 \\ s_2 \end{bmatrix}, \quad \text{[Equation 17]}$$

$$\phi(k) = \frac{2\pi}{2}k, k = 1, \ldots, N-1,$$

$$\begin{cases} \sqrt{2}+1, & \text{for } QPSK+QPSK \\ (\sqrt{2}+4)/(\sqrt{2}+2), & \text{for } 16QAM+16QAM \end{cases}$$

Equations 16 and 17 are different from Equation 4 in terms of representation, but the Equations 16 and 17 have the same mathematical meaning. Equation 16 indicates an optimum value θ at which influence of a channel variation is minimized when input signals respectively correspond to "4-QAM and 4-QAM" (i.e., QPSK+QPSK) and "16-QAM and 16-QAM".

Equation 15 can also be represented by Equation 18.

$$\begin{bmatrix} 1 & 0 \\ 0 & e^{j\phi(k)} \end{bmatrix}\begin{bmatrix} \cos\theta & -\sin\theta \\ \sin\theta & \cos\theta \end{bmatrix}\begin{bmatrix} s_1 \\ s_2 \end{bmatrix}, \quad \text{[Equation 18]}$$

$$\theta = \begin{cases} 29 \text{ degrees}, & \text{for } QPSK+QPSK \\ 16.8 \text{ degrees}, & \text{for } 16QAM+16QAM \end{cases},$$

$$\phi(k) = \frac{2\pi}{N}k, k = 1, \ldots, N-1$$

A signal that is MIMO-encoded according to the MIMO encoding matrix shown in Equation 18 has robustness against Rayleigh fading, and the input signal S1 and the other input signal S2 can be separated from each other even in all correlation channels.

Figure 47:
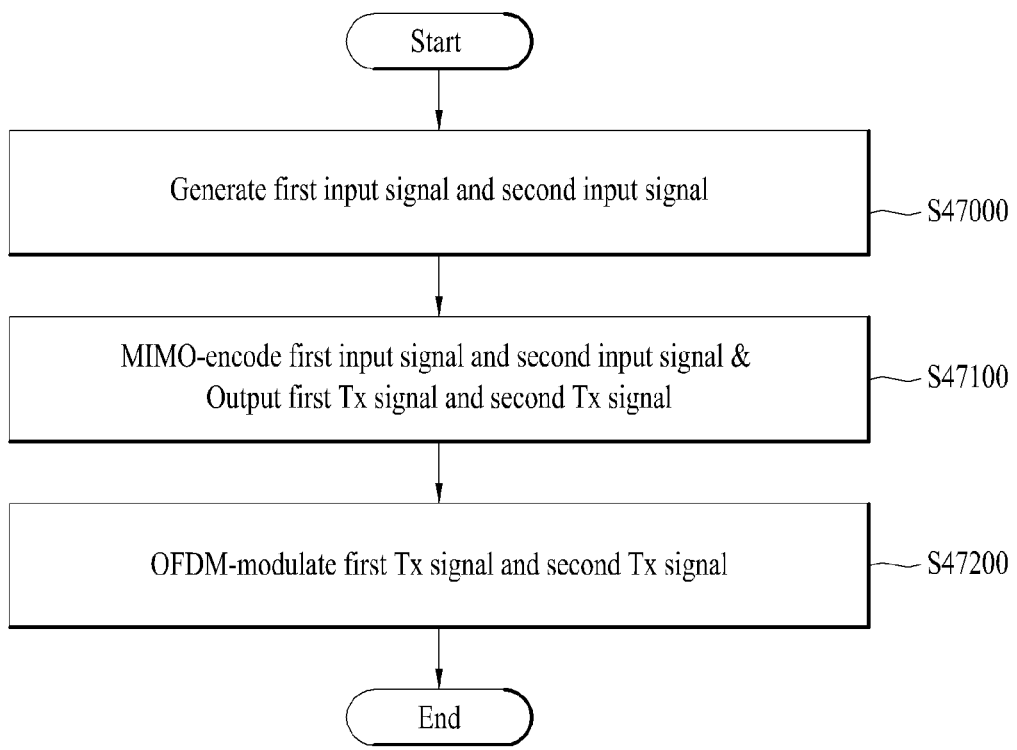
FIG. 47 is a flowchart illustrating a method of transmitting a broadcast signal according to an embodiment of the present invention.

FIG. 47 is a flowchart illustrating a method of transmitting a broadcast signal according to an embodiment of the present invention.

A transmitter for transmitting a broadcast signal according to one embodiment of the present invention generates a first input signal and a second input signal for MIMO transmission in step S47100.

A first input signal and a second input signal are generated by the input signal generator or the divider. The broadcast transmitter may divide data to be transmitted into the first input signal and the second input signal according to a MIMO transmission path. The input signal generator or the divider may perform unique operations using different device elements.

The transmitter for transmitting a broadcast signal performs MIMO encoding of the first input signal and the second input signal, and generates the first transmission signal and the second transmission signal in step S47200.

The MIMO encoding operation may be carried out by the MIMO encoder or the MIMO processor as described above, and may use the MIMO encoding matrix corresponding to the above-mentioned embodiments. That is, the broadcast signal transmitter may perform MIMO encoding using either MIMO matrices described in FIGS. 25 to 46 or MIMO matrices described in Equations 12 to 18. In more detail, a signal obtained by addition of the first transmission signal and the second transmission signal may have an optimized Euclidean distance, and may have an Euclidean distance that is capable of having gray mapping or compensating for the Hamming distance, such that MIMO encoding may be carried out using the MIMO matrix at which the parameter 'a' is established. As described above, the broadcast transmitter may adjust power of input signals using the MIMO matrix, where the parameter 'a' may be set to different values according to modulation types of input signals.

MIMO encoding may be carried out using the above-mentioned precoding MIMO matrices shown in Equations 12 to 14, and MIMO encoding may be carried out using the phase-rotated MIMO matrices shown in Equations 15 to 18. This example may be changed according to designer intention. Thereafter, the broadcast transmitter may perform OFDM modulation of the first transmission signal and the second transmission signal, and may transmit the OFDM-modulated first and second transmission signals in step S473000.

The broadcast transmitter may transmit the OFDM-modulated first transmission signal and the OFDM-modulated second transmission signal through the first antenna and the second antenna, respectively. The first transmission signal and the second transmission signal may have the above-mentioned signal frame structures.

Figure 48:
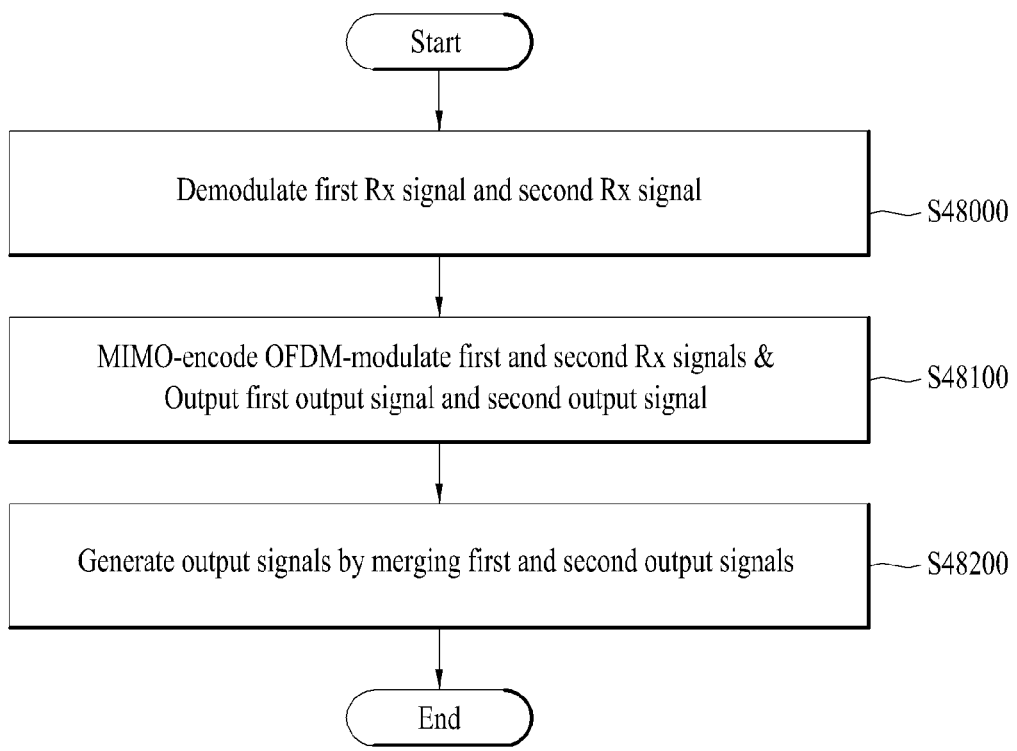
FIG. 48 is a flowchart illustrating a method of receiving a broadcast signal according to an embodiment of the present invention.

FIG. 48 is a flowchart illustrating a method of receiving a broadcast signal according to an embodiment of the present invention.

Referring to FIG. 48, the broadcast receiver according to one embodiment of the present invention receives a first reception signal and a second reception signal, and performs OFDM modulation of the first reception signal and the second reception signal in step S48000. The first reception signal and the second reception signal are MIMO-encoded by the broadcast transmitter according to one embodiment of the present invention, and the MIMO encoding operation may be carried out by the MIMO encoder or the MIMO processor as described above, and the MIMO encoding matrices corresponding to the above-mentioned embodiments may be used. That is, the broadcast transmitter may perform MIMO encoding using any one of the MIMO matrices described in Equations 12 to 18 and MIMO matrices described in Equations 25 to 46. In more detail, a signal obtained by addition of the first transmission signal and the second transmission signal may have an optimized Euclidean distance, and may have an Euclidean distance that is capable of having gray mapping or compensating for the Hamming distance, such that MIMO encoding may be carried out using the MIMO matrix at which the parameter 'a' is established. As described above, the broadcast transmitter may adjust power of input signals using the MIMO matrix, where the parameter 'a' may be set to different values according to modulation types of input signals.

MIMO encoding may be carried out using the above-mentioned precoding MIMO matrices shown in Equations 12 to 14, and MIMO encoding may be carried out using the phase-rotated MIMO matrices shown in Equations 15 to 18. This example may be changed according to designer intention.

A broadcast receiver performs MIMO decoding of the first reception signal and the second reception signal, and may generate the first output signal and the second output signal in step S48100. The broadcast receiver according to one embodiment of the present invention may perform MIMO decoding using a reverse process of the MIMO encoding processed by the broadcast transmitter. Specifically, the broadcast receiver may synchronize and obtain the index K of the phase rotation used in the above-mentioned matrix, and may calculate LLR using the precoding matrix.

Thereafter, the broadcast receiver receives the first output signal and the second output signal, and merges of the first and second output signals, such that it can generate the output signal in step S48200.

MODES FOR INVENTION

Details about modes for the present invention have been described in the above best mode.

INDUSTRIAL APPLICABILITY

As described above, the present invention can be wholly or partially applied to digital broadcast systems.

The invention claimed is:
1. A method for transmitting broadcast signals in a transmitter, the method comprising:
encoding data for Physical Layer Pipes (PLPs);
mapping the encoded data onto constellations according to modulation types;
Multi-Input Multi-Output (MIMO) processing the mapped data for the MIMO processing by multiplying a rotation matrix with a pair of symbols of the mapped data and applying a phase rotation matrix to the multiplied symbols;
time interleaving the MIMO processed data;
building frames by mapping the time interleaved data;
frequency-interleaving data in the built frames;
modulating the frequency-interleaved data by an Orthogonal Frequency Division Multiplexing (OFDM) scheme; and
transmitting the broadcast signals including the modulated data,
wherein the frames include signaling information for signaling data in the frames,
wherein the signaling information includes information on a PLP identifier, wherein the rotation matrix is represented as:

$$\begin{bmatrix} \cos\theta & \sin\theta \\ \sin\theta & -\cos\theta \end{bmatrix}$$

wherein "θ" is a rotation angle and the rotation angle depends on one of the modulation types.

2. A method for receiving broadcast signals in a transmitter, the method comprising:
receiving the broadcast signals;
demodulating the received broadcast signals by an Orthogonal Frequency Division Multiplexing (OFDM) scheme,
frequency de-interleaving the demodulated broadcast signals;
parsing frames from the frequency de-interleaved broadcast signals;
time de-interleaving symbols in the parsed frames;
Multi-Input Multi Output (MIMO) decoding the time de-interleaved symbols using a rotation matrix and a phase rotation matrix with a pair of symbols;
demapping the MIMO decoded symbols into data for Physical Layer Pipes (PLPs);
decoding the data for the PLPs, wherein the frames include signaling information for signaling data in the frames, wherein the signaling information includes information on a PLP identifier, wherein the rotation matrix is represented as:

$$\begin{bmatrix} \cos\theta & \sin\theta \\ \sin\theta & -\cos\theta \end{bmatrix}$$

wherein "θ" is a rotation angle and the rotation angle depends on one of modulation types.

* * * * *